United States Patent [19]

Edmondson et al.

[11] Patent Number: 5,471,591

[45] Date of Patent: Nov. 28, 1995

[54] COMBINED WRITE-OPERAND QUEUE AND READ-AFTER-WRITE DEPENDENCY SCOREBOARD

[75] Inventors: John H. Edmondson, Cambridge; Larry L. Biro, Oakham, both of Mass.

[73] Assignee: Digital Equipment Corporation, Maynard, Mass.

[21] Appl. No.: 969,126

[22] Filed: Oct. 30, 1992

Related U.S. Application Data

[63] Continuation-in-part of Ser. No. 34,581, Mar. 22, 1993, Pat. No. 5,317,720, which is a continuation of Ser. No. 547,699, Jun. 29, 1990, abandoned.

[51] Int. Cl.$^6$ .................................................. G06F 9/312
[52] U.S. Cl. .................... 395/375; 364/231.8; 364/933; 364/948.3
[58] Field of Search ................................. 395/375, 575, 395/800

[56] References Cited

U.S. PATENT DOCUMENTS

| Re. 32,493 | 9/1987 | Matsumoto et al. | 364/200 |
|---|---|---|---|
| 4,789,925 | 12/1988 | Lahti | 395/800 |
| 4,875,160 | 10/1989 | Brown, III | 395/375 |
| 4,891,753 | 1/1990 | Budde et al. | 395/375 |
| 5,067,069 | 11/1991 | Fite et al. | 395/375 |
| 5,068,781 | 11/1991 | Gillett | 395/325 |
| 5,109,495 | 4/1992 | Fite et al. | 395/375 |
| 5,125,083 | 6/1992 | Fite | 395/375 |
| 5,142,631 | 8/1992 | Murray et al. | 395/375 |
| 5,142,633 | 8/1992 | Murray et al. | 395/375 |
| 5,214,768 | 5/1993 | Martia | 395/425 |
| 5,251,306 | 10/1993 | Tran | 395/375 |

FOREIGN PATENT DOCUMENTS

| 0243892 | 11/1987 | European Pat. Off. | G06F 9/38 |
|---|---|---|---|
| 0269980 | 6/1988 | European Pat. Off. | G06F 9/38 |
| 0381469 | 8/1990 | European Pat. Off. | G06F 9/38 |
| 0463965 | 1/1992 | European Pat. Off. | G06F 9/38 |
| 2016753 | 9/1979 | United Kingdom | G06F 9/10 |

OTHER PUBLICATIONS

Acosta et al., "An Instruction Issuing Approach to Enhancing Performance in Multiple Functional Unit Processors," IEEE Transactions in Computers C-35 (Sep. 1986) No. 9, New York, N.Y., pp. 815–828.

Matsumoto et al., "A High-Performance Architecture for Variable Length Instructions", Systems & Computers in Japan, No. 3 (May 1985), Washington, D.C., pp. 19–28.

Fossum et al., "New VAX Squeezes Mainframe Power Into Mini Package", Computer Design, vol. 24, No. 3 (Mar. 1985), Littleton, Mass., pp. 173–181.

Primary Examiner—David Y. Eng
Attorney, Agent, or Firm—Arthur W. Fisher; Denis G. Maloney

[57] ABSTRACT

In a pipelined digital computer, an instruction decoder decodes register specifiers from multiple instructions, and stores them in a source queue and a destination queue. An execution unit successively obtains source specifiers of an instruction from the source queue, initiates an operation upon the source specifiers, reads a destination specifier from the destination queue, and retires the result at the specified destination. Read-after-write conflicts may occur because the execution unit may overlap execution of a plurality of instructions. Just prior to beginning execution of a current instruction, the destination queue is checked for conflict between the source specifiers of the current instruction and the destination specifiers of previously issued but not yet retired instructions. When an instruction is issued for execution, its destination specifiers in the destination queue are marked to indicate that they are associated with an executed but not yet retired instruction. In a preferred construction, each entry of the queue has a "write pending" bit that is cleared during a flush and when a read pointer is incremented. An issue pointer identifies the entry of an instruction next to be issued, so that the write-pending bit is set when the issue pointer is incremented. Each entry has two comparators enabled by the write-pending bit to detect a conflict with two source specifiers.

18 Claims, 24 Drawing Sheets

FIG. 15

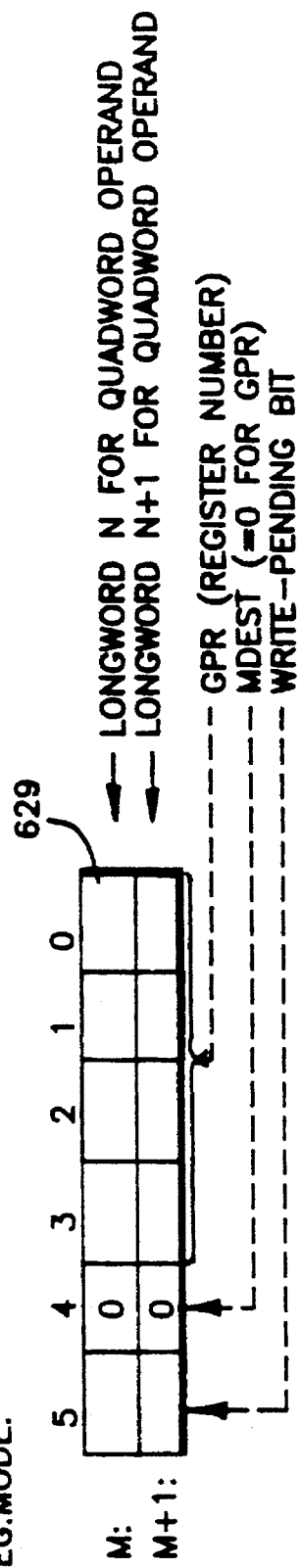
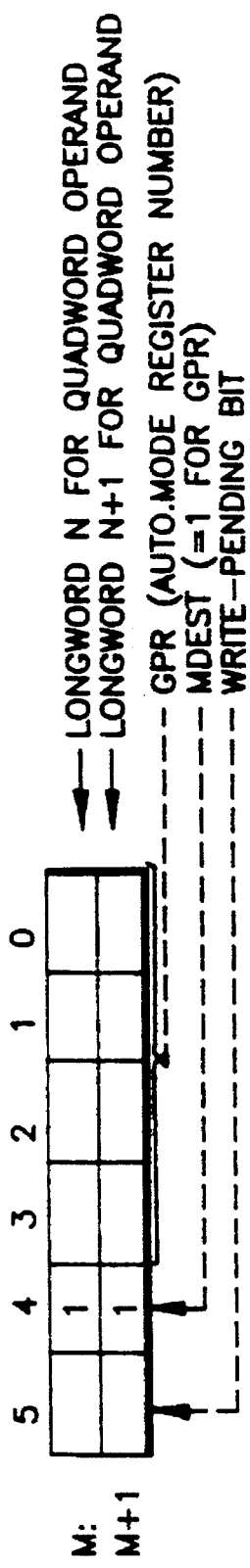
FIG. 19

COMBINED WRITE-OPERAND QUEUE AND READ-AFTER-WRITE DEPENDENCY SCOREBOARD

RELATED APPLICATIONS

This is a continuation-in-part of application Ser. No. 08/034,581, filed Mar. 22, 1993, now U.S. Pat. No. 07/547, 699, filed Jun. 29, 1990, (abandoned), entitled BUS PROTOCOL FOR HIGH-PERFORMANCE PROCESSOR, by Rebecca L. Stamm, et al.

This application discloses subject matter also disclosed in the following patent applications, which have been assigned to the assignee of the present application: Ser. No. 07/934, 207 filed Aug. 21, 1992, and entitled REGISTER LOGGING IN PIPELINED COMPUTER USING REGISTER LOG QUEUE OF REGISTER CONTENT CHANGES AND BASE QUEUE OF REGISTER 20 LOG QUEUE POINTERS FOR RESPECTIVE INSTRUCTIONS, by John F. Brown, III, and Mary K. Gowan, now abandoned; and Ser. No. 07/934,351 filed Aug. 21, 1992, and entitled REGISTER CONFLICT SCOREBOARD IN PIPELINED COMPUTER USING PIPELINED REFERENCE COUNTS, by John F. Brown, III, and Mary K. Gowan; and John H. Edmondson and G. Michael Uhler, Ser. No. 07/969, 776 filed Oct. 30, 1992, coincident with the present application, and entitled PIPELINE MERGER WHICH MAKES TWO DIFFERENT LENGTH PIPELINES OPERATE AS ONE, WITH DYNAMICALLY VARYING PIPELINE LENGTH, now abandoned.

BACKGROUND OF THE INVENTION

1. Field of the Invention

This invention is directed to pipelined digital computers, and more particularly to the pipelining of register information between instruction decoding and instruction execution. The invention specifically relates to a register scoreboard scheme for preventing register access conflicts between the fetching of register operands for instruction execution and the retiring of register destination operands.

2. Description of the Background Art

A large part of the existing software base, representing a vast investment in writing code, database structures and personnel training, is for complex instruction set or CISC type processors. These types of processors are characterized by having a large number of instructions in their instruction set, often including memory-to-memory instructions with complex memory accessing modes. The instructions are usually of variable length, with simple instructions being only perhaps one byte in length, but the length ranging up to dozens of bytes. The VAX (Trademark) instruction set by Digital Equipment Corporation is a primary example of CISC and employs instructions having one to two byte opcodes plus from zero to six operand specifiers, where each operand specifier is from one byte to many bytes in length. The size of the operand specifier depends upon the addressing mode, size of displacement (byte, word or longword), etc. The first byte of the operand specifier describes the addressing mode for that operand, while the opcode defines the number of operands: one, two or three. When the opcode itself is decoded, however, the total length of the instruction is not yet known to the processor because the operand specifiers have not yet been decoded. Another characteristic of VAX (Trademark) instructions is the use of byte or byte string memory references, in addition to quadword or longword references; that is, a memory reference may be of a length variable from one byte to multiple words, including unaligned byte references.

The variety of powerful instructions, memory accessing modes and data types available in a variable-length CISC instruction architecture should result in more work being done for each line of code (actually, compilers do not produce code taking full advantage of this). Whatever gain in compactness of source code is accomplished at the expense of execution time. Particularly as pipelining of instruction execution has become necessary to achieve performance levels demanded of systems presently, the data or state dependencies of successive instructions, and the vast differences in memory access time vs. machine cycle time, produce excessive stalls and exceptions, slowing execution.

When CPUs were much faster than memory, it was advantageous to do more work per instruction, because otherwise the CPU would always be waiting for the memory to deliver instructions—this factor lead to more complex instructions that encapsulated what would be otherwise implemented as subroutines. When CPU and memory speed became more balanced, the advantages of complex instructions is lessened, assuming the memory system is able to deliver one instruction and some data in each cycle. Hierarchical memory techniques, as well as faster access cycles, and greater memory access bandwidth, provide these faster memory speeds. Another factor that has influenced the choice of complex vs. simple instruction type is the change in relative cost of off-chip vs. on-chip interconnection resulting from VLSI construction of CPUs. Construction on chips instead of boards changes the economics—first it pays to make the architecture simple enough to be on one chip, then more on-chip memory is possible (and needed) to avoid going off-chip for memory references. A further factor in the comparison is that adding more complex instructions and addressing modes as in a CISC solution complicates (thus slows down) stages of the instruction execution process. The complex function might make the function execute faster than an equivalent sequence of simple instructions, but it can lengthen the instruction cycle time, making all instructions execute slower; thus an added function must increase the overall performance enough to compensate for the decrease in the instruction execution rate.

Despite the performance factors that detract from the theoretical advantages of CISC processors, the existing software base as discussed above provides a long-term demand for these types of processors, and of course the market requires ever increasing performance levels. Business enterprises have invested many years of operating background, including operator training as well as the cost of the code itself, in applications programs and data structures using the CISC type processors which were the most widely used in the past ten or fifteen years. The expense and disruption of operations to rewrite all of the code and data structures to accommodate a new processor architecture may not be justified, even though the performance advantages ultimately expected to be achieved would be substantial. Accordingly, a basic objective is to provide high-level performance in a CPU which executes an instruction set of the type using variable length instructions and variable data widths in memory accessing.

A typical pipelined digital computer for executing variable-length CISC instructions has three main parts, the I-box or instruction unit which fetches and decodes instructions, the E-box or execution unit which performs the operations defined by the instructions, and the M-box or memory management unit which handles memory and I/O functions.

An example of such a digital computer system is shown in U.S. Pat. No. 4,875,160, issued Oct. 17, 1989 to John F. Brown and assigned to Digital Equipment Corporation. Such a machine is constructed using a single-chip CPU device, clocked at very high rates, and is microcoded and pipelined.

Theoretically, if the pipeline can be kept full and an instruction issued every cycle, a processor can execute one instruction per cycle. To this goal, macroinstruction pipelining is employed (instead of microinstruction pipelining), so that a number of macroinstructions can be at various stages of the pipeline at a given time. Queuing is provided between units of the CPU so that there is some flexibility in instruction execution times; the execution of stages of one instruction need not always wait for the completion of these stages by a preceding instruction. Instead, the information produced by one stage can be queued until the next stage is ready. But data dependencies still create bubbles in the pipeline as results generated by one instruction but not yet available are needed by a subsequent instruction which is ready to execute. In addition, it is sometimes necessary to "flush" the pipeline to remove information about a macroinstruction when an exception occurs for that macroinstruction or when the macroinstruction is in a predicted branch path for a prediction which is found to be incorrect.

Register access conflicts in a pipelined computer are typically resolved by a register scoreboard. Each potential dependency is recorded as a single bit set when a register source operand is decoded, and another single bit set when a register destination operand is decoded. The use of a register for fetching an operand is stalled if that register is indicated as the destination for a decoded but not yet executed instruction. In a similar fashion, the modification of a register by pre-processing of an auto-mode specifier is stalled if that register is indicated as a register source operand of a not-yet executed instruction.

In high-performance pipelined computers, a set of queues are inserted between an instruction decoding unit and an instruction execution unit. Because of the queues, the use or modification of a register during the fetching or pre-processing of an operand may conflict with a plurality of decoded but not yet executed instructions. One scheme for resolving that conflict is a register scoreboard queue, as described in Murray et al., Multiple Instruction Preprocessing with Data Dependency Resolution for Digital Computer, U.S. Pat. No. 5,142,631, issued Aug. 25, 1992, corresponding to European Patent Application Pub. No. 0,380,850, published Aug. 8, 1990. In such a register scoreboard queue, a register source mask and a register destination mask are generated for each decoded instruction, the masks are loaded into a queue, a composite source mask is generated by a logical OR of all of the source masks in the queue, and a composite destination mask is generated by a logical OR of all of the destination masks in the queue. Although such a register scoreboard queue is workable for resolving conflicts for multiple decoded but not yet executed instructions, it requires more circuitry than is necessary for certain pipelined processor designs. Moreover, U.S. Pat. No. 5,142,631 does not show the handling of multiple outstanding conflicts to a single register. Instead, as described in U.S. Pat. No. 5,142,631, instruction decoding is stalled when the read-after-write conflict is detected between the mask that is generated for the instruction being decoded and any of the masks in the register scoreboard queue.

SUMMARY OF THE INVENTION

The present invention concerns a method and apparatus for handling register read-after-write conflicts that occur in a pipelined computer having an instruction decoding unit for decoding instructions to obtain source and destination specifiers from each instruction, source and destination queues for queuing the source and destination specifiers of a plurality of instructions, and an execution unit for removing the source specifiers for a current instruction from the source queue and executing the current instruction by performing an operation specified by the instruction upon the operands. The execution unit is capable of overlapping the execution of a plurality of instructions, so that a "read-after-write" conflict may occur between a register source specifier of the current instruction about to be executed and a register destination specifier of a previous instruction being executed by the execution unit. In such a conflict situation, the pipeline processing of the current instruction must be stalled until execution of the previous instruction has been completed so that the register value computed during execution of the previous instruction becomes available for use during execution of the current instruction.

Instead of stalling the decoding of an instruction that may have a read-after-write conflict with a previously decoded but not yet executed instruction, the present invention permits the possibly conflicting instruction to be fully decoded and the source and destination specifiers of the decoded instruction to be temporarily stored in queues until the time that the execution unit is ready to execute the possibly conflicting instruction.

The basic method of the present invention includes decoding and queuing register specifiers for multiple instructions prior to instruction execution, and just prior to beginning execution of a current instruction, checking for a register read-after-write conflict between a register source specifier of the current instruction and register destination specifiers of previously issued but not yet retired instructions. In this regard, an instruction is issued when an operation specified by the instruction is initiated, and the instruction is retired when the operation is completed. The stalling of the pipeline due to a register read-after-write conflict occurs, for example, when a register source operand at the head of a source specifier queue is inspected and found to specify the same register as a register destination specifier of an issued but not yet retired instruction.

By queuing source and destination specifiers and delaying the time for read-after-write conflict checking of register source operands from instruction decoding to just prior to instruction, the efficiency of pipeline processing is improved because instruction decoding may continue uninterrupted, and stalls are frequently avoided entirely by the retiring of the conflicting previous instruction just before the current instruction is issued.

Preferably, the register destination specifiers are inserted into a destination queue during instruction decoding, and when an instruction is issued for execution, its register destination specifiers in the destination queue are marked to indicate that they are associated with issued but not yet retired instructions. Moreover, the destination queue is configured so that it is "content addressable" to determine whether a specified source register is also specified by any register destination specifiers associated with issued but not yet retired instructions.

In a preferred construction, a write-operand queue (i.e., the source queue) is combined with a read-after-write dependency scoreboard for the execution unit. This construction saves integrated circuit chip area because the register cells used to store the register destination specifiers are shared between the queue function and the scoreboard function, and there is no meed to transfer the register destination specifiers from the destination queue to the scoreboard.

In accordance with another aspect of the present invention, the combined write-operand queue and read-after-write dependency scoreboard of the present invention has a "write-pending" bit associated with each destination specifier entry to indicate whether any register destination specifier in the entry is associated with an issued but not yet retired instruction. The combined queue and scoreboard also has two comparators associated with each entry for comparing any register destination specifier in the entry to two source specifiers. The combined queue has a conventional input pointer and output pointer, and in addition has a third pointer (an "issue pointer") for indicating an entry containing a specifier associated with an instruction next to be issued.

In a preferred mode of operation, the combined queue and scoreboard is reset or flushed by resetting all three pointers (input, output, and issue) to the same initial value, and clearing all of the "write pending" bits in the queue. When an instruction is decoded, a destination specifier of the instruction is written into the queue entry indicated by the input pointer, and then the input pointer is incremented. The queue is a kind of register file, and when the pointer reaches the end of the file and is further incremented, the pointer "wraps around" to an initial value, so that the register file of the queue appears circular. The queue is empty when the input pointer and the output pointer point to the same entry.

When a current instruction is ready to be issued, its source operand general purpose register (GPR) indexes are compared against each write-operand queue entry whose write-pending bit is set. In the preferred construction, there are two possible source operands in a single cycle of the pipeline clock. Moreover, the two comparators for each entry in the write-operand queue are enabled by the write-pending bit of the entry so that the comparators will not indicate a match unless the write-pending bit is set. In this way, matches can only be indicated for previous instructions which have been initiated. If any comparator indicates a match, then the current instruction is stalled and prevented from issuing.

When the current instruction is issued, the write pending bit pointed to by the issue pointer is set, and then the issue pointer is incremented.

When the current instruction is stalled and prevented from issuing, the write-pending bit for its destination specifier is not set. Otherwise, the current instruction might be stalled indefinitely if it has a destination register and a source register that are the same. Such a deadlock situation must be avoided because instructions very often have a destination register which is the same as one of its source registers.

BRIEF DESCRIPTION OF THE DRAWINGS

The novel features believed characteristic of the invention are set forth in the appended claims. The invention itself, however, as well as other features and advantages thereof, will be best understood by reference to the detailed description of a specific embodiment, when read in conjunction with the accompanying drawings wherein:

FIG. 15 is a diagram of the formats of microinstruction words produced by the control store of FIG. 14;

FIG. 19 is a diagram of bit definitions for entries in the destination queue;

DESCRIPTION OF THE PREFERRED EMBODIMENT

Figure 1:
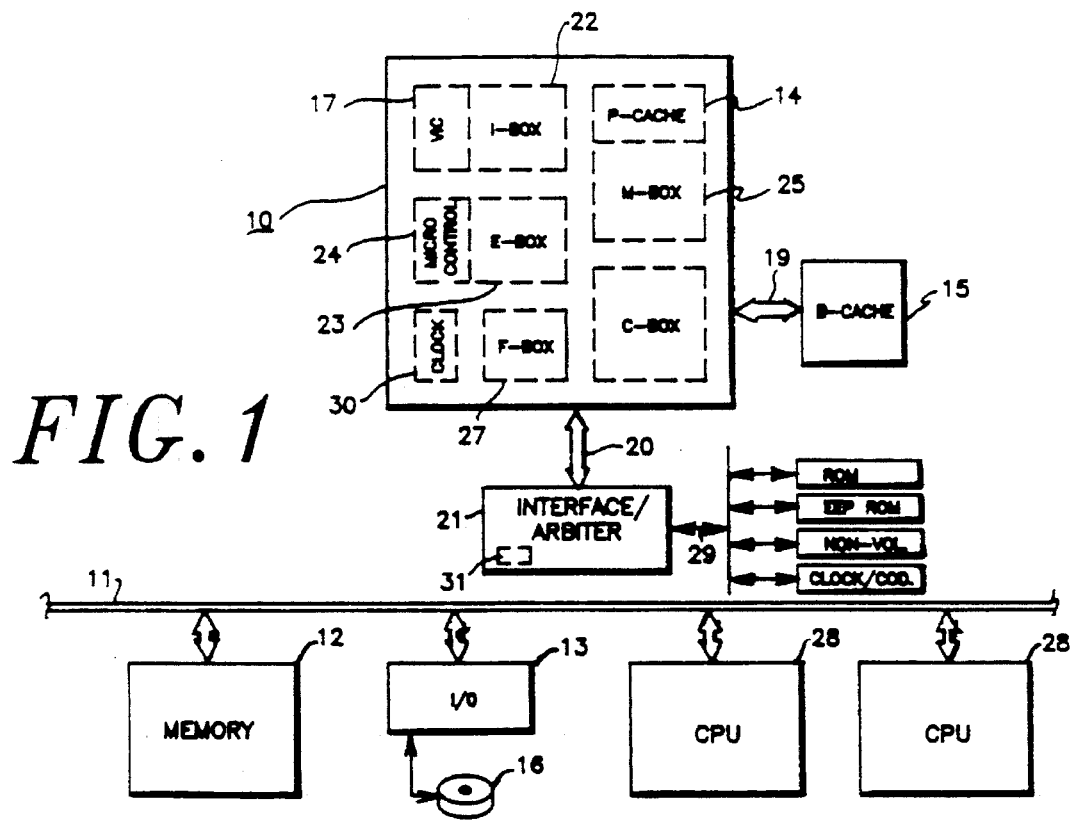
FIG. 1 is an electrical diagram in block form of a computer system including a pipelined central processing unit employing the present invention.

Referring to FIG. 1, according to one embodiment, a computer system employing features of the invention includes a CPU chip or module 10 connected by a system bus 11 to a system memory 12 and to I/O elements 13. Although in a preferred embodiment the CPU 10 is formed on a single integrated circuit, some concepts as described below may be implemented as a chip set mounted on a single circuit board or multiple boards. When fetching instructions or data, the CPU 10 accesses an internal or primary cache 14, and then a larger external or backup cache 15. Thus, a hierarchical memory is employed, the fastest being the primary cache 14, then the backup cache 15, then the main system memory 12, usually followed by a disk memory 16 accessed through the I/O elements 13 by employing an operating system (i.e., software). A virtual memory organization is employed, with page swapping between disk 16 and the memory 12 used to keep the most-likely-to-be-used pages in the physical memory 12. An additional cache 17 in the CPU 10 stores instructions only, using the virtual addresses instead of physical addresses. Physical addresses are used for accessing the primary and backup caches 14 and 15, and used on the bus 11 and in the memory 12. When the CPU 10 fetches an instruction, first the virtual instruction cache 17 is checked, and if a cache miss occurs the address is translated to a physical address and the primary cache 14 is checked. If the instruction is not in the primary cache, the backup cache 15 is accessed, and upon a cache miss in the backup cache the memory 12 is accessed. The primary cache 14 is smaller but faster than the backup cache 15, and the content of the primary cache 14 is a subset of the content of the backup cache 15. The virtual instruction cache 17 differs from the operation of the other two caches 14 and 15 in that there are no writes to the cache 17 from the CPU 10 except when instructions are fetched, and also the content of this cache 17 need not be a subset of the content of the caches 14 or 15, although it may be.

The CPU 10 accesses the backup cache 15 through a bus 19, separate from a CPU bus 20 used to access the system bus 11; thus, a cache controller for the backup cache 15 is included within the CPU chip. Both the CPU bus 20 and the system bus 11 are 64-bit bidirectional multiplexed address/data buses, accompanied by control buses containing request, grant, command lines, etc. The bus 19, however, has a 64-bit data bus and separate address buses. The system bus 11 is interconnected with the CPU bus 20 by an interface unit 21 functioning to arbitrate access by the CPU 10 and the other components on the CPU bus 20.

The CPU 10 includes an instruction unit 22 (referred to as the I-box) functioning to fetch macroinstructions (machine-level instructions) and to decode the instructions, one per cycle, and parse the operand specifiers, then begin the operand fetch. The data or address manipulation commanded by the instructions is done by an execution unit or E-box 23 which includes a register file and an ALU. The CPU is controlled by microcode so a microinstruction control unit 24 including a microsequencer and a control store is used to generate the sequence of microinstructions needed to implement the macroinstructions. A memory management unit or M-box 25 receives instruction read and data read requests from the instruction unit 22, and data read or write requests from the execution unit 23, performs address translation for the virtual memory system to generate physical addresses, and issues requests to the P-cache 14, or in the case of a miss, forwards the requests to the backup cache 15 via a cache controller 26. This cache controller or C-box 26 handles access to the backup (second level) cache 15 in the case of a P-cache miss, or access to the main memory 12 for backup cache misses. An on-chip floating point processor 27 (referred to as the F-box) is an execution unit for floating point and integer multiply instructions, receiving operands and commands from the execution unit 23 and delivering results back to the execution unit.

Although features of the invention may be used with various types of CPUs, the disclosed embodiment was intended to execute the VAX instruction set, so the machine-level or macroinstructions referred to are of variable size. An instruction may be from a minimum of one byte, up to a maximum of dozens of bytes long; the average instruction is about five bytes. Thus, the instruction unit 22 must be able to handle variable-length instructions, and in addition the instructions are not necessarily aligned on word boundaries in memory. The instructions manipulate data also of variable width, with the integer data units being set forth in FIG. 3. The internal buses and registers of the CPU 10 are generally 32-bits wide, 32-bits being referred to as a longword. Transfers of data to and from the caches 14 and 15 and the memory 12 are usually 64-bits at a time, and the buses 11 and 20 are 64-bits wide, referred to as a quadword (four words or eight bytes). The instruction stream is prefetched as quadwords and stored in a queue, then the particular bytes of the next instruction are picked out by the instruction unit 22 for execution. The instructions make memory references of byte, word, longword or quadword width, and these need not be aligned on longword or quadword boundaries, i.e., the memory is byte addressable. Some of the instructions in the instruction set execute in one machine cycle, but most require several cycles, and some require dozens of cycles, so the CPU 10 must accommodate not only variable sized instructions and instructions which reference variable data widths (aligned or non-aligned), but also instructions of varying execution time.

Even though the example embodiment to be described herein is intended to execute the VAX (Trademark) instruction set, nevertheless there are features of the invention useful in processors constructed to execute other instruction sets, such as those for 80386 or 68030 types.

Additional CPUs 28 may access the system bus 11 in a multiprocessor system. Each additional CPU can include its own CPU chip 10, cache 15 and interface unit 21, if these CPUs 28 are of the same design as the CPU 10. Alternatively, these other CPUs 28 may be of different construction but executing a compatible bus protocol to access the main system bus 11. These other CPUs 28 can access the memory 12, and so the blocks of data in the caches 14 or 15 can become obsolete. If a CPU 28 writes to a location in the memory 12 that happens to be duplicated in the cache 15 (or in the primary cache 14), then the data at this location in the cache 15 is no longer valid. For this reason, blocks of data in the caches 14 and 15 are "invalidated" when there is a write to memory 12 from a source other than the CPU 10 (such as the other CPUs 28). The cache 14 operates on a "writethrough" principle, whereas the cache 15 operates on a "writeback" principle. When the CPU 10 executes a write to a location which happens to be in the primary cache 14, the data is written to this cache 14 and also to the backup cache 15 (and sometimes also to the memory 12, depending upon conditions); this type of operation is "writethrough". When the CPU 10 executes a write to a location which is in the backup cache 15, however, the write is not necessarily forwarded to the memory 12, but instead is written back to memory 12 only if another element in the system (such as a CPU 28) needs the data (i.e., tries to access this location in memory), or if the block in the cache is displaced (deallocated) from the cache 15.

The interface unit 21 has three bus ports. In addition to the CPU address/data port via bus 20 and the main system bus 11, a ROM bus 29 is provided for accessing a boot ROM as well as EEPROM, non-volatile RAM (with battery back up) and a clock/calendar chip. The ROM bus 29 is only 8-bits wide, as the time demands on ROM bus accesses are less stringent. This ROM bus can also access a keyboard and/or LCD display controller as well as other input devices such as a mouse. A serial input/output port to a console is also included in the interface 21, but will not be treated here.

Figure 2:
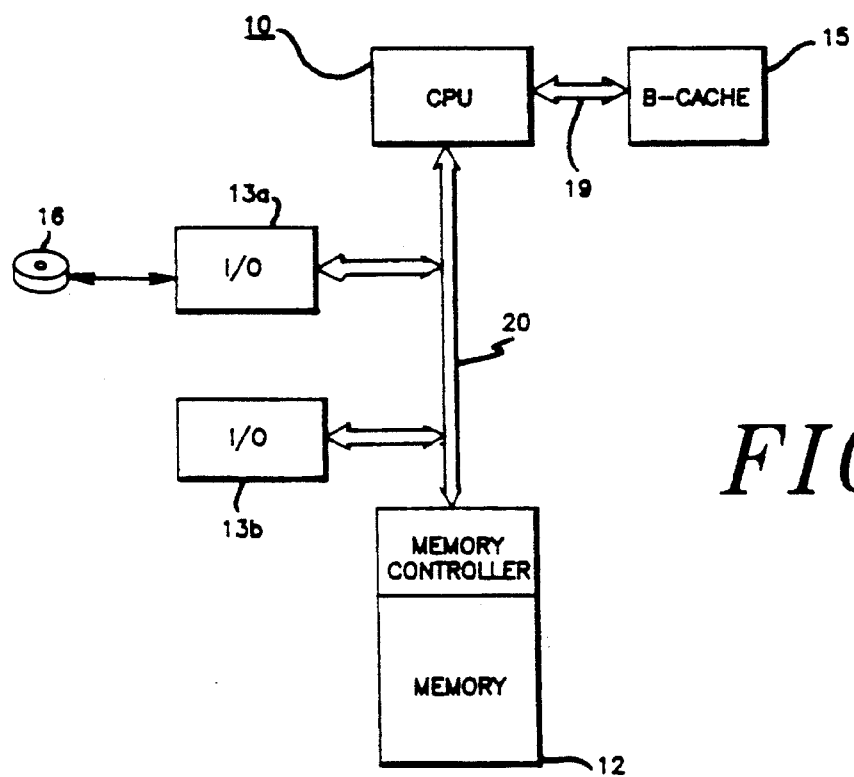
FIG. 2 is an electrical diagram in block form of a computer system as in FIG. 1, according to an alternative configuration.

The bus 20 may have other nodes connected to it; for example, as seen in FIG. 2, a low end configuration of a system using the CPU 10 may omit the interface/arbiter chip 21 and connect the memory 12 to the bus 20 (using a suitable memory interface). In this case the I/O must be connected to the bus 20 since there is no system bus 11. To this end, the disk 16 or other I/O is connected to one or two I/O nodes 13a and 13b, and each one of these can request and be granted ownership of the bus 20. All of the components on the bus 20 in the case of FIG. 2 are synchronous and operating under clock control from the CPU 10, whereas in the case of FIG. 1 the system bus 11 is asynchronous to the bus 20 and the CPU 10 and operates on its own clock.

Accordingly, the CPU 10 herein disclosed is useful in many different classes of computer systems, ranging from desktop style workstations or PCs for individual users, to full-scale configurations servicing large departments or entities. In one example, the system of FIG. 1 may have a backup cache 15 of 256 K bytes, a main memory 20 of 128 M bytes, and a disk 16 capacity of perhaps 1 G byte or more. In this example, the access time of the backup cache 15 may be about 25 nsec (two CPU machine cycles), while the access time of the main memory 20 from the CPU 10 via bus 11 may be ten or twenty times that of the backup cache; the disk 16, of course, has an access time of more than ten times that of the main memory. In a typical system, therefore, the system performance depends upon executing as much as possible from the caches.

Although shown in FIG. 1 as employing a multiplexed 64-bit address/data bus 11 or 20, the invention may be implemented in a system using separate address and data busses as illustrated in U.S. Pat. No. 4,875,160, for example.

Figure 3:
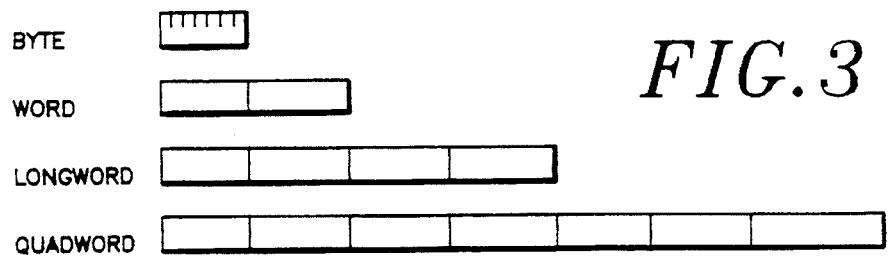
FIG. 3 is a diagram of data types used in the system of FIG. 1.

Referring to FIG. 3, the integer data types or memory references discussed herein include a byte (eight bits), a word (two bytes), a longword (four bytes), and a quadword (eight bytes or 64-bits). The data paths in the CPU 10 are generally quadword width, as are the data paths of the busses 11 and 20. Not shown in FIG. 3, but referred to herein, is a hexaword, which is sixteen words (32-bytes) or four quadwords.

Clocks and Timing

Figure 4:
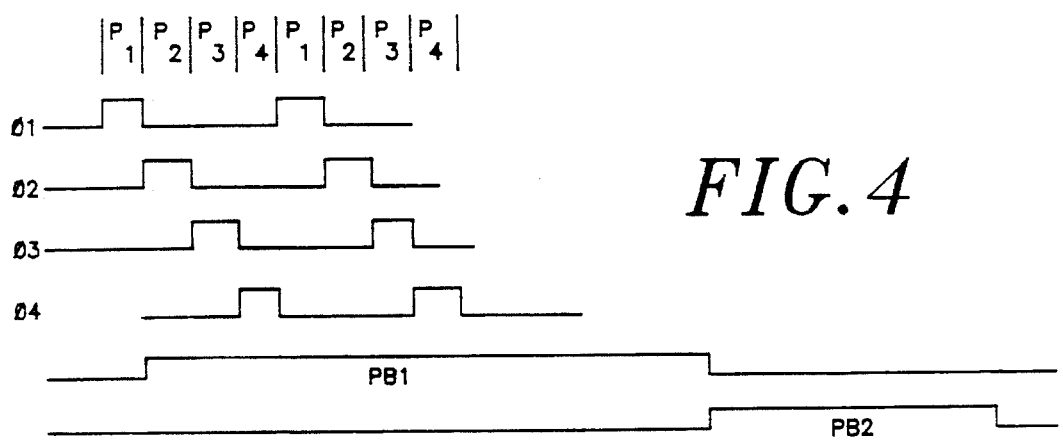
FIG. 4 is a timing diagram of four-phase clocks produced by a clock generator in the CPU of FIGS. 1 or 2 and used within the CPU, along with a timing diagram of the bus cycle and clocks used to define the bus cycle in the system of FIG. 1.

Referring to FIG. 4, a clock generator 30 in the CPU chip 10 of FIG. 1 generates four overlapping clocks Phi1, Phi2, Phi3, and Phi4 used to define four phases P1, P2, P3, and P4 of a machine cycle. In an example embodiment, the machine cycle is nominally 14 nsec, so the clocks Phi1, etc., are at about 71-MHz; alternatively, the machine cycle may be 10 nsec, in which case the clock frequency is 100 MHz. The bus 20 and system bus 11, however, operate on a bus cycle which is three times longer than the machine cycle of the CPU, so in this example the bus cycle, also shown in FIG. 4, is nominally 42 nsec (or, for 100 MHz clocking, the bus cycle would be 30 nsec). The bus cycle is likewise defined by four overlapping clocks Phi1, Phi2, Phi3, and Phi4 produced by the clock generator 30 serving to define four phases PB1, PB2, PB3 and PB4 of the bus cycle. The system bus 11, however, operates on a longer bus cycle of about twice as long as that of the bus 20, e.g., about 64-nsec, and this bus cycle is asynchronous to the CPU 10 and bus 20. The timing cycle of the system bus 11 is controlled by a clock generator 31 in the interface unit 21.

The CPU Chip

Figure 5:
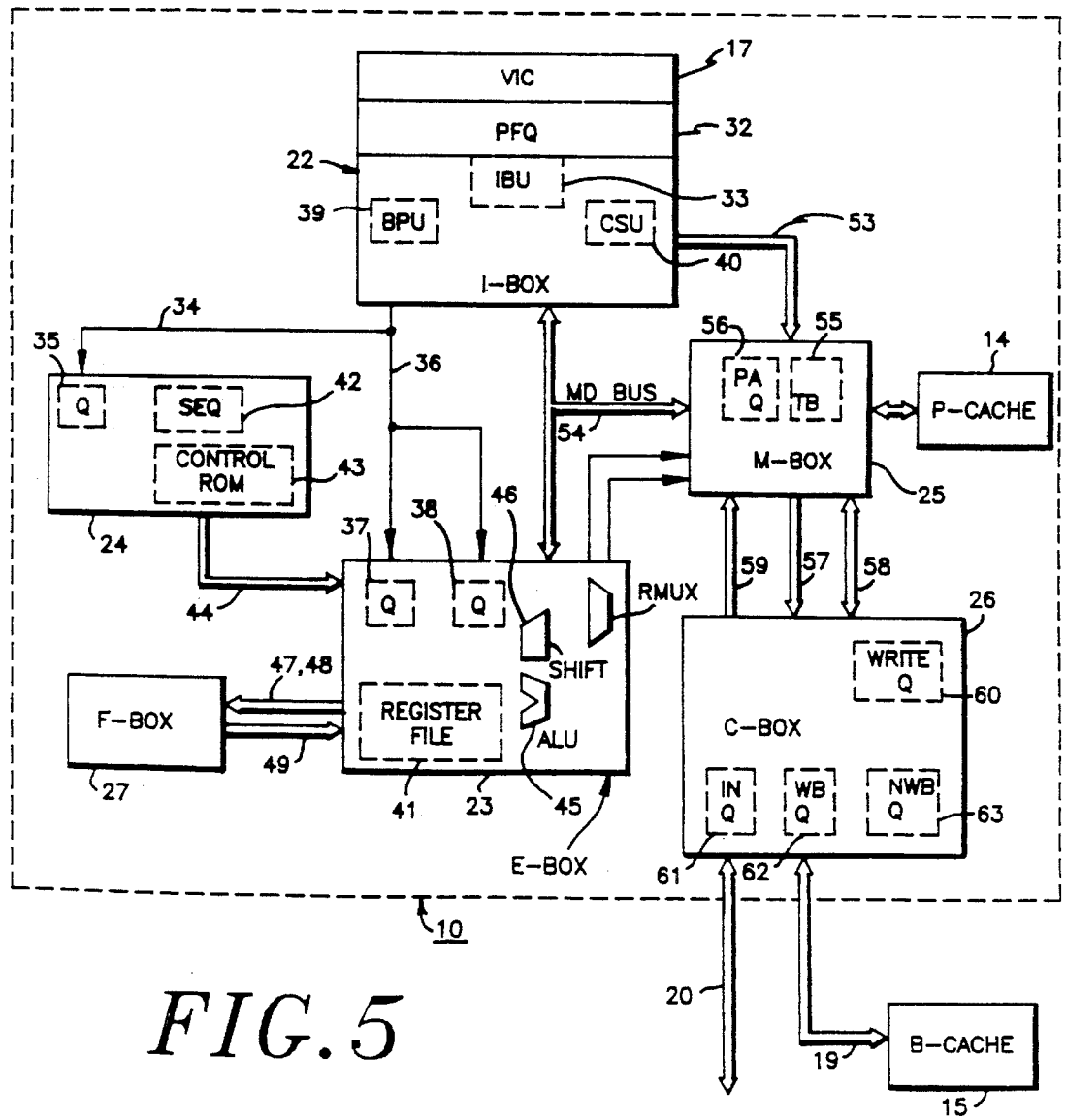
FIG. 5 is an electrical diagram in block form of the central processing unit (CPU) of the system of FIGS. 1 or 2.

Referring to FIG. 5, the internal construction of the CPU chip 10 is illustrated in general form. The instruction unit 22 includes the virtual instruction cache 17 which is a dedicated instruction-stream-only cache of 2 K byte size, in this example, storing the most recently used blocks of the instruction stream, using virtual addresses rather than physical addresses as are used for accessing the caches 14 and 15 and the main memory 12. That is, an address for accessing the virtual instruction cache 17 does not need address translation as is done in the memory management unit 25 for other memory references. Instructions are loaded from the instruction cache 17 to a prefetch queue 32 holding sixteen bytes. The instruction unit 22 has an instruction burst unit 33 which breaks an instruction into its component parts (opcode, operand specifiers, specifier extensions, etc.), decodes macroinstructions and parses operand specifiers, producing instruction control (such as dispatch addresses) which is sent by a bus 34 to an instruction queue 35 in the microinstruction controller 24. Information from the specifiers needed for accessing the operands is sent by a bus 36 to a source queue 37 and a destination queue 38 in the execution unit 23. The instruction unit 22 also includes a branch prediction unit 39 for predicting whether or not a conditional branch will be taken, and for directing the addressing sequence of the instruction stream accordingly. A complex specifier unit 40 in the instruction unit 22 is an auxiliary address processor (instead of using the ALU in the execution unit 23) for accessing the register file and otherwise producing the addresses for operands before an instruction is executed in the execution unit 23.

The execution unit 23 (under control of the microinstruction control unit 24) performs the actual "work" of the macroinstructions, implementing a four-stage micropipelined unit having the ability to stall and to trap. These elements dequeue the instruction and operand information provided by the instruction unit 22 via the queues 35, 37 and 38. For literal types of operands, the source queue 37 contains the actual operand value from the instruction, while for register or memory type operands the source queue 37 holds a pointer to the data in a register file 41 in the execution unit 23.

The microinstruction control unit 24 contains a microsequencer 42 functioning to determine the next microword to be fetched from a control store 43. The control store is a ROM or other memory of about 1600-word size producing a microcode word of, for example, 61-bits width, one each machine cycle, in response to an 11-bit address generated by the microsequencer 42. The microsequencer receives an 11-bit entry point address from the instruction unit 22 via the instruction queue 35 to begin a microroutine dictated by the macroinstruction. The microinstructions produced in each cycle by from the control store 43 are coupled to the execution unit 23 by a microinstruction bus 44.

The register file 41 contained in the execution unit 23 includes fifteen general purpose registers, a PC (program counter), six memory data registers, six temporary or working registers and ten state registers. The execution unit 23 also contains a 32-bit ALU 45 and a 64-bit shifter 46 to perform the operation commanded by the macroinstruction, as defined by the microinstructions received on the bus 44.

The floating point unit 27 receives 32- or 64-bit operands on two 32-bit buses 47 and 48 from the A and B inputs of the ALU 45 in the execution unit 23, and produces a result on a result bus 49 going back to the execution unit 23. The floating point unit 27 receives a command for the operation to be performed, but then executes this operation independently of the execution unit 23, signalling and delivering the operand when it is finished. As is true generally in the system of FIG. 1, the floating point unit 27 queues the result to be accepted by the execution unit 23 when ready. The floating point unit 27 executes floating point adds in two cycles, multiplies in two cycles and divides in seventeen to thirty machine cycles, depending upon the type of divide.

The output of the floating point unit 27 on bus 49 and the outputs of the ALU 45 and shifter 46 are merged (one is selected in each cycle) by a result multiplexer or Rmux 50 in the execution unit 23. The selected output from the Rmux is either written back to the register file 45, or is coupled to the memory management unit 25 by a write bus 51, and memory requests are applied to the memory management unit 25 from the execution unit 23 by a virtual address bus 52.

The memory management unit 25 receives read requests from the instruction unit 22 (both instruction stream and data stream) by a bus 53 and from the execution unit 23 (data stream only) via address bus 52. A memory data bus 54 delivers memory read data from the memory management unit 25 to either the instruction unit 22 (64-bits wide) or the execution unit 23 (32-bits wide). The memory management unit 25 also receives write/store requests from the execution unit 23 via write data bus 51, as well as invalidates, primary cache 14 fills and return data from the cache controller unit 26. The memory management unit 25 arbitrates between these requesters, and queues requests which cannot currently be handled. Once a request is started, the memory management unit 25 performs address translation, mapping virtual to physical addresses, using a translation buffer or address cache 55. This lookup in the address cache 55 takes one machine cycle if there are no misses. In the case of a miss in the TB 55, the memory management circuitry causes a page table entry to be read from page tables in memory and a TB fill performed to insert the address which missed. This memory management circuitry also performs all access checks to implement the page protection function, etc. The P-cache 14 referenced by the memory management unit 25 is a two-way set associative write-through cache with a block and fill size of 32-bytes. The P-cache state is maintained as a subset of the backup cache 15. The memory management unit 25 circuitry also ensures that specifier reads initiated by the instruction unit 22 are ordered correctly when the execution unit 23 stores this data in the register file 41; this ordering, referred to as "scoreboarding", is accomplished by a physical address queue 56 which is a small list of physical addresses having a pending execution unit 23 store. Memory requests received by the memory management unit 25 but for which a miss occurs in the primary cache 14 are sent to the cache controller unit 26 for execution by a physical address bus 57, and (for writes) a data bus 58. Invalidates are received by the memory management unit 25 from the cache controller unit 26 by an address bus 59, and fill data by the data bus 58.

The cache controller unit 26 is the controller for the backup cache 15, and interfaces to the external CPU bus 20. The cache controller unit 26 receives read requests and writes from the memory management unit 25 via physical address bus 57 and data bus 58, and sends primary cache 14 fills and invalidates to the memory management unit 25 via address bus 59 and data bus 58. The cache controller unit 26 ensures that the primary cache 14 is maintained as a subset of the backup cache 15 by the invalidates. The cache controller unit 26 receives cache coherency transactions from the bus 20, to which it responds with invalidates and writebacks, as appropriate. Cache coherence in the system of FIGS. 1 and 5 is based upon the concept of ownership; a hexaword (16-word) block of memory may be owned either by the memory 12 or by a backup cache 15 in a CPU on the bus 11—in a multiprocessor system, only one of the caches, or memory 12, may own the hexaword block at a given time, and this ownership is indicated by an ownership bit for each hexaword in both memory 12 and the backup cache 15 (1 for own, 0 for not-own). Both the tags and data for the backup cache 15 are stored in off-chip RAMs, with the size and access time selected as needed for the system requirements. The backup cache 15 may be of a size of from 128 K to 2 M bytes, for example. With access time of 28 nsec, the cache can be referenced in two machine cycles, assuming 14 nsec machine cycle for the CPU 10. The cache controller unit 26 packs sequential writes to the same quadword in order to minimize write accesses to the backup cache. Multiple write commands from the memory management unit 25 are held in an eight-word write queue 60. The cache controller unit 26 is also the interface to the multiplexed address/data bus 20, and an input data queue 61 loads fill data and writeback requests from the bus 20 to the CPU 10. A non-writeback queue 62 and a write-back queue 63 in the cache controller unit 26 hold read requests and writeback data, respectively, to be sent to the main memory 12 over the bus 20.

Pipelining in the CPU

Figure 6:
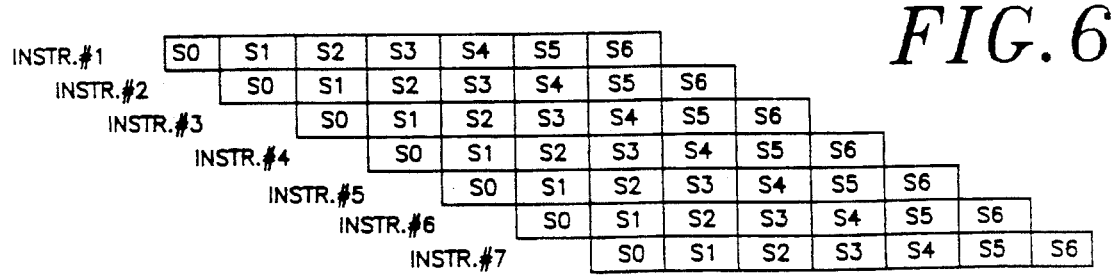
FIG. 6 is a timing diagram showing events occurring in the pipelined CPU 10 of FIG. 1 in successive machine cycles.

The CPU 10 is pipelined on a macroinstruction level. An instruction requires seven pipeline segments to finish execution, these being generally an instruction fetch segment S0, an instruction decode segment S1, an operand definition segment S2, a register file access segment S3, an ALU segment S4, an address translation segment S5, and a store segment S6, as seen in FIG. 6. In an ideal condition where there are no stalls, the overlap of sequential instructions #1 to #7 of FIG. 6 is complete, so during segment S6 of instruction #1 the S0 segment of instruction #7 executes, and the instructions #2 to #6 are in intermediate segments. When the instructions are in sequential locations (no jumps or branches), and the operands are either contained within the instruction stream or are in the register file 41 or in the primary cache 14, the CPU 10 can execute for periods of time in the ideal instruction-overlap situation as depicted in FIG. 6. However, when an operand is not in a register 43 or primary cache 14, and must be fetched from backup cache 15 or memory 12, or various other conditions exist, stalls are introduced and execution departs from the ideal condition of FIG. 6.

Figure 7:
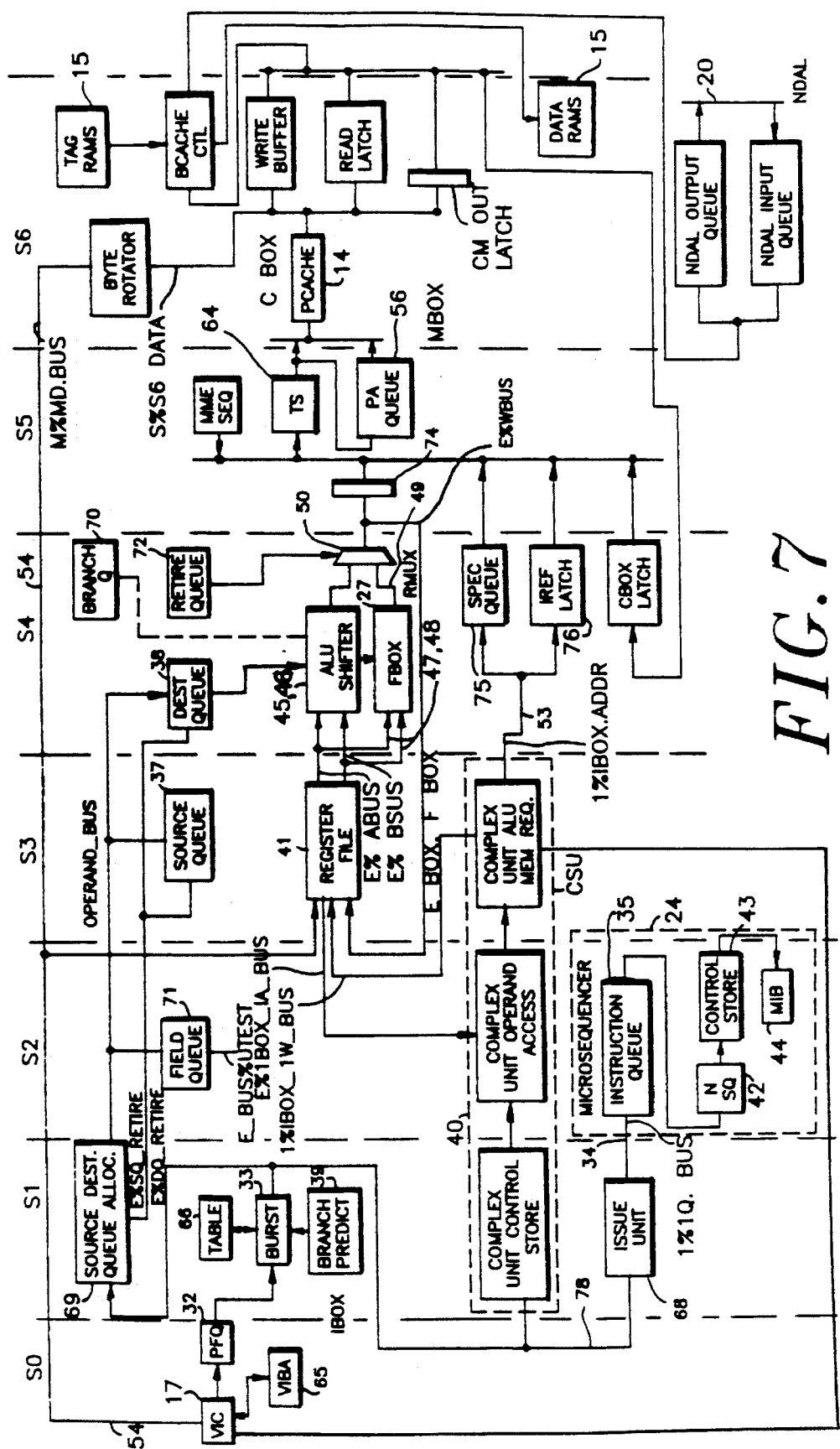
FIG. 7 is an electrical diagram in block form of the CPU of FIG. 1, arranged in time-sequential format, showing the pipelining of the CPU according to FIG. 6.

Referring to FIG. 7, the hardware components of each pipeline segment S0–S6 are shown for the CPU 10 in general form. It is understood that only macroinstruction pipeline segments are being referred to here; there is also micropipelining of operations in most of the segments, i.e., if more than one operation is required to process a macroinstruction, the multiple operations are also pipelined within a section.

If an instruction uses only operands already contained within the register file 41, or literals contained within the instruction stream itself, then it is seen from FIG. 7 that the instruction can execute in seven successive cycles, with no stalls. First, the flow of normal macroinstruction execution in the CPU 10 as represented in FIG. 7 will be described, then the conditions which will cause stalls and exceptions will be described.

Execution of macroinstructions in the pipeline of the CPU 10 is decomposed into many smaller steps which are implemented in various distributed sections of the chip. Because the CPU 10 implements a macroinstruction pipeline, each section is relatively autonomous, with queues inserted between the sections to normalize the processing rates of each section.

The instruction unit 22 fetches instruction stream data for the next instruction, decomposing the data into opcode and specifiers, and evaluating the specifiers with the goal of prefetching operands to support execution unit 23 execution of the instruction. These functions of the instruction unit 22 are distributed across segments S0 through S3 of the pipeline, with most of the work being done in S1. In S0, instruction stream data is fetched from the virtual instruction cache 17 using the address contained in the virtual instruction buffer address (VIBA) register 65. The data is written into the prefetch queue 32 and VIBA 65 is incremented to the next location. In segment S1, the prefetch queue 32 is read and the burst unit 33 uses internal state and the contents of a table 66 (a ROM and/or PLA to look up the instruction formats) to select from the bytes in queue 32 the next instruction stream component—either an opcode or specifier. Some instruction components take multiple cycles to burst; for example, a two-byte opcode, always starting with FDhex in the VAX instruction set, requires two burst cycles: one for the FD byte, and one for the second opcode byte. Similarly, indexed specifiers require at least two burst cycles: one for the index byte, and one or more for the base specifier.

When an opcode is decoded by the burst unit 33, the information is passed via bus 78 to an issue unit 68 which consults the table 66 for the initial address (entry point) in the control store 43 of the routine which will process the instruction. The issue unit 68 sends the address and other instruction-related information to the instruction queue 35 where it is held until the execution unit 23 reaches this instruction.

When a specifier is decoded, the information is passed via the bus 78 to the operand queue unit 69 for allocation to the source and destination queues 37 and 38 and, potentially, to the pipelined complex specifier unit 40. The operand queue unit 69 allocates the appropriate number of entries for the specifier in the source and destination queues 37 and 38 in the execution unit 23. These queues 37 and 38 contain pointers to operands and results. If the specifier is not a short literal or register specifier, these being referred to as simple specifiers, it is thus considered to be a complex specifier and is processed by the microcode-controlled complex specifier unit 40, which is distributed in segments S1 (control store access), S2 (operand access, including register file 41 read), and S3 (ALU 45 operation, memory management unit 25 request, GPR write) of the pipeline. The pipeline of the complex specifier unit 40 computes all specifier memory addresses, and makes the appropriate request to the memory management unit 25 for the specifier type. To avoid reading or writing a GPR which is interlocked by a pending execution unit 23 reference, the complex specifier unit 40 pipe includes a register scoreboard (SBU 81 in FIG. 8) which detects data dependencies. The pipeline of the complex specifier unit 40 also supplies to the execution unit 23 operand information that is not an explicit part of the instruction stream; for example, the PC is supplied as an implicit operand for instructions that require it.

During S1, the branch prediction unit 39 watches each opcode that is decoded looking for conditional and unconditional branches. For unconditional branches, the branch prediction unit 39 calculates the target PC and redirects PC and VIBA to the new path. For conditional branches, the branch prediction unit 39 predicts whether the instruction will branch or not based on previous history. If the prediction indicates that the branch will be taken, PC and VIBA are redirected to the new path. The branch prediction unit 39 writes the conditional branch prediction flag into a branch queue 70 in the execution unit 23, to be used by the execution unit 23 in the execution of the instruction. The branch prediction unit 39 maintains enough state to restore the correct instruction PC if the prediction turns out to be incorrect.

The microinstruction control unit 24 operates in segment S2 of the pipeline and functions to supply to the execution unit 23 the next microinstruction to execute. If a macroinstruction requires the execution of more than one microinstruction, the microinstruction control unit 24 supplies each microinstruction in sequence based on directive included in the previous microinstruction. At macroinstruction boundaries, the microinstruction control unit 24 removes the next entry from the instruction queue 35, which includes the initial microinstruction address for the macroinstruction. If the instruction queue 35 is empty, the microinstruction control unit 24 supplies the address of the no-op microinstruction. The microinstruction control unit 24 also evaluates all exception requests, and provides a pipeline flush control signal to the execution unit 23. For certain exceptions and interrupts, the microinstruction control unit 24 injects the address of an appropriate microinstruction handler that is used to respond to the event.

The execution unit 23 executes all of the non-floating point instructions, delivers operands to and receives results from the floating point unit 27 via buses 47, 48 and 49, and handles non-instruction events such as interrupts and exceptions. The execution unit 23 is distributed through segments S3, S4 and S5 of the pipeline; S3 includes operand access, including read of the register file 41; S4 includes ALU 45 and shifter 46 operation, RMUX 50 request; and S5 includes RMUX 50 completion, write to register file 41, completion of memory management unit 25 request. For the most part, instruction operands are prefetched by the instruction unit 22, and addressed indirectly through the source queue 37. The source queue 37 contains the operand itself for short literal specifiers, and a pointer to an entry in the register file 41 for other operand types.

An entry in a field queue 71 is made when a field-type specifier entry is made into the source queue 37. The field queue 71 provides microbranch conditions that allow the microinstruction control unit 42 to determine if a field-type specifier addresses either a GPR or memory. A microbranch on a valid field queue entry retires the entry from the queue.

The register file 41 is divided into four parts: the general processor registers (GPRs), memory data (MD) registers, working registers, and CPU state registers. For a register-mode specifier, the source queue 37 points to the appropriate GPR in the register file 41, or for short literal mode the queue contains the operand itself; for the other specifier modes, the source queue 37 points to an MD register containing the address of the specifier (or address of the address of the operand, etc.). The MD Register is either written directly by the instruction unit 22, or by the memory management unit 25 as the result of a memory read generated by the instruction unit 22.

In the S3 segment of the execution unit 23 pipeline, the appropriate operands for the execution unit 23 and floating point unit 27 execution of instructions are selected. Operands are selected onto ABUS and BBUS for use in both the execution unit 23 and floating point unit 27. In most instances, these operands come from the register file 41, although there are other data path sources of non-instruction operands (such as the program status long-word PSL).

The execution unit 23 computation is done by the ALU 45 and the shifter 46 in the S4 segment of the pipeline on operands supplied by the S3 segment. Control of these units is supplied by the microinstruction which was originally supplied to the S3 segment by the control store 43, and then subsequently moved forward in the microinstruction pipeline.

The S4 segment also contains the Rmux 50 which selects results from either the execution unit 23 or floating point unit 27 and performs the appropriate register or memory operation. The Rmux inputs come from the ALU 45, shifter 46, and floating point unit 27 result bus 49 at the end of the cycle. The Rmux 50 actually spans the S4/S5 boundary such that its outputs are valid at the beginning of the S5 segment. The Rmux 50 is controlled by the retire queue 72, which specifies the source (either execution unit 23 or floating point unit 27) of the result to be processed (or retired) next. Non-selected Rmux sources are delayed until the retire queue 72 indicates that they should be processed. The retire queue 72 is updated from the order of operations in the instructions of the instruction stream.

As the source queue 37 points to instruction operands, so the destination queue 38 points to the destination for instruction results. If the result is to be stored in a GPR, the destination queue 38 contains a pointer to the appropriate GPR. If the result is to be stored in memory, the destination queue 38 indicates that a request is to be made to the memory management unit 25, which contains the physical address of the result in the PA queue 56. This information is supplied as a control input to the Rmux 50 logic.

Once the Rmux 50 selects the appropriate source of result information, it either requests memory management unit 25 service, or sends the result onto the write bus 73 to be written back the register file 41 or to other data path registers in the S5 segment of the pipeline. The interface between the execution unit 23 and memory management unit 25 for all memory requests is the EM-latch 74, which contains control information and may contain an address, data, or both, depending on the type of request. In addition to operands and results that are prefetched by the instruction unit 22, the execution unit 23 can also make explicit memory requests to the memory management unit 25 to read or write data.

The floating point unit 27 executes all of the floating point instructions in the instruction set, as well as the longword-length integer multiply instructions. For each instruction that the floating point unit 27 is to execute, it receives from the microinstruction control unit 24 the opcode and other instruction-related information. The floating point unit 27 receives operand data from the execution unit 23 on buses 47 and 48. Execution of instructions is performed in a dedicated floating point unit 27 pipeline that appears in segment S4 of FIG. 7, but is actually a minimum of three cycles in length. Certain instructions, such as integer multiply, may require multiple passes through some segments of the floating point unit 27 pipeline. Other instructions, such as divide, are not pipelined at all. The floating point unit 27 results and status are returned in S4 via result bus 49 to the Rmux 50 in the execution unit 23 for retirement. When an Fbox instruction is next to retire as defined by the retire queue 72, the Rmux 50, as directed by the destination queue 38, sends the results to either the GPRs for register destinations, or to the memory management unit 25 for memory destinations.

The memory management unit 25 operates in the S5 and S6 segments of the pipeline, and handles all memory references initiated by the other sections of the chip. Requests to the memory management unit 25 can come from the instruction unit 22 (for virtual instruction cache 17 fills and for specifier references), from the execution unit 23 or floating point unit 27 via the Rmux 50 and the EM-latch 74 (for instruction result stores and for explicit execution unit 23 memory request), from the memory management unit 25 itself (for translation buffer fills and PTE reads), or from the cache controller unit 26 (for invalidates and cache fills). All virtual references are translated to a physical address by the TB or translation buffer 64, which operates in the S5 segment of the pipeline. For instruction result references generated by the instruction unit 22, the translated address is stored in the physical address queue 56 (PA queue). These addresses are later matched with data from the execution unit 23 or floating point unit 27, when the result is calculated.

The cache controller unit 26 maintains and accesses the backup cache 15, and controls the off-chip bus (the CPU bus 20). The cache controller unit 26 receives input (memory requests) from the memory management unit 25 in the S6 segment of the pipeline, and usually takes multiple cycles to complete a request. For this reason, the cache controller unit 26 is not shown in specific pipeline segments. If the memory read misses in the Primary cache 14, the request is sent to the cache controller unit 26 for processing. The cache controller unit 26 first looks for the data in the Backup cache 15 and fills the block in the Primary cache 14 from the Backup cache 15 if the data is present. If the data is not present in the Backup cache 15, the cache controller unit 26 requests a cache fill on the CPU bus 20 from memory 12. When memory 12 returns the data, it is written to both the Backup cache 15 and to the Primary cache 14 (and potentially to the virtual instruction cache 17). Although Primary cache 14 fills are done by making a request to the memory management unit 25 pipeline, data is returned to the original requester as quickly as possible by driving data directly onto the data bus 75 and from there onto the memory data bus 54 as soon as the bus is free.

Despite the attempts at keeping the pipeline of FIG. 6 flowing smoothly, there are conditions which cause segments of the pipeline to stall. Conceptually, each segment of the pipeline can be considered as a black box which performs three steps every cycle:

(1) The task appropriate to the pipeline segment is performed, using control and inputs from the previous pipeline segment. The segment then updates local state (within the segment), but not global state (outside of the segment).

(2) Just before the end of the cycle, all segments send stall conditions to the appropriate state sequencer for that segment, which evaluates the conditions and determines which, if any, pipeline segments must stall.

(3) If no stall conditions exist for a pipeline segment, the state sequencer allows it to pass results to the next segment and accept results from the previous segment. This is accomplished by updating global state.

The sequence of steps maximizes throughout by allowing each pipeline segment to assume that a stall will not occur (which should be the common case). If a stall does occur at the end of the cycle, global state updates are blocked, and the stalled segment repeats the same task (with potentially different inputs) in the next cycle (and the next, and the next) until the stall condition is removed. This description is over-simplified in some cases because some global state must be updated by a segment before the stall condition is known. Also, some tasks must be performed by a segment once and only once. These are treated specially on a case-by-case basis in each segment.

Within a particular section of the chip, a stall in one pipeline segment also causes stalls in all upstream segments (those that occur earlier in the pipeline) of the pipeline. Unlike the system of U.S. Pat. No. 4,875,160, stalls in one segment of the pipeline do not cause stalls in downstream segments of the pipeline. For example, a memory data stall in that system also caused a stall of the downstream ALU segment. In the CPU 10, a memory data stall does not stall the ALU segment (a no-op is inserted into the S5 segment when S4 advances to S5).

There are a number of stall conditions in the chip which result in a pipeline stall. Each is discussed briefly below.

In the S0 and S1 segments of the pipeline, stalls can occur only in the instruction unit 22. In S0, there is only one stall that can occur:

(1) Prefetch queue 32 full: In normal operation, the virtual instruction cache 17 is accessed every cycle using the address in VIBA 65, the data is sent to the prefetch queue 32, and VIBA 65 is incremented. If the prefetch queue 32 is full, the increment of VIBA is blocked, and the data is re-referenced in the virtual instruction cache 17 each cycle until there is room for it in the prefetch queue 32. At that point, prefetch resumes.

In the S1 segment of the pipeline there are seven stalls that can occur in the instruction unit 22:

(1) Insufficient data in the prefetch queue 32: The burst unit 33 attempts to decode the next instruction component each cycle. If there are insufficient prefetch queue 32 bytes valid to decode the entire component, the burst unit 33 stalls until the required bytes are delivered from the virtual instruction cache 17.

(2) Source queue 37 or destination queue 38 full: During specifier decoding, the source and destination queue allocation logic must allocate enough entries in each queue to satisfy the requirements of the specifier being parsed. To guarantee that there will be sufficient resources available, there must be at least two free source queue entries and two free destination queue entries to complete the burst of the specifier. If there are insufficient free entries in either queue, the burst unit 33 stalls until free entries become available.

(3) MD file full: When a complex specifier is decoded, the source queue 37 allocation logic must allocate enough memory data registers in the register file 41 to satisfy the requirements of the specifier being parsed. To guarantee that there will be sufficient resources available, there must be at least two free memory data registers available in the register file 41 to complete the burst of the specifier. If there are insufficient free registers, the burst unit 33 stalls until enough memory data registers become available.

(4) Second conditional branch decoded: The branch prediction unit 39 predicts the path that each conditional branch will take and redirects the instruction stream based on that prediction. It retains sufficient state to restore the alternate path if the prediction was wrong. If a second conditional branch is decoded before the first is resolved by the execution unit 23, the branch prediction unit 39 has nowhere to store the state, so the burst unit 33 stalls until the execution unit 23 resolves the actual direction of the first branch.

(5) Instruction queue full: When a new opcode is decoded by the burst unit 33, the issue unit 68 attempts to add an entry for the instruction to the instruction queue 35. If there are no free entries to the instruction queue 35, the burst unit 33 stalls until a free entry becomes available, which occurs when an instruction is retired through the Rmux 50.

(6) Complex specifier unit busy: If the burst unit 33 decodes an instruction component that must be processed by the pipeline of the complex specifier unit 40, it makes a request for service by the complex specifier unit 40 through an S1 request latch. If this latch is still valid from a previous request for service (either due to a multi-cycle flow or a complex specifier unit 40 stall), the burst unit 33 stalls until the valid bit in the request latch is cleared.

(7) Immediate data length not available: The length of the specifier extension for immediate specifiers is dependent on the data length of the specifier for that specific instruction. The data length information comes from the instruction ROM/PLA table 66 which is accessed based on the opcode of the instruction. If the table 66 access is not complete before an immediate specifier is decoded (which would have to be the first specifier of the instruction), the burst unit 33 stalls for one cycle.

In the S2 segment of the pipeline, stalls can occur in the instruction unit 22 or microcode controller 24. In the instruction unit 22 two stalls can occur:

(1) Outstanding execution unit 23 or floating point unit 27 GPR write: In order to calculate certain specifier memory addresses, the complex specifier unit 40 must read the contents of a GPR from the register file 41. If there is a pending execution unit 23 or floating point unit 27 write to the register, the instruction unit 22 GPR scoreboard (81 in FIG. 8) prevents the GPR read by stalling the S2 segment of the pipeline of the complex specifier unit 40. The stall continues until the GPR write completes.

(2) Memory data not valid: For certain operations, the instruction unit 22 makes a memory management unit 25 request to return data which is used to complete the operation (e.g., the read done for the indirect address of a displacement deferred specifier). The instruction unit 22 MD register contains a valid bit which is cleared when a request is made, and set when data returns in response to the request. If the instruction unit 22 references the instruction unit 22 MD register when the valid bit is off, the S2 segment of the pipeline of the complex specifier unit 40 stalls until the data is returned by the memory management unit 25.

In the microcode controller 24, one stall can occur during the S2 segment:

(1) Instruction queue empty: The final microinstruction of an execution flow of a macroinstruction is indicated in the execution unit 23 when a last-cycle microinstruction is decoded by the microinstruction control unit 24. In response to this event, the execution unit 23 expects to receive the first microinstruction of the next macroinstruction flow based on the initial address in the instruction queue 35. If the instruction queue 35 is empty, the microinstruction control unit 24 supplies the instruction queue stall microinstruction in place of the next macroinstruction flow. In effect, this stalls the microinstruction control unit 24 for one cycle.

In the S3 segment of the pipeline, stalls can occur in the instruction unit 22, in the execution unit 23 or in either execution unit 23 or instruction unit 22. In the instruction unit 22, there are three possible S3 stalls:

(1) Outstanding execution unit 23 GPR read: In order to complete the processing for auto-increment, auto-decrement, and auto-increment deferred specifiers, the complex specifier unit 40 must update the GPR with the new value. If there is a pending execution unit 23 read to the register through the source queue 37, the instruction unit 22 scoreboard prevents the GPR write by stalling the S3 segment of the pipeline of the complex specifier unit 40. The stall continues until the execution unit 23 reads the GPR.

(2) Specifier queue full: For most complex specifiers, the complex specifier unit 40 makes a request for memory management unit 25 service for the memory request required by the specifier. If there are no free entries in a specifier queue 75, the S3 segment of the pipeline of the complex specifier unit 40 stalls until a free entry becomes available.

(3) RLOG full: Auto-increment, auto-decrement, and auto-increment deferred specifiers require a free register log (RLOG 94 in FIG. 8) entry in which to log the change to the GPR. If there are no free RLOG entries when such a specifier is decoded, the S3 segment of the pipeline of the complex specifier unit 40 stalls until a free entry becomes available.

In the execution unit 23, four stalls can occur in the S3 segment:

(1) Memory read data not valid: In some instances, the execution unit 23 may make an explicit read request to the memory management unit 25 to return data in one of the six execution unit 23 working registers in the register file 41. When the request is made, the valid bit on the register is cleared. When the data is written to the register, the valid bit is set. If the execution unit 23 references the working register in the register file 41 when the valid bit is clear, the S3 segment of the execution unit 23 pipeline stalls until the entry becomes valid.

(2) Field queue not valid: For each macroinstruction that includes a field-type specifier, the microcode microbranches on the first entry in the field queue 71 to determine whether the field specifier addresses a GPR or memory. If the execution unit 23 references the working register when the valid bit is clear, the S3 segment of the execution unit 23 pipeline stalls until the entry becomes valid.

(3) Outstanding Fbox GPR write: Because the floating point unit 27 computation pipeline is multiple cycles long, the execution unit 23 may start to process subsequent instructions before the floating point unit 27 completes the first. If the floating point unit 27 instruction result is destined for a GPR in the register file 41 that is referenced by a subsequent execution unit 23 microword, the S3 segment of the execution unit 23 pipeline stalls until the floating point unit 27 write to the GPR occurs.

(4) Fbox instruction queue full: When an instruction is issued to the floating point unit 27, an entry is added to the floating point unit 27 instruction queue. If there are no free entries in the queue, the S3 segment of the execution unit 23 pipeline stalls until a free entry becomes available.

Two stalls can occur in either execution unit 23 or floating point unit 27 in S3:

(1) Source queue empty: Most instruction operands are prefetched by the instruction unit 22, which writes a pointer to the operand value into the source queue 37. The execution unit 23 then references up to two operands per cycle indirectly through the source queue 37 for delivery to the execution unit 23 or floating point unit 27. If either of the source queue entries referenced is not valid, the S3 segment of the execution unit 23 pipeline stalls until the entry becomes valid.

(2) Memory operand not valid: Memory operands are prefetched by the instruction unit 22, and the data is written by the either the memory management unit 25 or instruction unit 22 into the memory data registers in the register file 41. If a referenced source queue 37 entry points to a memory data register which is not valid, the S3 segment of the execution unit 23 pipeline stalls until the entry becomes valid.

In segment S4 of the pipeline, two stalls can occur in the execution unit 23, one in the floating point unit 27, and four in either execution unit 23 or floating point unit 27. In the execution unit 23:

(1) Branch queue empty: When a conditional or unconditional branch is decoded by the instruction unit 22, an entry is added to the branch queue 70. For conditional branch instructions, the entry indicates the instruction unit 22 prediction of the branch direction. The branch queue is referenced by the execution unit 23 to verify that the branch displacement was valid, and to compare the actual branch direction with the prediction. If the branch queue entry has not yet been made by the instruction unit 22, the S4 segment of the execution unit 23 pipeline stalls until the entry is made.

(2) Fbox GPR operand scoreboard full: The execution unit 23 implements a register scoreboard to prevent the execution unit 23 from reading a GPR to which there is an outstanding write by the floating point unit 27. For each floating point unit 27 instruction which will write a GPR result, the execution unit 23 adds an entry to the floating point unit 27 GPR scoreboard. If the scoreboard is full when the execution unit 23 attempts to add an entry, the S4 segment of the execution unit 23 pipeline stalls until a free entry becomes available.

In the floating point unit 27, one stall can occur in S4:

(1) Fbox operand not valid: Instructions are issued to the floating point unit 27 when the opcode is removed from the instruction 35 queue by the microinstruction control unit 24. Operands for the instruction may not arrive via busses 47, 48 until some time later. If the floating point unit 27 attempts to start the instruction execution when the operands are not yet valid, the floating point unit 27 pipeline stalls until the operands become valid.

In either the execution unit 23 or floating point unit 27, these four stalls can occur in pipeline segment S4:

(1) Destination queue empty: Destination specifiers for instructions are processed by the instruction unit 22, which writes a pointer to the destination (either GPR or memory) into the destination queue 38. The destination queue 38 is referenced in two cases: When the execution unit 23 or floating point unit 27 store instruction results via the Rmux 50, and when the execution unit 23 tries to add the destination of floating point unit 27 instructions to the execution unit 23 GPR scoreboard. If the destination queue entry is not valid (as would be the case if the instruction unit 22 has not completed processing the destination specifier), a stall occurs until the entry becomes valid.

(2) PA queue empty: For memory destination specifiers, the instruction unit 22 sends the virtual address of the destination to the memory management unit 25, which translates it and adds the physical address to the PA queue 56. If the destination queue 38 indicates that an instruction result is to be written to memory, a store request is made to the memory management unit 25 which supplies the data for the result. The memory management unit 25 matches the data with the first address in the PA queue 56 and performs the write. If the PA queue is not valid when the execution unit 23 or floating point unit 27 has a memory result ready, the Rmux 50 stalls until the entry becomes valid. As a result, the source of the Rmux input (execution unit 23 or floating point unit 27) also stalls.

(3) EM-latch full: All implicit and explicit memory requests made by the execution unit 23 or floating point unit 27 pass through the EM-latch 74 to the memory management unit 25. If the memory management unit 25 is still processing the previous request when a new request is made, the Rmux 30 stalls until the previous request is completed. As a result, the source of the Rmux 50 input (execution unit 23 or floating point unit 27) also stalls.

(4) Rmux selected to other source: Macroinstructions must be completed in the order in which they appear in the instruction stream. The execution unit 23 retire queue 72 determines whether the next instruction to complete comes from the execution unit 23 or the floating point unit 27. If the next instruction should come from one source and the other makes a Rmux 50 request, the other source stalls until the retire queue indicates that the next instruction should come from that source.

In addition to stalls, pipeline flow can depart from the ideal by "exceptions". A pipeline exception occurs when a segment of the pipeline detects an event which requires that the normal flow of the pipeline be stopped in favor of another flow. There are two fundamental types of pipeline exceptions: those that resume the original pipeline flow once the exception is corrected, and those that require the intervention of the operating system. A miss in the translation buffer 55 on a memory reference is an example of the first type, and an access control (memory protection) violation is an example of the second type.

Restartable exceptions are handled entirely within the confines of the section that detected the event. Other exceptions must be reported to the execution unit 23 for processing. Because the CPU 10 is macropipelined, exceptions can be detected by sections of the pipeline long before the instruction which caused the exception is actually executed by the execution unit 23 or floating point unit 27. However, the reporting of the exception is deferred until the instruction is executed by the execution unit 23 or floating point unit 27. At that point, an execution unit 23 handler is invoked to process the event.

Because the execution unit 23 and floating point unit 27 are micropipelined, the point at which an exception handler is invoked must be carefully controlled. For example, three macroinstructions may be in execution in segments S3, S4 and S5 of the execution unit 23 pipeline. If an exception is reported for the macroinstruction in the S3 segment, the two macroinstructions that are in the S4 and S5 segments must be allowed to complete before the exception handler is invoked.

Figure 8:
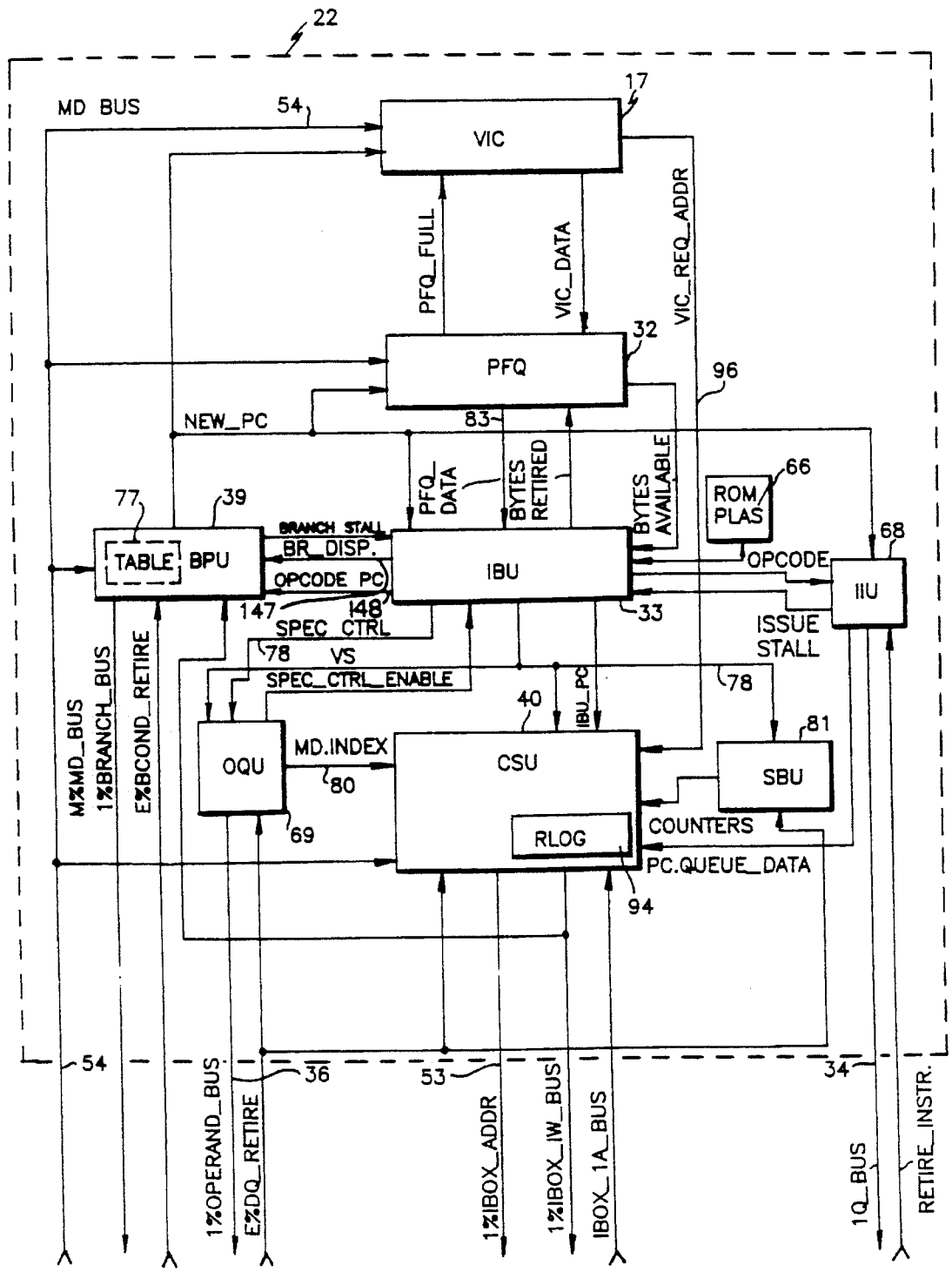
FIG. 8 is an electrical diagram in block form of the instruction unit of the CPU of FIG. 1.

To accomplish this, the S4/S5 boundary in the execution unit 23 is defined to be the commit point for a microinstruction. Architectural state is not modified before the beginning of the S5 segment of the pipeline, unless there is some mechanism for restoring the original state if an exception is detected (the instruction unit 22 RLOG 94 shown in FIG. 8 is an example of such a mechanism.) Exception reporting is deferred until the microinstruction to which the event belongs attempts to cross the S4/S5 boundary. At that point, the exception is reported and an exception handler is invoked. By deferring exception reporting to this point, the previous microinstruction (which may belong to the previous macroinstruction) is allowed to complete.

Most exceptions are reported by requesting a microtrap from the microinstruction control unit 24. When the microinstruction control unit 24 receives a microtrap request, it causes the execution unit 23 to break all its stalls, aborts the execution unit 23 pipeline, and injects the address of a handler for the event into an address latch for the control store 43. This starts an execution unit 23 microcode routine which will process the exception as appropriate. Certain other kinds of exceptions are reported by simply injecting the appropriate handler address into the control store 43 at the appropriate point.

In the CPU 10 exceptions are of two types: faults and traps. For both types, the microcode handler for the exception causes the instruction unit 22 to back out all GPR modifications that are in the RLOG (94 in FIG. 8), and retrieves the PC from the PC queue. For faults, the PC returned is the PC of the opcode of the instruction which caused the exception. For traps, the PC returned is the PC of the opcode of the next instruction to execute. The microcode then constructs the appropriate exception frame on the stack, and dispatches to the operating system through an appropriate vector.

The Instruction Unit (I-box)

The instruction unit 22 functions to fetch, parse and process the instruction stream, attempting to maintain a constant supply of parsed macroinstructions available to the execution unit 23 for execution. The pipelined construction of the CPU 10 allows multiple macroinstructions to reside within the CPU at various stages of execution, as illustrated in FIG. 6. The instruction unit 22, running semi-autonomously to the execution unit 23, parses the macroinstructions following the instruction that is currently executing in the execution unit 23. Improved performance is obtained when the time for parsing in the instruction unit 22 is hidden during the execution time in the execution unit 23 of an earlier instruction. The instruction unit 22 places into the queues 35, 37 and 38 the information generated while parsing ahead in the instruction stream. The instruction queue 35 contains instruction-specific information including the opcode (one or two bytes), a flag indicating floating point instruction, and an entry point for the microinstruction sequencer 42. The source queue 37 contains information about each one of the source operands for the instructions in the instruction queue 35, including either the actual operand (as in a short literal contained in the instruction stream itself) or a pointer to the location of the operand. The destination queue 38 contains information required for the execution unit 23 to select the location for storage of the results of execution. These three queues allow the instruction unit 22 to work in parallel with the execution unit 23; as the execution unit 23 consumes the entries in the queues, the instruction unit 22 parses ahead adding more—in the ideal case, the instruction unit 22 would stay far enough ahead of the execution unit 23 such that the execution unit 23 would never have to stall because of an empty queue.

Referring to FIG. 8, the instruction unit 22 is shown in more detail. The instruction unit 22 needs access to memory for instruction and operand data; requests for this data are made by the instruction unit 22 through a common port, read-request bus 53, sending addresses to the memory management unit 25. All data for both the instruction unit 22 and execution unit 23 is returned on the shared memory data bus 54. The memory management unit 25 contains queues to smooth the memory request traffic over time. A specifier request latch or spec-queue (75 in FIG. 7) holds requests from the instruction unit 22 for operand data, and the instruction request latch or I-ref latch (76 in FIG. 7) holds requests from the instruction unit 22 for instruction stream data; these two latches allow the instruction unit 22 to issue memory requests via bus 53 for both instruction and operand data even though the memory management unit 25 may be processing other requests.

The instruction unit 22 supports four main functions: instruction stream prefetching, instruction parsing, operand specifier processing and branch prediction. Instruction stream prefetching operates to provide a steady source of instruction stream data for instruction parsing. While the instruction parsing circuitry works on one instruction, the instruction prefetching circuitry fetches several instructions ahead. The instruction parsing function parses the incoming instruction stream, identifying and beginning the processing of each of the instruction's components—opcode, specifiers, etc. Opcodes and associated information are passed directly into the instruction queue (35 in FIG. 7) via bus 36. Operand specifier information is passed on to the circuitry which locates the operands in register file 41, in memory (cache or memory 12), or in the instruction stream (literals), and places the information in the source and destination queues (37 and 38 in FIG. 7) and makes the needed memory requests via bus 53 and spec-queue (75 in FIG. 7). When a conditional branch instruction is encountered, the condition is not known until the instruction reaches the execution unit 23 and all of the condition codes are available, so when in the instruction unit 22 it is not known whether the branch will be taken or not taken. For this reason, branch prediction circuitry 39 is employed to select the instruction stream path to follow when each conditional branch is encountered. A branch history table 77 is maintained for every conditional branch instruction of the instruction set, with entries for the last four occurrences of each conditional branch indicating whether the branch was taken or not taken. Based upon this history table 77, a prediction circuit 78 generates a "take" or "not take" decision when a conditional branch instruction is reached, and begins a fetch of the new address, flushing the instructions already being fetched or in the instruction cache if the branch is to be taken. Then, after the instruction is executed in the execution unit 23, the actual take or not take decision is updated in the history table 77.

The spec-control bus 78 is applied to a complex specifier unit 40, which is itself a processor containing a microsequencer and an ALU and functioning to manipulate the contents of registers in the register file 45 and access memory via the memory data bus 54 to produce the operands subsequently needed by the execution unit to carry out the macroinstruction. The complex specifier unit 40 includes the RLOG 94 into which the complex specifier unit records the changes it makes to the contents of the registers in the register file 45. When a macroinstruction is flushed from the pipeline due to an exception or an incorrect branch prediction, the changes contained in the RLOG 94 are used to restore the contents of the registers in the register file 45 to their initial values existing before the pre-processing of the macroinstruction by the complex specifier unit 40.

The spec-control bus 78 is also applied to an operand queue unit 69 which handles "simple" operand specifiers by passing the specifiers to the source and destination queues 37 and 38 via bus 36; these simple operands include literals (the operand is present in the instruction itself) or register mode specifiers which contain a pointer to one of the registers of the register file 41. For complex specifiers the operand queue unit 69 sends an index on a bus 80 to the complex specifier unit 40 to define the first one of the memory data registers of the register file 41 to be used as a destination by the complex specifier unit 40 in calculating the specifier value. The operand queue unit 69 can send up to two source queue 37 entries and two destination queue entries by the bus 36 in a single cycle. The spec-control bus 78 is further coupled to a scoreboard unit 81 which keeps track of the number of outstanding references to general purpose registers in the register file 41 contained in the source and destination queues 37 and 38; the purpose is to prevent writing to a register to which there is an outstanding read, or reading from a register for which there is an outstanding write. When a specifier is retired, the execution unit 23 sends information on which register to retire by bus 82 going to the complex specifier unit 40, the operand queue unit 79 and the scoreboard unit 81. The content of the spec-control bus 78 for each specifier includes the following: identification of the type of specifier; data if the specifier is a short literal; the access type and data length of the specifier; indication if it is a complex specifier; a dispatch address for the control ROM in the complex specifier unit 40. The instruction burst unit 33 derives this information from a new opcode accepted from the prefetch queue 32 via lines 83, which produces the following information: the number of specifiers for this instruction; identification of a branch displacement and its size, access type and data length for each one of up to six specifiers, indication if this is a floating point unit 27 instruction, and dispatch address for the microsequencer control ROM (43 in FIG. 7), etc. Each cycle, the instruction burst unit 33 evaluates the following information to determine if an operand specifier is available and how many prefetch queue 32 bytes should be retired to get to the next opcode or specifier: (1) the number of prefetch queue 32 bytes available, as indicated by a value of 1-to-6 provided by the prefetch queue 32; (2) the number of specifiers left to be parsed in the instruction stream for this instruction, based on a running count kept by the instruction burst unit 33 for the current instruction; (3) the data length of the next specifier; (4) whether the complex specifier unit 40 (if being used for this instruction) is busy; (5) whether data-length information is available yet from the table 66; etc.

Some instructions have one- or two-byte branch displacements, indicated from opcode-derived outputs from the table 66. The branch displacement is always the last piece of data for an instruction and is used by the branch prediction unit 39 to compute the branch destination, being sent to the unit 39 via busses 22bs and 22bq. A branch displacement is processed if the following conditions are met: (1) there are no specifiers left to be processed; (2) the required number of bytes (one or two) is available in the prefetch queue 32, (3) branch-stall is not asserted, which occurs when a second conditional branch is received before the first one is cleared.

Figure 9:
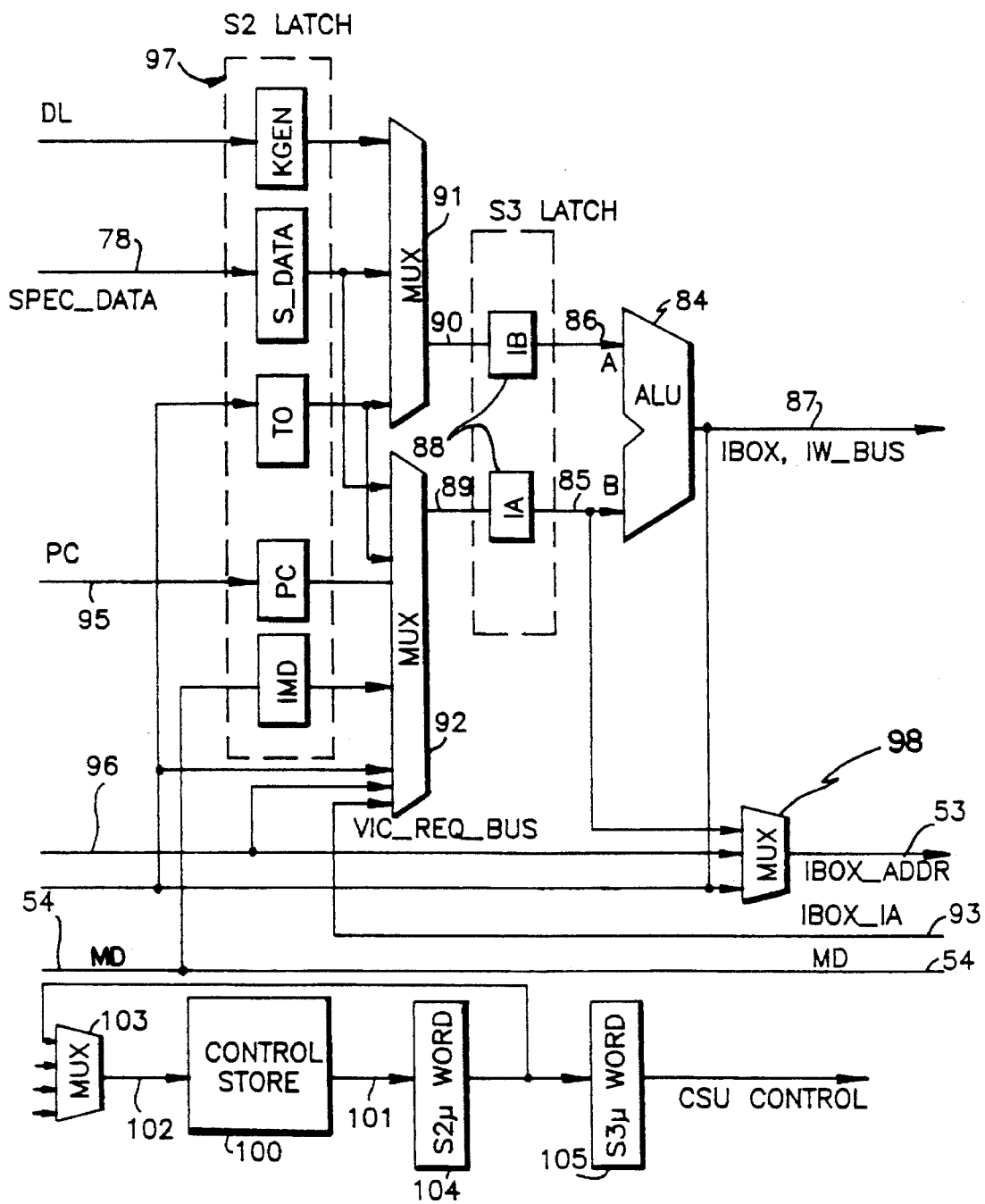
FIG. 9 is an electrical diagram in block form of the complex specifier unit used in the CPU of FIG. 1.

Referring to FIG. 9, the complex specifier unit 40 is shown in more detail. The complex specifier unit 40 is a three-stage (S1, S2, S3) microcoded pipeline dedicated to handling operand specifiers which require complex processing and/or access to memory. It has read and write access to the register file 41 and a port to the memory management unit 25. Memory requests are received by the complex specifier unit 40 and forwarded to the memory management unit 25 when there is a cycle free of specifier memory requests; i.e., operand requests for the current instructions are attempted to be completed before new instructions are fetched. The complex specifier unit 40 contains an ALU 84 which has A and B input busses 85 and 86, and has an output bus 87 writing to the register file 41 in the execution unit 23; all of these data paths are 32-bit. The A and B inputs are latched in S3 latches 88, which are driven during S2 by outputs 89 and 90 from selectors 91 and 92. These selectors receive data from the spec-data bus 78, from the memory data bus 54, from the register file 41 via bus 93, the output bus 87 of the ALU 84, the PC via line 95, the virtual instruction cache 17 request bus 96, etc. Some of these are latched in S2 latches 97. The instruction unit 22 address output 53 is produced by a selector 98 receiving the ALU output 87, the virtual instruction cache 17 request 96 and the A bus 85. The operations performed in the ALU 84 and the selections made by the selectors 91, 92 and 98 are controlled by a microsequencer including a control store 100 which produces a 29-bit wide microword on bus 101 in response to a microinstruction address on input 102. The control store contains 128 words, in one example. The microword is generated in S1 based upon an address on input 102 from selector 103, and latched into pipeline latches 104 and 105 during S2 and S3 to control the operation of the ALU 84, etc.

The instruction unit 22 performs its operations in the first four segments of the pipeline, S0–S4. In S0, the virtual instruction cache 17 is accessed and loaded to the prefetch queue 32; the virtual instruction cache 17 attempt to fill the prefetch queue 32 with up to eight bytes of instruction stream data. It is assumed that the virtual instruction cache 17 has been previously loaded with instruction stream blocks which include the sequential instructions needed to fill the prefetch queue 32. In S1, the instruction burst unit 33 parses, i.e., breaks up the incoming instruction data into opcodes, operand specifiers, specifier extensions, and branch displacements and passes the results to the other parts of the instruction unit 22 for further processing, then the instruction issue unit 68 takes the opcodes provided by the instruction burst unit 33 and generates microcode dispatch addresses and other information needed by the microinstruction unit 24 to begin instruction execution. Also in S1, the branch prediction unit 39 predicts whether or not branches will be taken and redirects instruction unit 22 instruction processing as necessary, the operand queue unit 79 produces output on bus 36 to the source and destination queues 37 and 38, and the scoreboard unit 81 keeps track of outstanding read and write references to the GPRs in the register file 41. In the complex specifier unit 40, the microsequencer accesses the control store 100 to produce a microword on lines 101 in S1. In the S2 pipe stage, the complex specifier unit 40 performs its read operation, accessing the necessary registers in register file 41, and provides the data to its ALU 84 in the next pipe stage. Then in the S3 stage, the ALU 84 performs its operation and writes the result either to a register in the register file 41 or to local temporary registers; this segment also contains the interface to the memory management unit 25—requests are sent to the memory management unit 25 for fetching operands as needed (likely resulting in stalls while waiting for the data to return).

The Virtual Instruction Cache (VIC)

Figure 10:
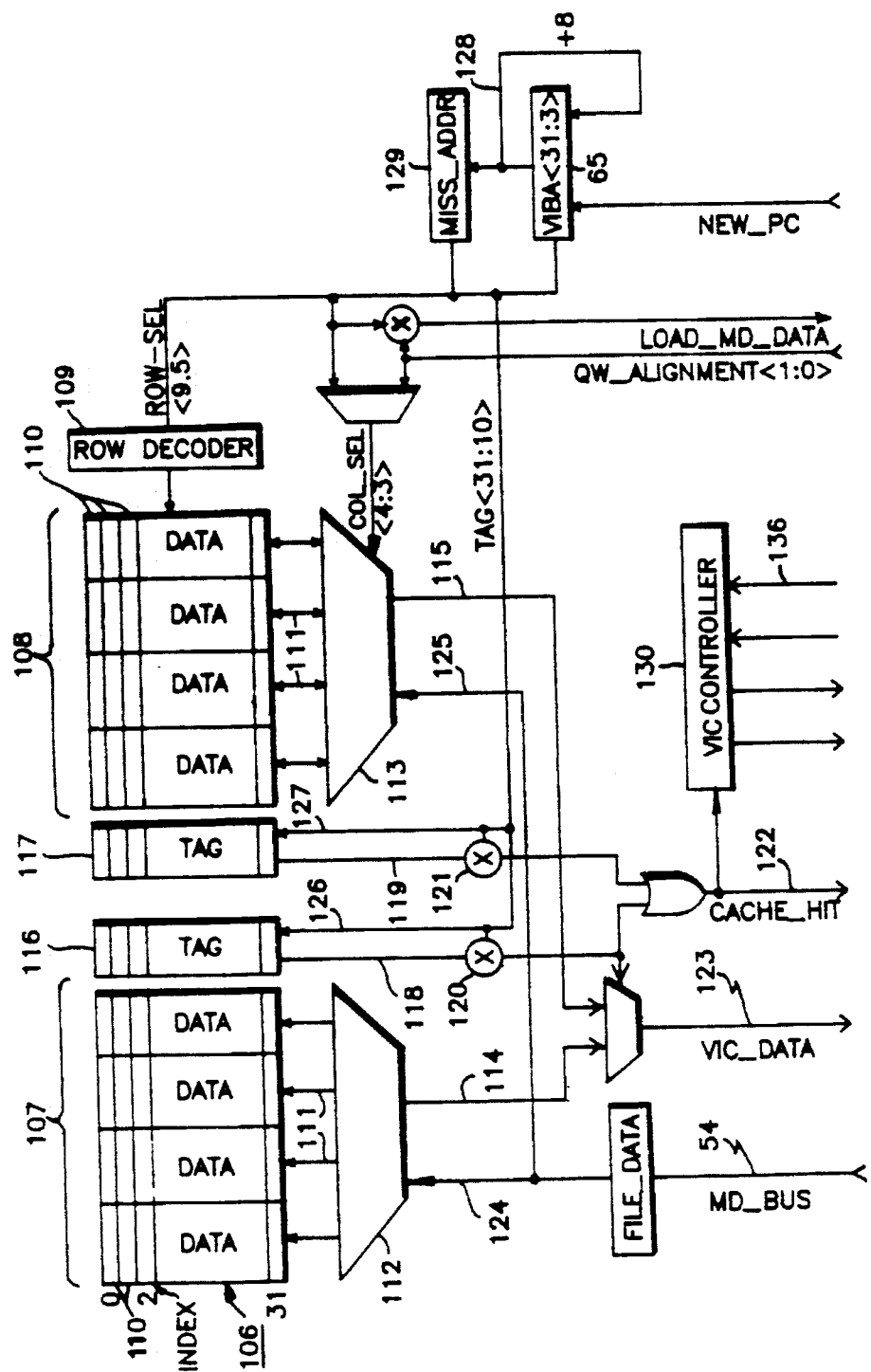
FIG. 10 is an electrical diagram in block form of the virtual instruction cache used in the CPU of FIG. 1.

Referring to FIG. 10, the virtual instruction cache 17 is shown in more detail. The virtual instruction cache 17 includes a 2 K byte data memory 106 which also stores 64 tags. The data memory is configured as two blocks 107 and 108 of thirty-two rows. Each block 107, 108 is 256-bits wide so it contains one hexaword of instruction stream data (four quadwords). A row decoder 109 receives bits <9:5> of the virtual address from the VIBA register 65 and selects 1-of-32 indexes 110 (rows) to output two hexawords of instruction stream data on column lines 111 from the memory array. Column decoders 112 and 113 select 1-of-4 based on bits <4:3>0 of the virtual address. So, in each cycle, the virtual instruction cache 17 selects two hexaword locations to output on busses 114 and 115. The two 22-bit tags from tag stores 116 and 117 selected by the 1 -of-32 row decoder 109 are output on lines 118 and 119 for the selected index and compared to bits <31:10> of the address in the VIBA register 65 by tag compare circuits 120 and 121. If either tag generates a match, a hit is signalled on line 122, and the quadword is output on bus 123 going to the prefetch queue 32. If a miss is signalled (cache-hit not asserted on 122) then a memory reference is generated by sending the VIBA address to the address bus 53 via bus 96 and the complex specifier unit 40 as seen in FIG. 8; the instruction stream data is thus fetched from cache, or if necessary, an exception is generated to fetch instruction stream data from memory 12. After a miss, the virtual instruction cache 17 is filled from the memory data bus 54 by inputs 124 and 125 to the data store blocks via the column decoders 112 and 113, and the tag stores are filled from the address input via lines 126 and 127. After each cache cycle, the VIBA 65 is incremented (by +8, quadword granularity) via path 128, but the VIBA address is also saved in register 129 so if a miss occurs the VIBA is reloaded and this address is used as the fill address for the incoming instruction stream data on the MD bus 54. The virtual instruction cache 17 controller 130 receives controls from the prefetch queue 32, the cache hit signal 122, etc., and defines the cycle of the virtual instruction cache 17.

The Prefetch Queue (PFQ)

Figure 11:
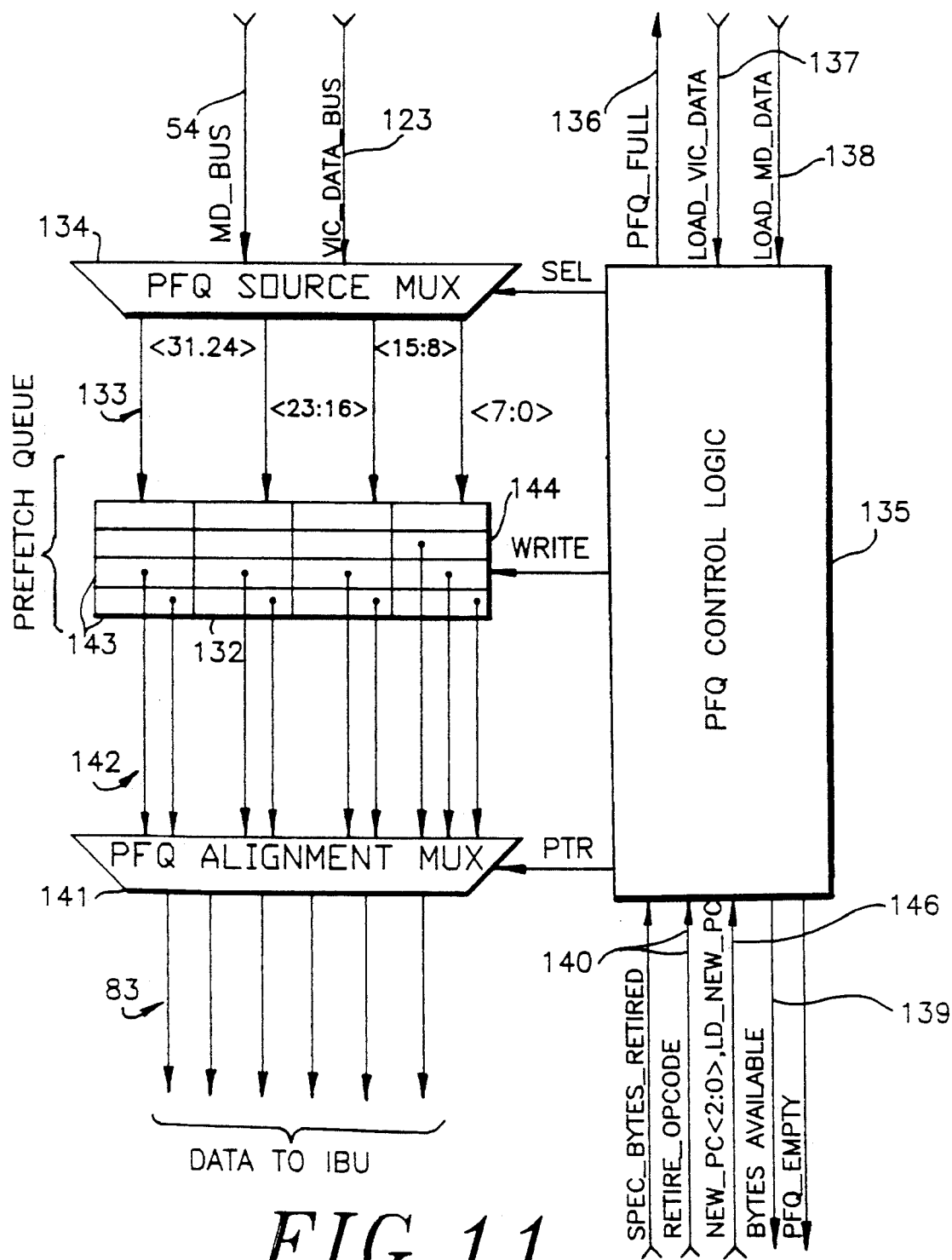
FIG. 11 is an electrical diagram in block form of the prefetch queue used in the CPU of FIG. 1.

Referring to FIG. 11, the prefetch queue 32 is shown in more detail. A memory array 132 holds four longwords, arranged four bytes by four bytes. The array 132 can accept four bytes of data in each cycle via lines 133 from a source multiplexer 134. The inputs to the multiplexer 134 are the memory data bus 54 and the virtual instruction cache 17 data bus 123. When the prefetch queue 32 contains insufficient available space to load another quadword of data from the virtual instruction cache 17 the prefetch queue 32 controller 135 asserts a pfq-full signal on the line 136 going to the virtual instruction cache 17. The virtual instruction cache 17 controls the supply of data to the prefetch queue 32, and loads a quadword each cycle unless the pfq-full line 136 is asserted. The controller 135 selects the virtual instruction cache 17 data bus 123 or the memory data bus 54 as the source, via multiplexer 134, in response to load-vic-data or load-md-data signals on lines 137 and 138 from the virtual instruction cache 17 controller 130. The prefetch queue 32 controller 135 determines the number of valid unused bytes of instruction stream data available for parsing and sends this information to the instruction burst unit 33 via lines 139. When the instruction burst unit 33 retires instruction stream data it signals the prefetch queue 32 controller 135 on lines 140 of the number of instruction stream opcode and specifier bytes retired. This information is used to update pointers to the array 132. The output of the array 132 is through a multiplexer 141 which aligns the data for use by the instruction burst unit 33; the alignment multiplexer 141 takes (on lines 142) the first and second longwords 143 and the first byte 144 from the third longword as inputs, and outputs on lines 83 six contiguous bytes starting from any byte in the first longword, based upon the pointers maintained in the controller 135. The prefetch queue 32 is flushed when the branch prediction unit 39 broadcasts a load-new-PC signal on line 146 and when the execution unit 23 asserts load-PC.

The instruction burst unit 33 receives up to six bytes of data from the prefetch queue 32 via lines 83 in each cycle, and identifies the component parts, i.e., opcodes, operand specifiers and branch displacements by reference to the table 66. New data is available to the instruction burst unit 33 at the beginning of a cycle, and the number of specifier bytes being retired is sent back to the prefetch queue 32 via lines 140 so that the next set of new data is available for processing by the next cycle. The component parts extracted by the instruction burst unit 33 from the instruction stream data are sent to other units for further processing; the opcode is sent to the instruction issue unit 68 and the branch prediction unit 39 on bus 147, and the specifiers, except for branch displacements, are sent to the complex specifier unit 40, the scoreboard unit 81 and the operand queue unit 79 via a spec-control bus 78. The branch displacement is sent to the branch prediction unit 39 via bus 148, so the new address can be generated if the conditional branch is to be taken.

Scoreboard Unit

Figure 12:
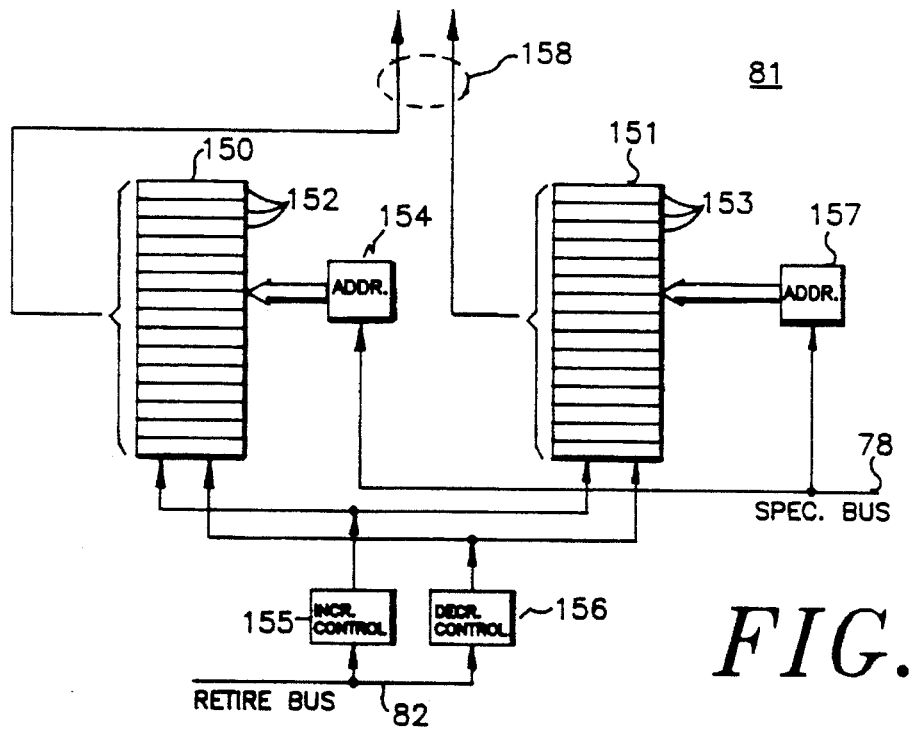
FIG. 12 is an electrical diagram in block form of the scoreboard unit used in the CPU of FIG. 1.

Referring to FIG. 12, the scoreboard unit 81 is shown in more detail. The scoreboard unit 81 keeps track of the number of outstanding references to GPRs in the source and destination queues (37 and 38 in FIG. 7). The scoreboard unit 81 contains two arrays of fifteen counters: the source array 150 for the source queue 37 and the destination array 151 for the destination queue 38. The counters 152 and 153 in the arrays 150 and 151 map one-to-one with the fifteen GPRs in the register file 41, except that there is no scoreboard counter corresponding to the PC. The maximum number of outstanding operand references determines the maximum count value for the counters 152, 153, and this value is based on the length of the source and destination queues. The source array counts up to twelve and the destination array counts up to six.

Each time valid register mode source specifiers appear on the spec-bus 78 the counters 152 in the source array 150 that correspond with those registers are incremented, as determined by selector 154 receiving the register numbers as part of the information on the bus 78. At the same time, the operand queue unit 79 inserts entries pointing to these registers in the source queue 37. In other words, for each register mode source queue entry, there is a corresponding increment of a counter 152 in the array 150, by the increment control 155. This implies a maximum of two counters incrementing each cycle when a quadword register mode source operand is parsed (each register in the register file 41 is 32-bits, and so a quadword must occupy two registers in the register file 41). Each counter 152 may only be incremented by one. When the execution unit 23 removes the source queue entries the counters 152 are decremented by decrement control 156. The execution unit 23 removes up to two register mode source queue entries per cycle as indicated on the retire bus 82. The GPR numbers for these registers are provided by the execution unit 23 on the retire bus 82 applied to the increment and decrement controllers 155 and 156. A maximum of two counters 152 may decrement each cycle, or any one counter may be decremented by up to two, if both register mode entries being retired point to the same base register.

In a similar fashion, when a new register mode destination specifier appears on spec-bus 78, the array 151 counter stage 153 that corresponds to that register of the register file 41, as determined by a selector 157, is incremented by the controller 155. A maximum of two counters 153 increment in one cycle for a quadword register mode destination operand. When the execution unit 23 removes a destination queue entry, the counter 153 is decremented by controller 156. The execution unit 23 indicates removal of a register mode destination queue entry, and the register number, on the retire bus 82.

Whenever a complex specifier is parsed, the GPR associated with that specifier is used as an index into the source and destination scoreboard arrays via selectors 154 and 157, and snapshots of both scoreboard counter values are passed to the Complex specifier unit 40 on bus 158. The Complex specifier unit 40 stalls if it needs to read a GPR for which the destination scoreboard counter value is non-zero. A non-zero destination counter 153 indicates that there is at least one pointer to that register in the destination queue 38. This means that there is a future execution unit 23 write to that register and that its current value is invalid. The Complex specifier unit 40 also stalls if it needs to write a GPR for which the source scoreboard counter value is non-zero. A non-zero source scoreboard value indicates that there is at least one pointer to that register in the source queue 37. This means that there is a future execution unit 23 read to that register and it contents must not be modified. For both scoreboards 150 and 151, the copies in the Complex specifier unit 40 pipe are decremented on assertion of the retire signals on bus 82 from the execution unit 23.

Branch Prediction

Figure 13:
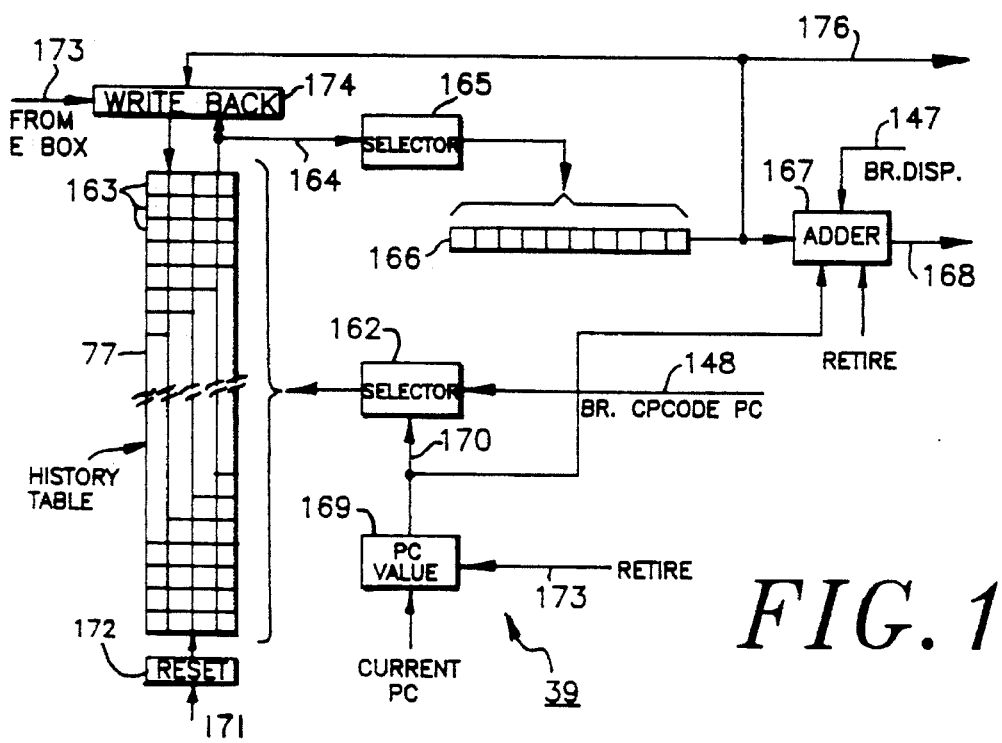
FIG. 13 is an electrical diagram in block form of the branch prediction unit used in the CPU of FIG. 1.

Referring to FIG. 13, the branch prediction unit 39 is shown in more detail. The instruction burst unit 33, using the tables of opcode values in ROM/PLA 66, monitors each instruction opcode as it is parsed, looking for a branch opcode. When a branch opcode is detected, the PC for this opcode is applied to the branch prediction unit 39 via bus 148. This PC value (actually a subset of the address) is used by a selector 162 to address the table 77. The branch history table 77 consists of an array of 512 four-bit registers 163, and the value in the one register 163 selected by 162 is applied by lines 164 to a selector 165 which addresses one of sixteen values in a register 166, producing a one-bit take or not-take output. The branch prediction unit 39 thus predicts whether or not the branch will be taken. If the branch prediction unit 39 predicts the branch will be taken (selected output of the register 166 a "1"), it adds the sign-extended branch displacement on bus 148 to the current PC value on bus 22 in the adder 167 and broadcasts the resulting new PC to the rest of the instruction unit 22 on the new-PC lines 168. The current PC value in register 169 is applied by lines 170 to the selector 162 and the adder 167.

The branch prediction unit 39 constructed in the manner of FIG. 13 uses a "branch history" algorithm for predicting branches. The basic premise behind this algorithm is that branch behavior tends to be patterned. Identifying in a program one particular branch instruction, and tracing over time that instruction's history of branch taken vs. branch not taken, in most cases a pattern develops. Branch instructions that have a past history of branching seem to maintain that history and are more likely to branch than not branch in the future. Branch instructions which follow a pattern such as branch, no branch, branch, no branch etc., are likely to maintain that pattern. Branch history algorithms for branch prediction attempt to take advantage of this "branch inertia".

The branch prediction unit 39 uses the table 77 of branch histories and a prediction algorithm (stored in register 166) based on the past history of the branch. When the branch prediction unit 39 receives the PC of a conditional branch opcode on bus 148, a subset of the opcode's PC bits is used by the selector 162 to access the branch history table 77. The output from the table 77 on lines 164 is a 4-bit field containing the branch history information for the branch. From these four history bits, a new prediction is calculated indicating the expected branch path.

Many different opcode PCs map to each entry of the branch table 77 because only a subset (9-bits) of the PC bits form the index used by the selector 162. When a branch opcode changes outside of the index region defined by this subset, the history table entry that is indexed may be based on a different branch opcode. The branch table 77 relies on the principle of temporal locality, and to a lesser extent spatial locality, and assumes that, having switched PCs, the current process operates within a small region for a period of time. This allows the branch history table 77 to generate a new pertinent history relating to the new PC within a few branches.

The branch history information in each 4-bit register 163 of the table 77 consists of a string of 1's and 0's indicating what that branch did the last four times it was seen. For example, 1100, read from right to left, indicates that the last time this branch was seen it did not branch. Neither did it branch the time before that. But then it branched the two previous times. The prediction bit is the result of passing the history bits that were stored through logic which predicts the direction a branch will go, given the history of its last four branches.

The prediction algorithm defined by the register 166 is accessible via the CPU datapaths as an internal processor register (IPR) for testing the contents or for updating the contents with a different algorithm. After powerup, the execution unit 23 microcode initializes the branch prediction algorithm register 166 with a value defining an algorithm which is the result of simulation and statistics gathering, which provides an optimal branch prediction across a given set of general instruction traces. This algorithm may be changed to tune the branch prediction for a specific instruction trace or mix; indeed, the algorithm may be dynamically changed during operation by writing to the register 166. This algorithm is shown in the following table, according to a preferred embodiment:

| Branch History | Prediction for Next Branch |
| --- | --- |
| 0000 | Not Taken |
| 0001 | Taken |
| 0010 | Not Taken |
| 0011 | Taken |
| 0100 | Not Taken |
| 0101 | Not Taken |
| 0110 | Taken |
| 0111 | Taken |
| 1000 | Not Taken |
| 1001 | Taken |
| 1010 | Taken |
| 1011 | Taken |
| 1100 | Taken |
| 1101 | Taken |
| 1110 | Taken |
| 1111 | Taken |

The 512 entries in the branch table 77 are indexed by the opcode's PC bits <8:0>. Each branch table entry 163 contains the previous four branch history bits for branch opcodes at this index. The execution unit 23 asserts a flush-branch-table command on line 171 under microcode control during process context switches. This signal received at a reset control 172 resets all 512 branch table entries to a neutral value: history=0100, which will result in a next prediction of 0 (i.e., not taken).

When a conditional branch opcode is encountered, the branch prediction unit 39 reads the branch table entry indexed by PC<8:0>, using the selector 162. If the prediction logic including the register 166 indicates the branch taken, then the adder 167 sign extends and adds the branch displacement supplied from the instruction burst unit 33 via bus 147 to the current PC, and broadcasts the result to the instruction unit 22 on the new-PC lines 168. If the prediction bit in the register 166 indicates not to expect a branch taken, then the current PC in the instruction unit 22 remains unaffected. The alternate PC in both cases (current PC in predicted taken case, and branch PC in predicted not taken case) is retained in the branch prediction unit 39 in the register 169 until the execution unit 23 retires the conditional branch. When the execution unit 23 retires a conditional branch, it indicates the actual direction of the branch via retire lines 173. The branch prediction unit 39 uses the alternate PC from the register 169 to redirect the instruction unit 22 via another new-PC on lines 168, in the case of an incorrect prediction.

The branch table 77 is written with new history each time a conditional branch is encountered. A writeback circuit 174 receives the four-bit table entry via lines 164, shifts it one place to the left, inserts the result from the prediction logic received on line 175, and writes the new four-bit value back into the same location pointed to by the selector 162. Thus, once a prediction is made, the oldest of the branch history bits is discarded, and the remaining three branch history bits and the new predicted history bit are written back to the table 77 at the same branch PC index. When the execution unit 23 retires a branch queue entry for a conditional branch, if there was not a mispredict, the new entry is unaffected and the branch prediction unit 39 is ready to process a new conditional branch. If a mispredict is signaled via lines 173, the same branch table entry is rewritten by the circuit 174, this time the least significant history bit receives the complement of the predicted direction, reflecting the true direction of the branch.

Each time the branch prediction unit 39 makes a prediction on a branch opcode, it sends information about that prediction to the execution unit 23 on the bus 176. The execution unit 23 maintains a branch queue (70 in FIG. 7) of branch data entries containing information about branches that have been processed by the branch prediction unit 39 but not by the execution unit 23. The bus 176 is 2-bits wide: one valid bit and one bit to indicate whether the instruction unit 22 prediction was to take the branch or not. Entries are made to the branch queue 70 for both conditional and unconditional branches. For unconditional branches, the value of bit-0 of bus 176 is ignored by the execution unit 23. The length of the branch queue 70 is selected such that it does not overflow, even if the entire instruction queue 35 is filled with branch instructions, and there are branch instructions currently in the execution unit 23 pipeline. At any one time there may be only one conditional branch in the queue 70. A queue entry is not made until a valid displacement has been processed. In the case of a second conditional branch encountered while a first is still outstanding, the entry may not be made until the first conditional branch has been retired.

When the execution unit 23 executes a branch instruction and it makes the final determination on whether the branch should or should not be taken, it removes the next element from the branch queue 70 and compares the direction taken by the instruction unit 22 with the direction that should be taken. If these differ, then the execution unit 23 sends a mispredict signal on the bus 173 to the branch prediction unit 39. A mispredict causes the instruction unit 22 to stop processing, undo any GPR modifications made while parsing down the wrong path, and restart processing at the correct alternate PC.

The branch prediction unit 39 back-pressures the BIU by asserting a branch-stall signal when it encounters a new conditional branch with a conditional branch already outstanding. If the branch prediction unit 39 has processed a conditional branch but the execution unit 23 has not yet executed it, then another conditional branch causes the branch prediction unit 39 to assert branch-stall. Unconditional branches that occur with conditional branches outstanding do not create a problem because the instruction stream merely requires redirection. The alternate PC in register 169 remains unchanged until resolution of the conditional branch. The execution unit 23 informs the branch prediction unit 39 via bus 173 each time a conditional branch is retired from the branch queue 70 in order for the branch prediction unit 39 to free up the alternate PC and other conditional branch circuitry. The branch-stall signal blocks the instruction unit 22 from processing further opcodes. When branch-stall is asserted, the instruction burst unit 33 finishes parsing the current conditional branch instruction, including the branch displacement and any assists, and then the instruction burst unit 33 stalls. The entry to the branch queue 70 in the execution unit 23 is made after the first conditional branch is retired. At this time, branch-stall is deasserted and the alternate PC for the first conditional branch is replaced with that for the second.

The branch prediction unit 39 distributes all PC loads to the rest of the instruction unit 22. PC loads to the instruction unit 22 from the complex specifier unit 40 microcode load a new PC in one of two ways. When the complex specifier unit 40 asserts PC-Load-Writebus, it drives a new PC value on the IW-Bus lines. PC-Load-MD indicates that the new PC is on the MD bus lines 54. The branch prediction unit 39 responds by forwarding the appropriate value onto the new-PC lines 168 and asserting load-new-PC. These instruction unit 22 PC loads do not change conditional branch state in the branch prediction unit 39.

The execution unit 23 signals its intent to load a new PC by asserting Load-New-PC. The assertion of this signal indicates that the next piece of IPR data to arrive on the MD bus 54 is the new PC. The next time the memory management unit 25 asserts a write command, the PC is taken from the MD bus 54 and forwarded onto the new-PC lines and a load-new-PC command is asserted.

The branch prediction unit 39 performs unconditional branches by adding the sign extended branch displacement on lines 147 to the current PC on lines 170 in the adder 167, driving the new PC onto the new-PC lines 168 and asserting a signal load-new-PC. Conditional branches load the PC in the same fashion if the logic predicts a branch taken. Upon a conditional branch mispredict or execution unit 23 PC load, any pending conditional branch is cleared, and pending unconditional branches are cleared.

The Microinstruction Control Unit

Figure 14:
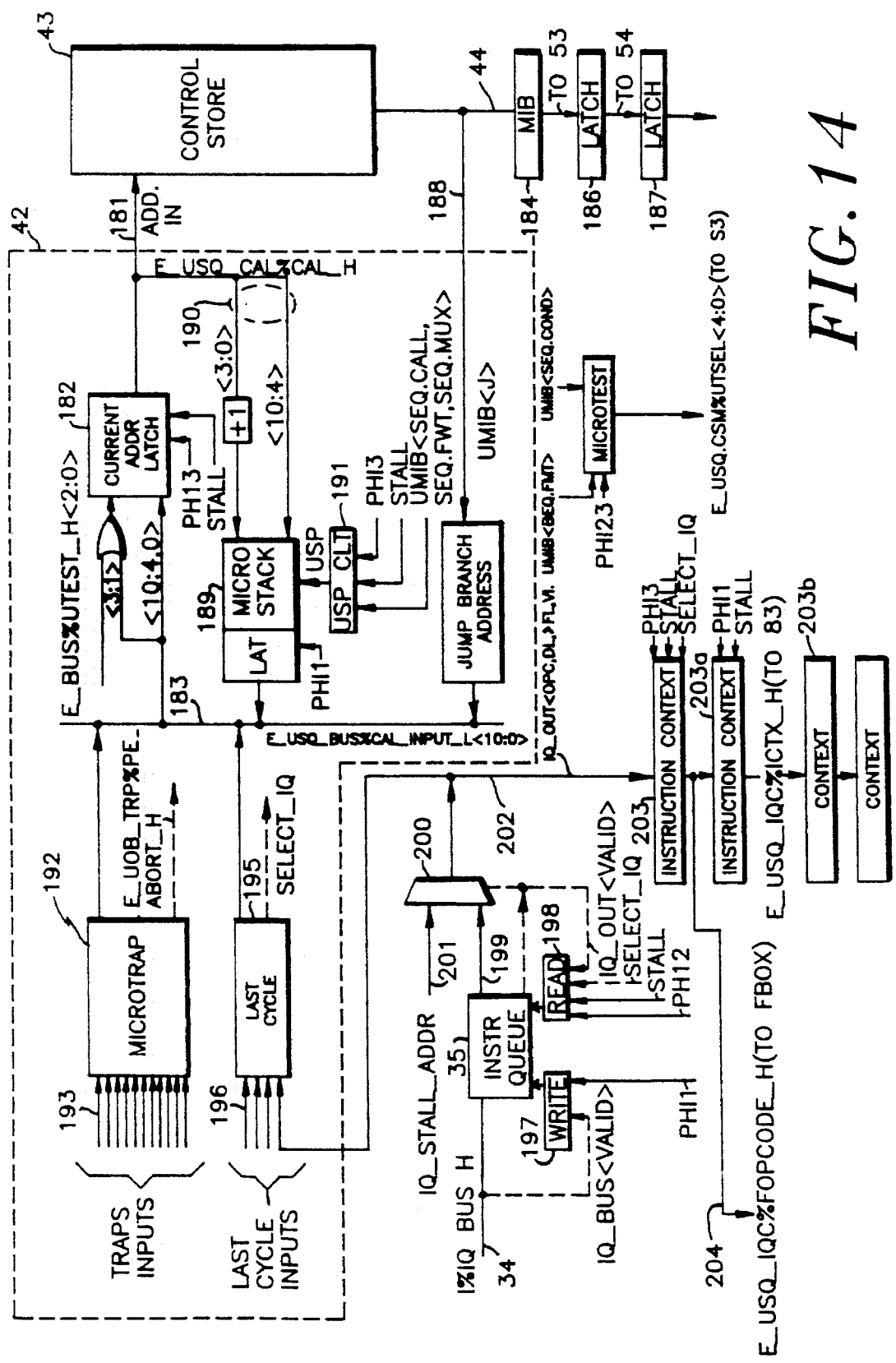
FIG. 14 is an electrical diagram in block form of the microinstruction control unit the CPU of FIG. 1, including the microsequencer and the control store.

Referring to FIG. 14, the microinstruction control unit 24 including the microsequencer 42 and microstore 43 defines a finite state machine that controls three execution unit 23 sections of the CPU 10 pipeline: S3, S4 and S5. The microinstruction control unit 24 itself resides in the S2 section of the pipeline, and accesses microcode contained in the on-chip control store 43. The control store 43 is addressed by an 11-bit bus 181 from the microsequencer 42. The current address for the control store is held in a latch 182, and this latch is loaded from a selector 183 which has several sources for the various addressing conditions, such as jump or branch, microstack, or microtrap. Each microword output on bus 44 from the control store 43 is made up of fields which control all three pipeline stages. A microword is issued at the end of S2 (one every machine cycle) and is stored in latch 184 for applying to microinstruction bus 185 and use in the execution unit 23 during S3, then is pipelined forward (stepped ahead) to sections S3 and S4 via latches 186 and 187 under control of the execution unit 23. Each microword contains a 15-bit field (including an 11-bit address) applied back to the microsequencer 42 on bus 188 for specifying the next microinstruction in the microflow. This field may specify an explicit address contained in the microword from the control store 43, or it may direct the microsequencer 42 to accept an address from another source, e.g., allowing the microcode to conditionally branch on various states in the CPU 10.

Frequently used microcode is usually defined as microsubroutines stored at selected addresses in the control store, and when one of these subroutines is called, the return address is pushed onto a microstack 189 for use upon executing a return. To this end, the current address on the address input bus 181 is applied back to the microstack input 190 after being incremented, since the return will be to the current address plus one. The microstack may contain, for example, six entries, to allow six levels of subroutine nesting. The output of the microstack 189 is applied back to the current address latch 182 via the selector 183 if the commands in the field on the bus 188 direct this as the next address source.

Stalls, which are transparent to the person writing the microcode, occur when a CPU resource is not available, such as when the ALU 50 requires an operand that has not yet been provided by the memory management unit 25. The microsequencer 42 stalls when pipeline segment S3 of the execution unit 23 is stalled. A stall input to the latch 182, the latch 184 or the microstack control 191 causes the control store 43 to not issue a new microinstruction to the bus 44 at the beginning of S3.

Microtraps allow the microcoder to deal with abnormal events that require immediate service. For example, a microtrap is requested on a branch mispredict, when the branch calculation in the execution unit 23 is different from that predicted by the instruction unit 22 for a conditional branch instruction. A microtrap selector 192 has a number of inputs 193 for various conditions, and applies an address to the selector 183 under the specified conditions. When a microtrap occurs, the microcode control is transferred to the service microroutine beginning at this microtrap address.

The control field (bits <14:0>) of the microword output from the control store 43 on bus 44 via bus 188 is used to define the next address to be applied to the address input 181. The next address is explicitly coded in the current microword; there is no concept of sequential next address (i.e., the output of the latch 182 is not merely incremented). Bit-14 of the control field selects between jump and branch formats. The jump format includes bits <10:0> as a jump address, bits <12:11> to select the source of the next address (via selector 183) and bit-13 to control whether a return address is pushed to the microstack 189 via bus 190. The branch format includes bits <7:0> as a branch offset, bits <12:8> to define the source of the microtest input, and again bit-13 to control whether a return address is pushed to the microstack 189 via bus 190. These conditional branch microinstructions are responsive to various states within the CPU 10 such as ALU overflow, branch mispredict, memory management exceptions, reserved addressing modes or faults in the floating point unit 27.

The last microword of a microroutine contains a field identifying it as the last cycle, and this field activates a selector 195 which determines what new microflow is to be started. The alternatives (in order of priority) are an interrupt, a fault handler, a first-part-done handler, or the entry point for a new macroinstruction indicated by the top entry in the instruction queue 35. All of these four alternatives are represented by inputs 196 to the selector 195. If last cycle is indicated, and there is no microtrap from selector 192, the next address is applied from the selector 195 to the selector 183 for entering into the latch 182.

The instruction queue 35 is a FIFO, six entries deep, filled by the instruction unit 22 via bus 34, permitting the instruction unit 22 to fetch and decode macroinstructions ahead of the execution unit 23 execution. Each entry is 22-bits long, with bits <9:1> being the dispatch address used for the control store address via selector 183 (all the entry points are mapped to these address bits), and bits <21:13> being the opcode itself (the extra bit designating a two-byte opcode). Bit-0 is a valid bit, set if the entry is valid, bit-10 indicates an floating point unit 27 instruction, and bits <12:11> define the initial data length of instruction operands (byte, word, longword, etc.). A write pointer 197 defines the location where a new entry is written from the bus 34 during phi1, and this write pointer 197 is advanced in phi3 of each cycle if the valid bit is set in this new entry. A read pointer 198 defines the location in the instruction queue 35 where the next instruction is to be read during phi2 onto output lines 199 to selector 200. If the valid bit is not set in the instruction queue 35 entry being read out, the selector 200 uses a stall address input 201 for forwarding via selector 195 and selector 183 to the latch 182; the stall microword is thus fetched from the control store 43, and a stall command is sent to the execution unit 23. If the valid bit is set in the entry being read from the instruction queue 35, a first-cycle command is sent to the execution unit 23, and if the floating point unit 27 bit is also set an floating point unit 27 command is sent to the floating point unit 27. The read pointer 198 is advanced in phi4 if the last cycle selector 195 is activated by the microword output in this cycle and the selector 195 selects the output 202 (and the valid bit is set in the entry). When the read pointer 198 is advanced, the valid bit for the entry just read out is cleared, so this entry will not be reused. Or, the read pointer 198 is stalled (no action during phi4) if a stall condition exists.

The bus 202 containing the entry read from the instruction queue 35 includes the opcode field, as well as the microcode address field (sent to selector 195). This opcode field along with the data length field and the floating point unit 27 field is entered in an instruction context latch 203 on phi3 of S2, if the instruction queue 35 is selected as the next address source for the control store 43. When the entry read out has its valid bit cleared, the stall instruction context, forced out of the selector 200 with the stall address, is latched into the context latch 203. The output on lines 204 from the latch 203 is sent to the floating point unit 27 to define the floating point unit 27 instruction to be executed if the floating point unit 27 bit is set. On phi1 of the S3 segment the contents of the latch 203 are driven to slave context latch 205, and the contents of this slave latch are used during S3 by the execution unit 23.

Figure 15:
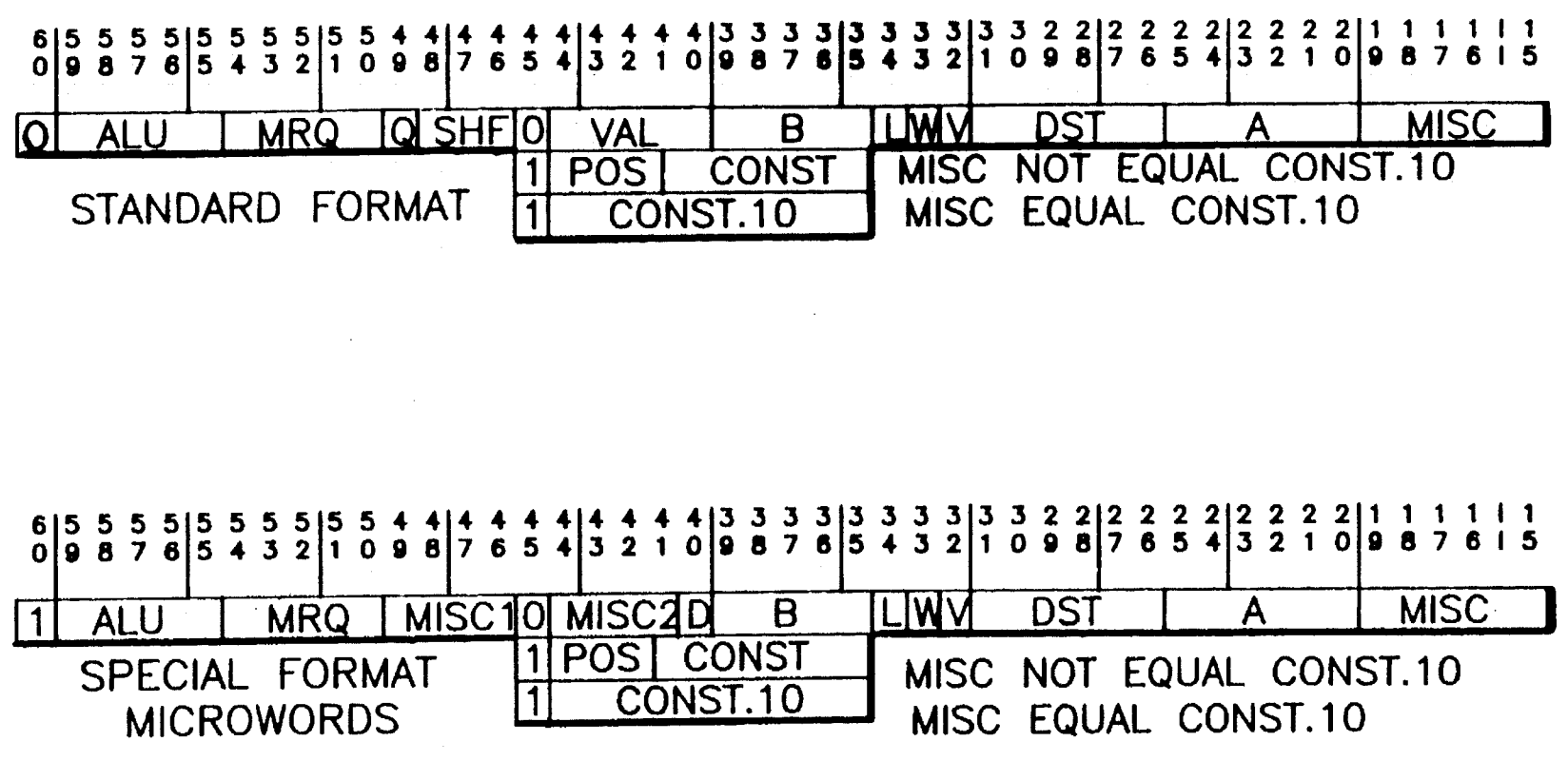

Referring to FIG. 15, the microword at the control store output is 61-bits wide, and of this a 14-bit field (bits <14:0> is used in the microsequencer 42 via bus 24e, so the input to the microinstruction latch 24d is 47-bits wide, bits <60:15>. The microinstructions are of two general types, referred to as "standard" and "special", depending upon whether bit-60 is a one or a zero. In both cases, the microinstruction has a field, bits <59:56>, defining the ALU function (add, subtract, pass, compare, etc.) to be implemented for this cycle, and a MRQ field, bits <54:50> defining any memory requests that are to be made to the memory management unit 25. The A and B fields (bits <25:20> and <39:36>) of the microword define the A and B inputs to the ALU, and the DST field, bits <31:26>, defines the write destination for the ALU output, along with the MISC field containing other needed control bits. The L, W and V fields, bits <34:32>, define the data length, whether to drive the write bus, and the virtual address write enable. For shifter operations, the microword contains an SHF field <48:46> to define the shifter function and a VAL field, bits <44:40> to define the shift amount. Also, if bit-45 is a one, the microword contains a constant value in bits <44:35> for driving onto the B input of the ALU; the constant can be 8-bit or 10-bit, as defined in the MISC field, and if 8-bit a POS field defines the position of the constant. If of the special format, no shifter operation is possible, and two other MISC control fields are available.

The Execution Unit

Figure 16:
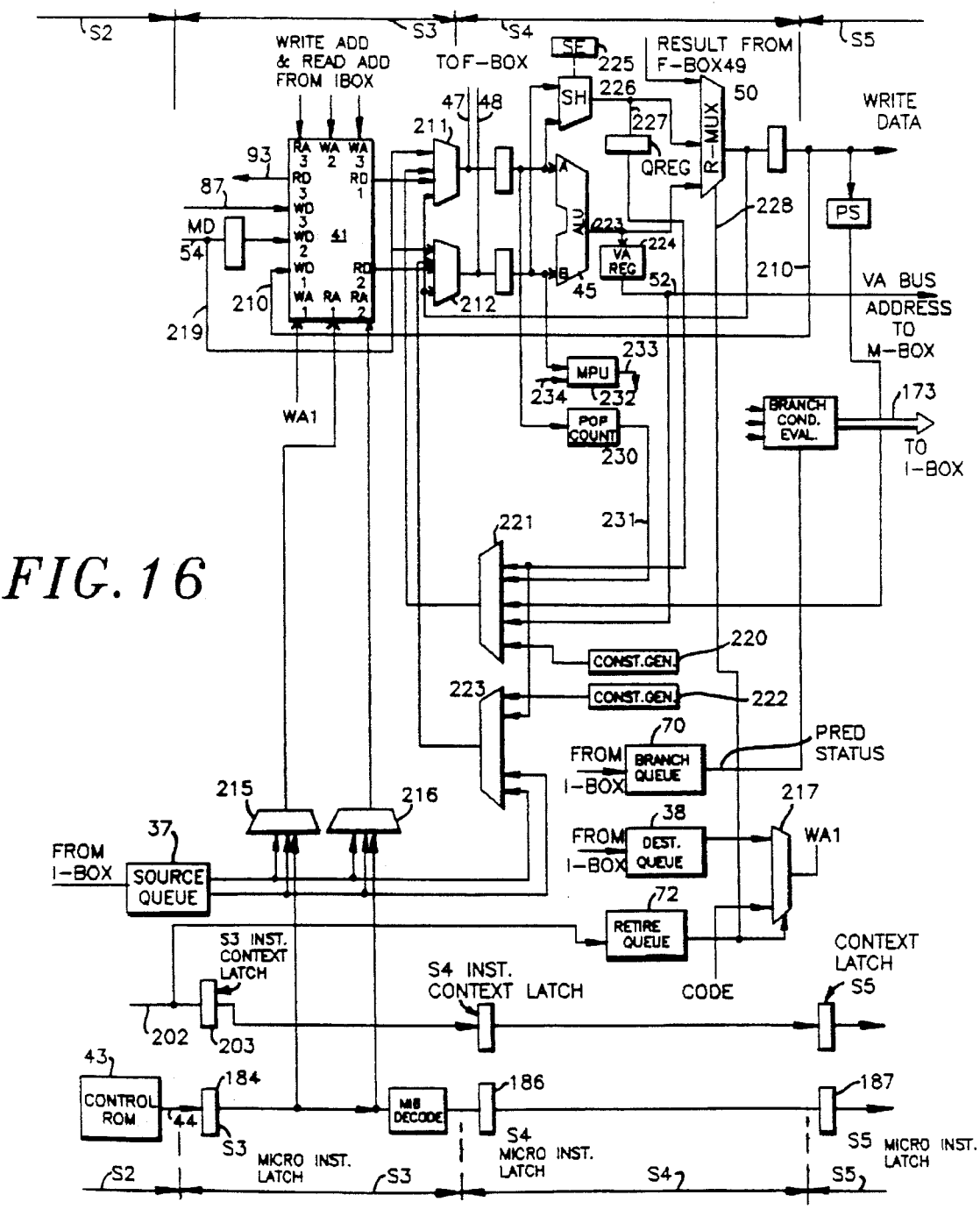
FIG. 16 is an electrical diagram in block form of an execution unit of the CPU of FIG. 1.

Referring to FIG. 16, the E-box or execution unit 23 includes the register file 41 which has thirty-seven 32-bit registers, consisting of six memory data registers MD0–MD5, fifteen general purpose registers (GPRs) R0–R14, six working registers W, and CPU state registers. The MD registers receive data from memory reads initiated by the instruction unit 22, and from direct writes from the instruction unit 22. The working registers W hold temporary data under control of the microinstructions (not available to the macroinstruction set); these registers can receive data from memory reads initiated by the execution unit 23 and receive result data from the ALU 45, shifter 46, or floating point unit 27 operations. The GPRs are VAX (Trademark) architecture general-purpose registers (though the PC, R15, is not in this file 41) and can receive data from memory reads initiated by the execution unit 23, from the ALU 45, the shifter 46, or from the instruction unit 22. The state registers hold semipermanent architectural state, and can be written only by the execution unit 23.

The register file 41 has three read ports and three write ports. The read ports include three read-address inputs RA1, RA2 and RA3, and three read data outputs RD1, RD2 and RD3. The three write ports include write address inputs WA1, WA2 and WA3, and three write data inputs WD1, WD2 and WD3. Data input to the write ports of the register file 41 is from the memory data bus 54 to WD2, from the instruction unit 22 write bus 87 to WD3, or from the output of the ALU 45 on the write bus 210 to WD1. Data output from the register file 41 is to the selector 211 for the ALU Abus 212 from RD1 (in S3), to the selector 213 for the ALU Bbus 214 from RD2 (also in S3), and to the bus 93 going to the instruction unit 22 from RD3. The read addresses at RA1 and RA2 for the RD1 and RD2 outputs from register file 41 are received from selectors 215 and 216, each of which receives inputs from the source queue 37 or from the A and B fields of the microinstruction via bus 185; in a cycle, two entries in the source queue 37 can be the address inputs at RA1 and RA2 to provide the ALU A and B inputs (or floating point unit 27 inputs), or the microinstruction can define a specific register address as well as specify source queue addressing. The write address input WA1 (controlling the register to which the ALU output or write bus 210 is written) is defined by a selector 217 receiving an input from the destination queue 38 or from the DST field of the microinstruction via bus 185; the selector 217 is controlled by the retire queue 72 as well as the microinstruction. The WA2 input is from the memory management unit 25 via bus 218, defining which register the MD bus 54 at WD2 is written; this MD port is used by the memory management unit 25 to write memory or IPR read data into W registers or GPRs to complete execution unit 23 initiated reads, with the register file address being supplied to WA2 from the memory management unit 25 (the Mbox received the register file address when the memory operation was initiated). The complex specifier unit 40 (seen in FIG. 13) accesses the register file 41 by WA3/WD3 and RA3/RD3 for general address calculation and autoincrement and autodecrement operand specifier processing.

A bypass path 219 is provided from the MD bus 54 to the inputs of the selectors 211 and 213 allows the memory read data to be applied directly to the A or B ALU inputs without being written to the a register in the register file 41 then read from this register in the same cycle. The data appears on MD bus 54 too late to be read in the same cycle. When the bypass path is enabled by microcode, the data is not written to the register.

The are two constant generators. A constant generator 220 for the A input of the ALU via selector 221, specified in the A field of the microinstruction, produces constants which are mainly used for generating the addresses of IPRs, and these are implementation dependent; generally an 8-bit value is produced to define an IPR address internally. A constant generator 222 for the B input of the ALU via selector 223 builds a longword constant by placing a byte value in one of four byte positions in the longword; the position and constant fields Pos and Constant in the microinstruction specify this value. Also, the constant source 222 can produce a low-order 10-bit constant specified by the microinstruction when a Const.10 field is present.

The ALU 45 is a 32-bit function unit capable of arithmetic and logical functions defined by the ALU field of the microword. The A and B inputs are defined by the selectors 211 and 212 which are under control of the A and B fields of the microword. The ALU output 223 can be multiplexed onto the write bus 210 via Rmux 50 and is directly connected to the virtual address register 224. The ALU also produces condition codes (overflow, carry, zero, negative) based on the results of an operation, and these can be used to update the state registers. The operations which may be performed in the ALU include add, subtract, pass A or B, AND, OR, exclusive-OR, etc.

The shifter 46 receives 64-bits of input from the A and B inputs and produces a 32-bit right shifted output to the Rmux 50. Shift operation is defined by the SHF field of the microinstruction, and the amount (0-to-32 bits) is defined by the VAL field or by a shift-counter register 225. The output 226 of the shifter 46 is multiplexed onto the write bus 210 via Rmux 50 and directly connected to the quotient or Q register 227.

The Rmux 50 coordinates execution unit 23 and floating point unit 27 result storage and retiring of macroinstructions, selecting the source of execution unit 23 memory requests and the source of the next write bus 210 data and associated information. The Rmux selection takes place in S4, as does the driving of the memory request to the memory management unit 25. The new data on write bus 210 is not used until the beginning of S5, however. The Rmux 50 is controlled by the retire queue 72, which produces an output on lines 228 indicating whether the next macroinstruction to retire is being executed by the execution unit 23 or floating point unit 27, and the Rmux selects one of these to drive the write bus 210 and to drive the memory request signals. The one not selected (execution unit 23 or floating point unit 27) will stall if it has need to drive the write bus 210 or memory request. The read pointer in the retire queue 72 is not advanced, and therefore the Rmux selection cannot change, until the currently selected source (execution unit 23 or floating point unit 27) indicates that its macroinstruction is to be retired. The source (execution unit 23 or floating point unit 27) indicated by the retire queue 72 is always selected to drive the Rmux 50; if the execution unit 23 is selected the W field of the microinstruction in S4 selects either the ALU 45 or the shifter 46 as the source for the Rmux 50.

The 32-bit VA or virtual address register 224 is the source for the address for all execution unit 23 memory requests on VA bus 52, except destination queue 38 based stores which use the current PA queue 56 entry for an address. Unlike the entry in the PA queue 56, the VA register 224 address is not yet translated—it is a virtual address except when the memory operation doesn't require translation (as in IPR references or explicit physical memory references)) or when memory management is off. The VA register 224 can be loaded only from the output 223 of the ALU 45, and is loaded at the end of S4 when the V field of the microword specifies to load it. If a given microword specifies a memory operation in the MRQ field and loads the VA register 224, the new VA value will be received by the memory management unit 25 with the memory command.

The population counter 230 functions to calculate the number of ones (times four) in the low-order fourteen bits of the A bus 212, every cycle, producing a result on lines 231 to selector 221 so the result is a source available on the A input of the ALU 45 for the next microword. The population count function saves microcode steps in CALL, POP and PUSH macroinstructions as set forth in U.S. Ser. No. 07/221,925 filed Jul. 20, 1988, assigned to Digital Equipment Corporation, and continued in U.S. Ser. No. 07/542,636 filed Jun. 21, 1990. The population counter 230 calculates a result in the range (1-to-14)*4, equal to four times the number of ones on the A input early in S4. If microword N steers data to the A input, microword N+1 can access the population counter result for that data by specifying this source in the A field. The population counter result on lines 231 is used to calculate the extent of the stack frame which will be written by the macroinstruction. The two ends of the stack frame are checked for memory management purposes before any writes are done.

The mask processing unit 232 holds and processes a 14-bit value loaded from bits <29:16> of the B input of the ALU 45, during S4 when the microword tells it to do so by the MISC field. The unit 232 outputs a set of bits with which the microinstruction sequencer 42 can carry out an eight-way branch. Each of these microbranches is to a store-register-to-stack sequence, with the value of the set of bits defining which register of the register file 43 to store. This set of 3-bits is applied to a microtest input to the microaddress latch 182 of FIG. 14 to implement the eight-way microbranch. The purpose of this is to allow microcode to quickly process bit masks in macroinstruction execution flows for CALL, Return, POP and PUSH. The mask processing unit 232 loads the fourteen bits during S4, evaluates the input producing the values shown in the following Table, for bits <6:0> and also separately for bits <13:7> of the B bus:

| Mask | | | | | | | Output |
|---|---|---|---|---|---|---|---|
| X | X | X | X | X | X | 1 | 0 0 0 |
| X | X | X | X | X | 1 | 0 | 0 0 1 |
| X | X | X | X | 1 | 0 | 0 | 0 1 0 |
| X | X | X | 1 | 0 | 0 | 0 | 0 1 1 |
| X | X | 1 | 0 | 0 | 0 | 0 | 1 0 0 |
| X | 1 | 0 | 0 | 0 | 0 | 0 | 1 0 1 |
| 1 | 0 | 0 | 0 | 0 | 0 | 0 | 1 1 0 |
| 0 | 0 | 0 | 0 | 0 | 0 | 0 | 1 1 1 | where X means "don't care". When the microcode does branch on one of these output values after they are loaded via lines to the microtest input to the microsequencer 42, the least significant bit which is a one in the current mask value in the mask processing unit 232 is reset to zero automatically, this reset occurring in S3, so that the next microword can branch on the new value of the mask. The microsequencer 42 signals that it did take a branch by input 234 to the mask processing unit 232. The advantage of the mask processing unit 232 is that a minimum number of microcode cycles is needed to find out which registers are to be saved to stack when a CALL or other such macroinstruction is executing. The mask loaded to the B bus contains a one for each of the fourteen GPRs that is to be saved to stack, and usually these are in the low-order numbers of bits <6:0>; say bit-1 and bit-2 are ones, and the rest zeros, then these will be found in two cycles (producing 000 and 001 outputs on lines 233), and the remainder of zeros can be determined in two cycles, one producing "111" on the output 233 for bits <6:2> of the first group and the next producing "111" on the output 233 for bits <13:7> collectively (all zeros) for the second group. Thus, ten microcycles are saved.

The mask processing unit 232 may be implemented, in one embodiment, by a decoder to evaluate the mask pattern according to the Table above and to produce the three-bit output indicated according to the position of the leading "1". In response to a branch-taken indication on the line 234 from the microsequencer, the decoder zeros the trailing "1" in the mask then in the unit, and performs another evaluation to produce the three-bit output value on lines 233.

The branch condition evaluator 235 uses the macroinstruction opcode, the ALU condition code bits and the shifter 46 result to evaluate the branch condition for all macroinstruction branches. This evaluation is done every cycle, but is used only if the microword specifies it in the MRQ field. The result of the evaluation is compared to the instruction unit 22 prediction made in the branch prediction unit 39. The instruction unit 22 prediction is indicated in the entry in the branch queue 70. If the instruction unit 22 prediction was not correct, the execution unit 23 signals the instruction unit 22 on one of the lines 173 and sends a branch-mispredict trap request to the microsequencer 42 as one of the inputs 193. A retire signal is asserted on one of the lines 173 to tell the instruction unit 22 that a branch queue entry for a conditional branch was removed from the branch queue 70. If the retire signal is asserted and the miss-predict signal is not, the instruction unit 22 releases the resource which is holding the alternate PC (the address which the branch should have gone to if the prediction had not been correct). If retire and miss-predict are both asserted, the instruction unit 22 begins fetching instructions from the alternate PC, and the microtrap in the microsequencer 42 will cause the execution unit 23 and floating point unit 27 pipelines to be purged and various instruction unit 22 and execution unit 23 queues to be flushed. Also, a signal to the memory management unit 25 flushes Mbox processing of execution unit 23 operand accesses (other than writes). The branch macroinstruction has entered S5 and is therefore retired even in the event of a misprediction; it is the macroinstructions following the branch in the pipeline which must be prevented from completing in the event of a mispredict microtrap via input 193.

Further details about the complex specifier unit 40 are disclosed in John F. Brown, III, et al., U.S. Ser. No. 07/934,351 filed Aug. 21, 1991, and entitled "Register Conflict Scoreboard in Pipelined Computer Using Pipelining of Reference Counts," herein incorporated by reference.

Further details about the P-cache 14, the B-cache 15, the interface/arbiter 21, the M-box 25, and the C-box 26, are included U.S. Pat. No. 5,155,843, entitled ERROR TRANSITION MODE FOR MULTI-PROCESSOR SYSTEM, by Rebecca L. Stamm, et al., herein incorporated by reference.

The Floating Point Execution Unit (F-Box)

Figure 17:
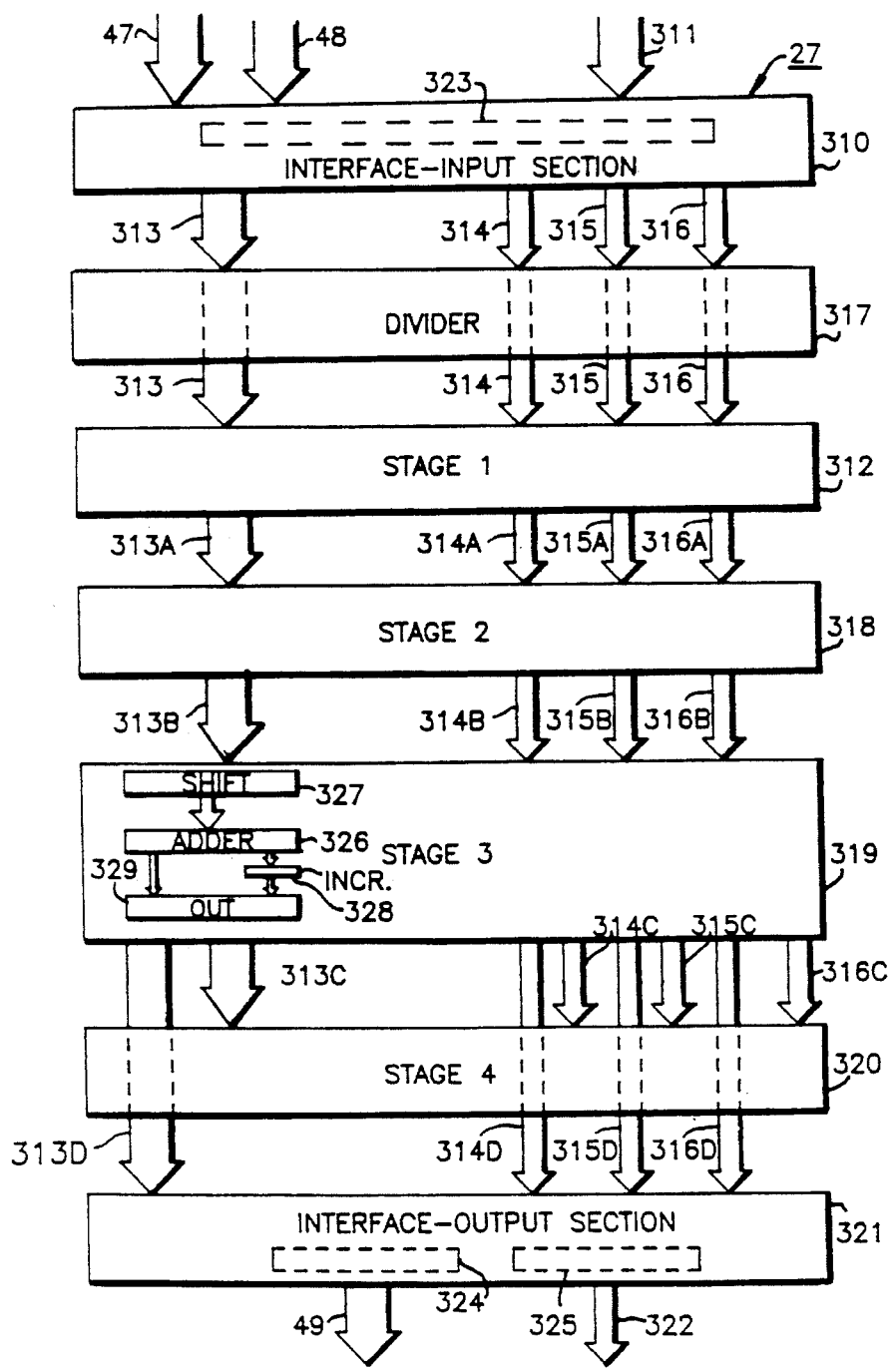
FIG. 17 is an electrical diagram in block form of a floating-point unit of the CPU of FIG. 1.

Referring to FIG. 17, the floating-point unit 27 is a four-stage pipelined floating point processor, interacting with three different segments of the main CPU pipeline, these being the microsequencer 42 in S2 and the Execution unit 23 in S3 and S4. The floating-point unit 27 runs semiautonomously with respect to the rest of the CPU 10, and it supports several operations. First, it provides instruction and data support for floating-point instructions in the instruction set; i.e., an instruction of the floating point type (including various data types) is recognized by the Instruction unit 22 and sent to the floating-point unit 27 for execution instead of to the Execution unit 23. Second, longword integer multiply instructions are more efficiently executed in the floating-point unit 27 than in the Execution unit 23, so when the Instruction unit 22 recognizes these instructions the command and data is sent to the Floating point unit 27. The floating-point unit 27 is pipelined, so, except for the divide instructions, the floating-point unit 27 can start a new single precision floating-point instruction every cycle, and start a new double precision floating point instruction or an integer multiply instruction every two cycles. The execution unit 23 can supply to the floating-point unit 27 two 32-bit operands, or one 64-bit operand, every machine cycle on two input operand buses 47 and 48. The floating point unit 27 drives the result operand to the execution unit 23 on the 32-bit result bus 49.

In FIG. 17, the two 32-bit data busses 47 and 48 are applied to an interface section 310, and control bits from the microinstruction bus and instruction context are applied by an input 311. This interface section 310 functions to oversee the protocol used in interfacing with the execution unit 23. The protocol includes the sequence of receiving the opcode and control via lines 311, operands via lines 47 and 48, and also outputting the result via bus 49 along with its accompanying status. The opcode and operands are transferred from the interface section 310 to the stage one unit 312 (for all operations except division) by lines 313, 314, 315 and 316. That is, the divider unit 317 is bypassed by all operations except division. The lines 313 carry the fraction data of the floating-point formatted data, the lines 314 carry the exponent data, the lines 315 carry the sign, and the lines 316 carry control information. The divider 317 receives its inputs from the interface 313 and drives its outputs to stage one unit 317, and is used only to assist the divide operation, for which it computes the quotient and the remainder in redundant format.

The stage one unit 312 receives its inputs from either the divider 317 or the interface section 310 via lines 313, 314, 315 and 316 and drives its outputs 313a, 314a, 315a, and 316a to the stage two section 318. Stage one is used for determining the difference between the exponents of the two operands, subtracting the fraction fields, performing the recording of the multiplier and forming three times the multiplicand, and selecting the inputs to the first two rows of the multiplier array.

The stage two unit 318 receives its inputs from the stage one unit 312, and drives its outputs to the stage three unit 319 via lines 313b, 314b, 315b and 316b. The stage two unit functions are right shift for alignment, multiplying the fraction fields of the operands, and zero and leading one detection of the intermediate fraction results.

The stage three unit 319 receives most of its inputs from the stage two unit 318, and drives its outputs to the stage four unit 320 via lines 313c, 314c, 315c, and 316c, or, conditionally, drives it outputs to the output interface section 321 via lines 313d, 314d, 315d and 316d. The primary functions of the stage three unit 319 are left shifting (normalization), and adding the fraction fields for the aligned operands or the redundant multiply array outputs. The stage three unit 319 can also perform a "mini-round" operation on the least significant bits of the fraction for Add, Subtract and Multiply floating-point instructions; if the mini-round does not produce a carry, and if there are no possible exceptions, then stage three drives the result directly to the output section 321, bypassing stage four unit 320 and saving a cycle of latency.

The stage four unit 320 receives its inputs from the stage three unit 319 and drives its outputs to the output interface section 321. This stage four is used for performing the terminal operations such as rounding, exception detection (overflow, underflow, etc.), and determining the condition codes.

The floating-point unit 27 depends upon the execution unit 23 for the delivery of instruction opcodes and operands via busses 47, 48 and 311, and for the storing of results sent by the bus 49 and control lines 322. However, the floating-point unit 27 does not require any assistance from the execution unit 23 in executing the floating-point unit 27 instructions. The floating-point macroinstructions are decoded by the instruction unit 22 just like any other macroinstruction and the microsequencer 24 is dispatched to an execution flow which transfers the source operands, fetched during the S3 pipeline stage, to the floating-point unit 27 early in the S4 stage. Once all the operands are delivered, the floating-point unit 27 executes the macroinstruction. Upon completion, the floating-point unit 27 requests to transfer the results back to the execution unit 23. When the current retire queue entry in the execution unit 23 indicates a floating-point unit 27 result and the floating-point unit 27 has requested a result transfer via lines 322, then the result is transferred to the execution unit 23 via bus 49, late in S4 of the pipeline, and the macroinstruction is retired in S5.

The floating-point unit 27 input interface 310 has two input operand registers 323 which can hold all of the data for one instruction, and a three segment opcode pipeline. If the floating-point unit 27 input is unable to handle new opcodes or operands then an input-stall signal is asserted by the floating-point unit 27 to the execution unit 23, causing the next floating point unit 27 data input operation to stall the CPU pipeline at the end of its S3 pipe stage.

The floating-point unit 27 output interface 321 has a format mux and two result queues, these being the data queue 324 and the control queue 325. The format mux is used to transform the result into VAX storage format. The queues 324 and 325 are used to hold results and control information whenever result transfers to the execution unit 23 become stalled.

Whenever the floating-point unit 27 indicates that it is ready to receive new information by negating the input-stall signal, the execution unit 23 may initiate the next opcode or operand transfer. The floating point unit 27 receives instructions from the microsequencer (S2 of the CPU pipeline) on a 9-bit opcode bus (part of control lines 311).

The stage three unit 319 is used primarily to left shift an input, or to perform the addition of two inputs in an adder 326. This stage contains a control section and portions of the fraction, exponent and sign datapaths. In addition, this stage three unit has the capability to bypass the stage four unit's rounding operation for certain instructions. The fraction datapath portion of stage three consists of a left shifter 327, an adder 326, and mini-rounding incrementers 328. The left shifter 327 is used for subtraction-like operations. The adder 326 is used by all other operations either to pass an input to the output 329 (by adding zero), or to add two vectors—for example, the two input operands (correctly aligned) for addition/subtraction, or the sum and carry vectors for multiplication. The mini-rounding incrementers 328 are used to round the fraction result during a stage four bypass operation.

For certain instructions and conditions, stage three unit 319 can supply the result to the output interface 321 directly, which is referred to as a stage four bypass and which improves the latency of the floating-point unit 27 by supplying a result one full cycle earlier than the stage four result is supplied. In order to bypass stage four, stage three must perform the required operations that stage four would normally perform under the same conditions. This includes rounding the fraction, as well as supplying the correct exponent and generation of the condition codes and status information that is related to the result. This bypass is only attempted for Add, Subtract and Multiply floating-point instructions. Stage three performs the rounding operation through the use of the incrementers 328, which only act on the least significant bits. That is, due to timing constraints, these incrementers 328 are much smaller in width than the corresponding rounding elements in the full-width rounding done in stage four. Because of the limited size of the incrementers 328, not all fraction datums can be correctly rounded by stage three. The mini-round succeeds if the incrementer 328 for an instruction being bypassed does not generate a carry out. If the mini-round fails, the unmodified fraction via output 329 and lines 313*c* to stage four, and the bypass is aborted.

Stage three unit 319 and stage four unit 320 share common busses to drive the results to output interface 321. Stage four will drive the lines 313*d*, 314*d*, 315*d* and 316*d*, during phi3, if it has valid data. Stage three will drive the lines 313*d*, 314*d*, 315*d* and 316*d*, during phi3, if it can successfully bypass an instruction and stage four does not have valid data. When stage three has detected that a bypass may be possible it signals the output interface 321 by asserting a bypass-request on one of control lines 316*d*. The following conditions must be met in order to generate a stage four bypass request: a bypass-enable signal must be asserted; the instruction must be an Add, Subtract, or Multiply; the stage three input data must be valid; a result must not have been sent to stage four in the previous cycle; there are no faults associated with the data. In order to abort a stage four bypass, a bypass-abort signal must be asserted during phi2. Either of two conditions abort a stage four bypass, assuming the bypass request was generated: a mini-round failure, meaning the incrementer 328 produced a carry out of its most significant bit position; or exponent overflow or underflow is detected on an exponent result in the exponent section of stage three.

The ability to bypass the last stage of the pipeline of the floating-point unit 27 for most instructions serves to increase performance by a significant amount. Analysis shows that a majority of the instructions executed by the floating-point unit 27 will satisfy the requirements for a bypass operation, and so the average execution time is reduced by one cycle.

The Destination Queue and F-Box Scoreboard

Figure 18:
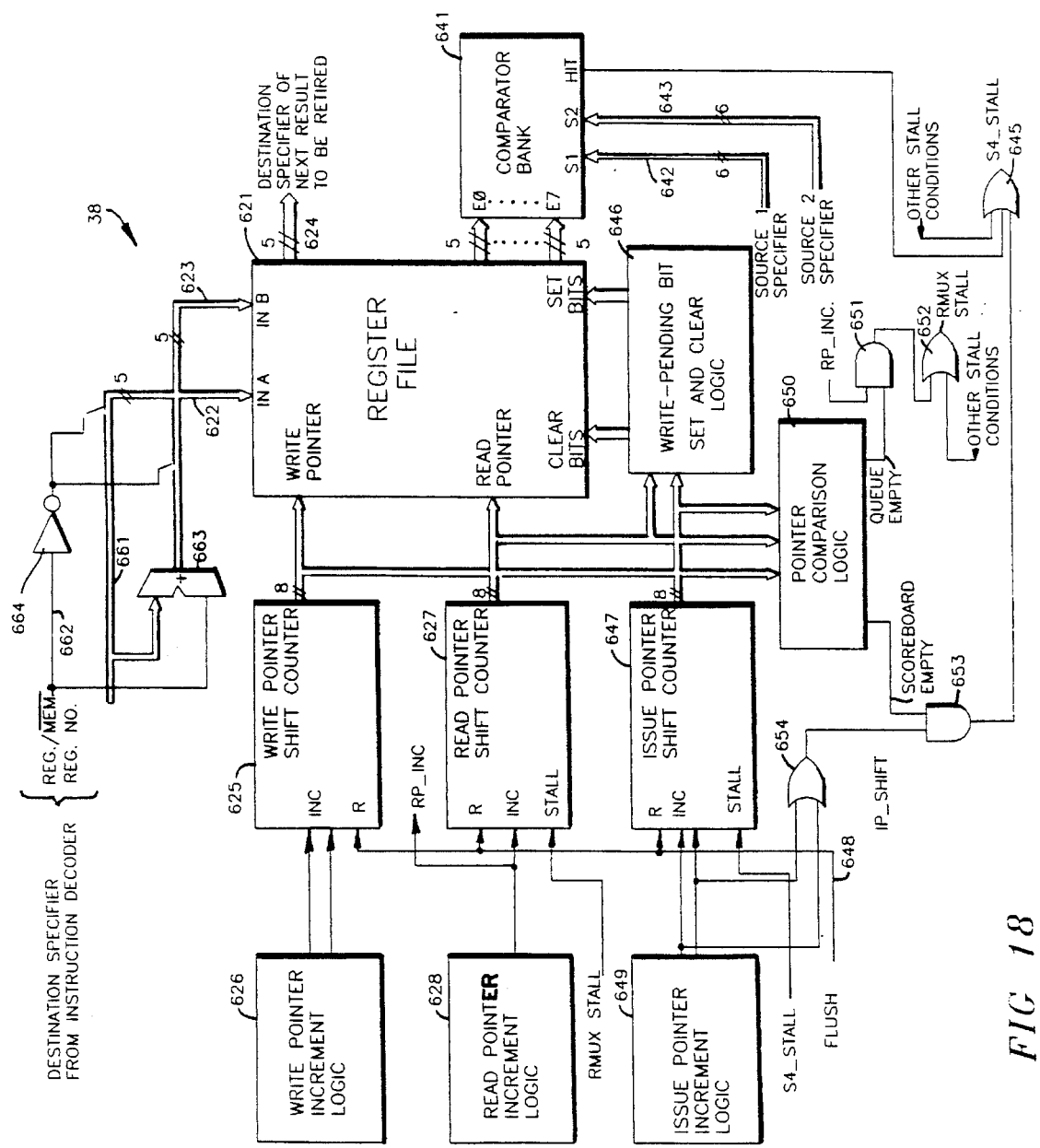
FIG. 18 is an electrical diagram in block form showing the preferred construction for a destination queue and read-after-write conflict scoreboard in accordance with the present invention in the pipelined digital computer of FIG. 1.

Turning now to FIG. 18, there is shown a schematic diagram of the destination queue 38, including its associated read-after-write conflict scoreboard for the floating-point unit (F-Box 27 in FIG. 1). The destination queue includes a register file 621 having two input ports 622, 623 and one output port 624. Information for a destination specifier is written to two successive entries beginning with an entry specified by a write pointer from a write pointer shift counter 625. When destination specifier information is written into the register file 621, the write pointer shift counter is incremented by either one or two counts, as selected by write pointer increment logic 626. In a similar fashion, destination specifier information is read from the register file 621 from an entry indicated by a read pointer provided by a read pointer shift counter 627. After a destination specifier is read from the register file 621, the read pointer shift counter 627 is incremented as controlled by read pointer increment logic 628.

The destination queue carries destination operand information. The information is either an address in the register file 41 (FIG. 16) of a GPR, or a status indicating a memory write to the address in the PA queue (56 in FIG. 5) in the Mbox (55 in FIG. 5). The destination queue is accessed in S4, and no more than one entry is used per cycle. Information read from an entry is used to decide how to write the result which is being calculated by the ALU (45 in FIG. 16), shifter (46 in FIG. 16), or floating-point unit (27 in FIG. 5) in the same cycle. If the destination queue entry indicates a memory store, the request is sent to the Mbox (55 in FIG. 5). An S4 stall occurs if the Mbox is already busy or the PA queue (56 in FIG. 5) entry is not ready. If the destination queue entry indicates a GPR write, the register file 41 (FIG. 16) will be written using the address from the destination queue. The GPR write occurs in the next cycle (S5).

FIG. 19 shows the arrangement and definitions of the various bits in an entry 629 in the destination queue 38 (i.e., an entry in the register file 621 of FIG. 18). Destination queue entries are made for modify and write access type operands. Destination queue entries are also made for modify field operands when the operand specifier has a register mode.

Two destination queue entries are made for each quad-word length operand. If the two entries are for registers, then the entries point to registers N and N+1. If the two entries are for memory operands, then the entries point to byte addresses A and A+4.

Bits 0, 1, 2, and 3 of the entry 629 together specify a register index or general purpose register number. Bit 4, also referred to as MDEST, has a value of 0 to indicate a register specifier, or 1 to indicate another type of destination specifier, such as a memory destination specifier. When MDEST equals 1 for a memory destination specifier, then the register number in bits 0, 1, 2, and 3 either has a value of 1111 binary, or has a value indicating a particular autoincrement or autodecrement specifier that is incremented or decremented when the result of the corresponding operation is stored in memory during retirement of the result.

Bit 5 in the register file entry 629 is a write-pending bit that, when set, indicates that the destination specifier was decoded from an instruction having an operation for which execution has been initiated but not yet completed. In other words, the instruction has been issued but not yet retired. The destination specifiers in the register file 621 of FIG. 18, for which the write-pending bit is set, are "scoreboarded" destination specifiers, and these "scoreboarded" destination specifiers may have a read-after-write conflict with the source specifiers of a current instruction about to be issued.

Returning to FIG. 18, the destination queue 38 has additional circuitry associated with the scoreboard function. The presence of a read-after-write conflict between a current instruction about to be issued and a previously issued instruction is detected by a comparator bank 641 which is responsive to bits 0 to 3 and 5 in each entry in the register file 621. The register file 621, for example, has eight separate entries. The comparator bank 641 receives six bits of a first source specifier on a bus 642 and six bits of a second source specifier on a bus 643. The busses 642 and 643 extend from the source queue (37 in FIG. 16). Each of the two source specifiers is compared to the register number in bits 0 to 3 of each entry having its write-pending bit set.

In the pipelined digital computer as described above with respect to FIGS. 1–17, a read-after-write conflict with an instruction about to be issued may occur when either one of the two source specifiers for the instruction about to be issued specify a register which is to receive a result currently being computed by the floating-point unit (27 in FIG. 1). As shown in FIG. 17, the floating-point unit 27 has several "hidden" pipeline stages that effectively operate between S3 and S4 of FIG. 6 when the floating-point unit processes a floating-point instruction. These additional pipeline stages allow the floating-point unit to accept new instructions and the their associated source operands before it has retired a previous floating-point instruction, giving rise to the possibility of read-after-write conflicts.

The comparator bank 641 includes a pair of comparators associated with each destination queue entry. Each of two source specifiers read from the source queue (37 in FIG. 16) has seven bits, $S_6$, $S_5$, $S_4$, . . . , $S_0$. The most significant bit of each source specifier ($S_6$) is a bit indicating whether or not the source specifier is a short literal. If this most significant bit $S_6$ is set to one, then the lesser significant six bits $S_5$, $S_4$, $S_3$, . . . , $S_0$ represent "short literal" data. Otherwise, $S_5$ is not used, and for this reason bit $S_5$ is not needed by the comparator bank 641, so that the comparator bank 641 receives only six of the seven bits of each of the two source specifiers. The next least significant bit $S_4$ indicates whether the source specifier is a general purpose register or a memory destination. If a source specifier is not a short literal (i.e, $S_6$=0) and indicates that the source is a general purpose register (i.e, $S_4$=1), then the source specifier specifies a register number in bits $S_3$, $S_2$, $S_1$, $S_0$, and the comparator bank 641 will check whether the specified register number $S_3$, $S_2$, $S_1$, $S_0$ is the same as any register number in the register file 631 for a pending write operation. If a matching register number is found in any register file 631 entry having its write-pending bit set, then the comparator bank will signal a "hit."

When a "hit" is indicated, an OR gate 645 generates an S4_STALL signal which prevents the execution unit from issuing the instruction corresponding to the valid source specifier. The stall exists until the result of the previously conflicting instruction is retired in the specified general purpose register. Retirement of that result causes the write-pending bit of the matching entry of the register file 621 to be cleared. For this purpose, the destination queue 38 includes write-pending bit set and clear logic 646 which is responsive to the retirement of a result, and clears the write-pending bit in the entry pointed to by the read pointer when the read pointer is incremented during the "removal" of the conflicting destination specifier from the register file 621.

A source specifier is valid when the source queue is not empty and when the source specifier is actually required for an issue operation as specified by the current microinstruction in the execution unit (i.e., the microinstruction in the S3 microinstruction latch 184 of FIG. 16). This current microinstruction may also have a destination queue entry. The write-pending bit for this destination queue entry is not set unless it is guaranteed that the current instruction will issue. In other words, the write-pending bit for the current microinstruction is set in a cycle following the cycle S3 which validates the source specifiers.

If a sequence of more than one microwords sends the source operands to the floating point unit, then the very last microword in that sequence sets the write-pending bit for a register file entry containing the destination specifier for the floating-point operation. This timing condition ensures that the setting of the write-pending bit for the current instruction is delayed whenever the current instruction is stalled due to a read-after-write conflict between a source specifier for the current instruction and a destination specifier of a previously executing instruction. If the setting of the write-pending bit were not delayed, then it would be possible for the current instruction to conflict with itself if its own destination specifier designated the same register as one of its source specifiers.

When the current instruction is issued, the write-pending bit set and clear logic 646 sets the write-pending bit for an entry in the register file 621 containing the destination specifier for the current instruction. Also, an issue pointer 647 is incremented. The issue pointer is initially set to point to the same entry as the write pointer and the read pointer, for example, in response to a flush or reset signal on a reset line 648. The flush signal to the destination queue is asserted, for example, in every microtrap, including the power-up microtrap.

The issue pointer shift counter 647 is incremented when an instruction issues, which occurs before an instruction is retired. Therefore, the issue pointer tends to lead the read pointer. The issue pointer shift counter 647 is incremented by issue pointer increment logic 649.

It is possible for the execution unit to get ahead of the instruction unit so that it is sometimes necessary to stall the execution unit to wait for a destination specifier before retiring a result or setting the write-pending bit in an entry in the register file. It should be apparent, for example, that a result should not be retired unless there is a destination specifier in the register file 621, or otherwise the execution unit will not know where to put the result, because the execution unit reads the register file to determine where the next result should be retired.

To stall the execution unit when it needs a destination specifier that has not yet been loaded into the destination queue, the destination queue 38 includes pointer comparison logic 650 which compares the read pointer to the write pointer. The pointer comparison logic detects that the destination queue is empty when the read pointer points to the same register file entry as the write pointer. An AND gate 651 further detects when the queue is empty and the execution unit is attempting to retire a result, as indicated by the "RP_INC" signal from the read pointer increment logic 628. The output of the AND gate 651 is combined with other stall conditions in an OR gate 652 to cause a "RMUX STALL" which stalls the retiring of a result until the destination specifier for the result is written into the register file 621.

In a similar fashion, the pointer comparison logic 650 compares the write pointer to the issue pointer from the issue pointer shift counter 647 to detect whether the scoreboard is empty. The scoreboard is empty when the issue pointer is equal to the write pointer, because, in this situation, the register file 621 does not have any entries of decoded but not yet issued instructions. When the scoreboard is empty, an AND gate 653 detects when the execution unit attempts to issue a current instruction. Such an attempt occurs when the issue pointer increment logic 649 attempts to increment the issue pointer shift counter, as detected by an OR gate 654. The OR gate 645 is responsive to the AND gate 653 in this situation to generate a S4_STALL signal to prevent the issuance of the current instruction until the destination specifier for that current instruction is written into the register file 621. This prevents the execution unit from getting so far ahead of the instruction unit that a deadlock situation might arise from a write-pending bit being set for an entry not yet having received its destination specifier. The instruction unit (22 in FIG. 5), for example, can continue to process simple specifiers for new instructions even while the complex specifier unit (40 in FIG. 5) is stalled processing a complex write access type specifier from a previous instruction.

The control logic for the register file 621 is complicated by the fact that a quadword operation affects two registers, including the register explicitly specified in a macroinstruction, and a second register whose register number can be found by adding one to the explicitly specified register number. As shown in FIG. 18, for example, the instruction decoder places on a bus 661 an explicitly specified register number obtained from an instruction. The instruction decoder also places a bit on a line 662 indicating whether the destination operand for the instruction is a register, or whether the destination operand is a memory location. When the destination operand is a register, an adder 663 adds one to the register number on the bus 661 when the destination specifier is a register specifier, in order to compute the register number of the second register affected by any quadword operation, and to place the register number of the second register on the bus 623. The register flag on the line 662 is inverted by an inverter 664 to provide the MDEST bit written in bit four of the register file entry indicated by the write pointer from the write pointer shift counter 625.

When the instruction decoder decodes a quadword instruction, the write pointer shift counter 625 increments by two after the two destination specifiers on the two buses 622, 623 have been written into the register file 621. When the instruction decoder decodes a longword instruction, the two destination specifiers on the two buses 622, 623 are also written into the register file 621, but in this case the second destination specifier on the bus 623 is unnecessary and is ignored by the execution unit. In this case, the write pointer shift counter 625 is incremented by one, so that the second destination specifier on the bus 623 is over-written by the next destination specifier. When a quadword instruction is issued, the write-pending bit set and clear logic 646 sets the write-pending bit in each of the two entries in the register file 621 for the two destination specifiers of the quadword instruction. The two longword results of the quadword instruction, however, are retired sequentially, and therefore the read pointer shift counter 627 always increments by one when a result is retired.

Preferably, a register number is supplied in all destination queue entries, including the queue entries with their MDEST bit set, so that pending writes to memory may cause the comparator bank 641 to detect a read-after-write conflict and stall instruction issue. As discussed above, this is not done to prevent the execution unit from reading a general purpose register before a pending floating point write to the general purpose register completes. Instead, this is done to prevent the execution unit from reading a general purpose register when the instruction unit must first write an incremented or decremented value to the general purpose register, in order to complete the processing of an autoincrement or autodecrement specifier with a write access type for a floating point instruction. In processing such an autoincrement or autodecrement specifier, the complex specifier unit (40 in FIG. 5) in the instruction unit can be stalled for some reason, and thus be delayed from writing the new value into the general purpose register. Therefore, to handle this case, the instruction decoder sends a general purpose register number over the bus 661 with all destination queue entries. If the execution unit reads a general purpose register which was used in a destination specifier, the comparator bank 641 causes an S4_STALL which prevents the read until the destination queue entry is retired.

A related special consideration is a certain minimum latency in the memory management unit or M-box (55 in FIG. 5). Due to minimum latency in the M-box in processing specifier accesses, it is known that the instruction unit CSU (40 in FIG. 5) will update the general purpose register before the associated PA queue (56 in FIG. 5) entry becomes valid, and the destination queue entry will not be retired until the PA queue entry becomes valid. To handle this special case, all RMUX stalls from the OR gate 652 also stall the S4 and S3 pipeline stages when the floating point unit is next to retire an instruction.

When a modify access type specifier is processed, an entry is made in the source and destination queues for the same specifier. If the modify access type specifier is a register mode specifier, it does not cause a deadlock because, as noted above, the write-pending bit for the entry is not set unless the instruction is guaranteed to issue. In particular, the write-pending bit is not set until all operands have been sent to the floating point unit. If the addressing mode is some memory access mode, the instruction decoder provides the index of a memory data register which will hold the source data. Interpreting this memory data index as a general purpose register number could cause a loss in performance if a subsequent instruction accesses the general purpose register with the same index as the memory data register number. To prevent possible loss in performance, the index written into the register file of the destination queue is set to a value of 1111 binary for modify access type operands only. An index of 1111 binary specifies the program counter, which does not cause a loss in performance because instructions typically do not specify that the execution unit is to directly access the program counter when the instruction is issued. The VAX (Trademark) instruction architecture does not define what the program counter value is in such a case, and the digital computer, for example, supplies a value of 0.

Figure 20:
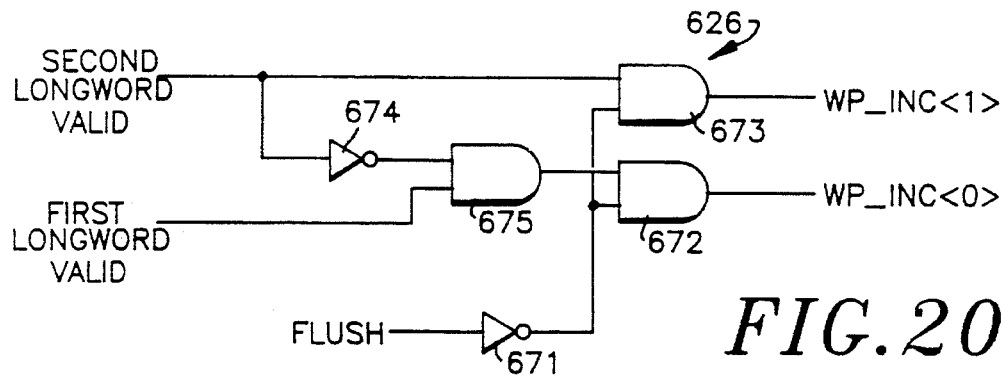
FIG. 20 is a schematic diagram of write pointer increment logic used in FIG. 18.

Turning now to FIG. 20, there is shown a schematic diagram of the write pointer increment logic 626. The write pointer shift counter is incremented by either 0, 1, or 2, as specified by the binary value of WP_INC<1:0>. When a "flush" signal is asserted, an inverter 671 and AND gates 672, 673 set the increment value WP_INC<1:0> to 0. Otherwise, if the destination specifier is for a quadword operation, then the instruction decoder sends a "second longword valid" signal, and an inverter 674 and an AND gate 675 set the increment value WP_INC<1:0> to 2. Otherwise, when a "first longword valid" signal from the instruction decoder is asserted, the increment value WP_INC<1:0> is set to 1. In the final case, where the instruction decoder sends neither a second longword valid signal nor a first longword valid signal, the increment value WP_INC<1:0> is zero, so that the value of the write pointer does not change.

Figure 21:
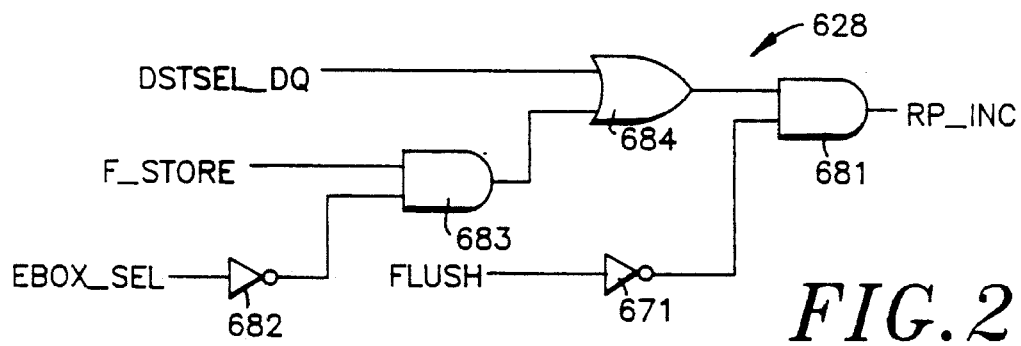
FIG. 21 is a schematic diagram of read pointer increment logic used in FIG. 18.

Turning now to FIG. 21, there is shown a schematic diagram of the read pointer increment logic 628. The write pointer is incremented by either 0 or 1, as specified by the binary value of RP_INC. When the FLUSH signal is asserted, the inverter 671 (also used in the circuit of FIG. 19) and an AND gate 681 set RP_INC to zero so that the value of the read pointer does not change. When a result is retired from the shifter 46 or arithmetic logic unit 45 of the execution unit in FIG. 16, a signal DSTSEL_DQ is asserted, and an OR gate 684 and the AND gate 81 set RP_INC to one, to increment the read pointer by one. When a result is retired from the floating point unit, a signal F_STORE is asserted and a signal EBOX_SEL signal is not asserted, and an inverter 682, an AND gate 683, and the OR gate 684 and AND gate 681 set RP_INC to one, to increment the read pointer by one.

Figure 22:
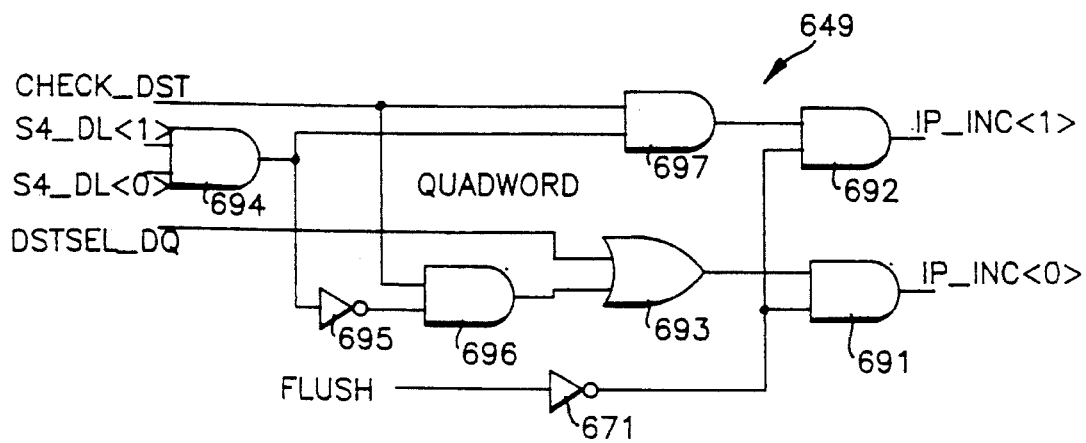
FIG. 22 is a schematic diagram of issue pointer increment logic used in FIG. 18.

Turning now to FIG. 22, there is shown a schematic diagram of the issue pointer increment logic 649. The issue pointer is incremented by either 0, 1 or 2, as specified by the binary value of a signal IP_INC<1:0>. When the FLUSH signal is asserted, the inverter 671, also used in FIGS. 20 and 21, and AND gates 691 and 692 set IP_INC<1:0> to zero, so that the value of the issue pointer does not change. When the shifter 46 or the arithmetic logic unit 45 of FIG. 16 executes and retires an instruction, the DSTSEL_DQ signal is asserted, and CHECK DST is not asserted, and an OR gate 693, an AND gate 697, and the AND gates 691 and 692 set IP_INC<1:0> to one. Otherwise, the issue pointer is incremented when an instruction is issued to the floating point unit, as indicated by the "CHECK_DST" signal.

The "CHECK_DST" signal occurs during the last microinstruction word of the instruction issue process. A floating point operation, however, may correspond to either one or two entries in the destination queue, depending on whether the destination operand is a longword or quadword operand. An AND gate 694 detects the quadword data type from bits 0 and 1 of the data length field (S4_DL) from the S4 instruction context latch in FIG. 16. When the destination operand being issued is a quadword operand, then an inverter 695 and AND gates 696 and 697 insure that the issue pointer is incremented by two. Otherwise, when a floating point operation having a longword destination operand is being issued to the floating point unit, the inverter 695 and gates 696 and 697 insure that the issue pointer is incremented by one.

Figure 23:
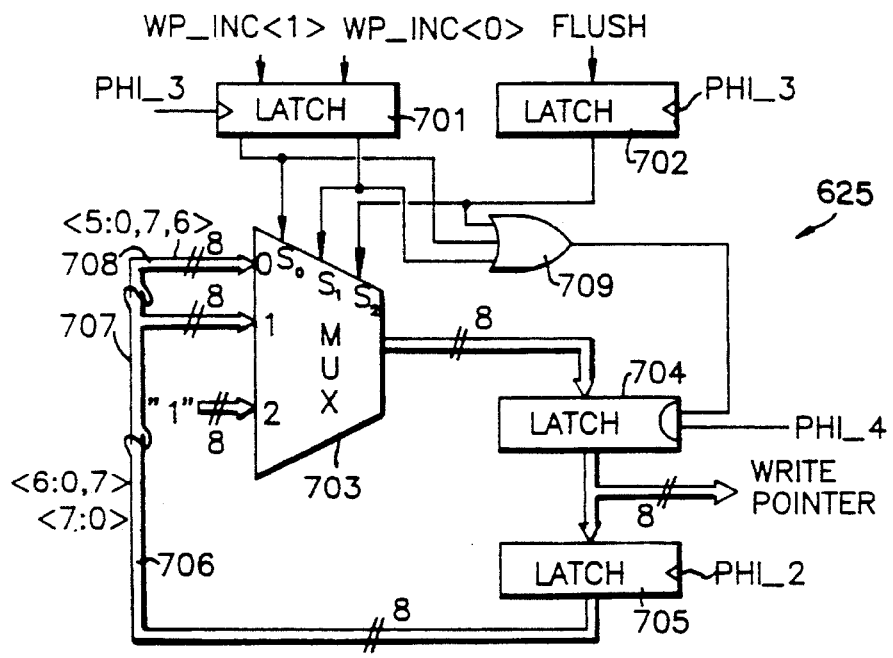
FIG. 23 is a schematic diagram of a write pointer shift counter used in FIG. 18.

Turning now to FIG. 23, there is shown a schematic diagram of the write pointer shift counter 625, which receives latched WP_INC and FLUSH signals from latches 701 and 702 clocked by the phase 3 clock (PHI_3). The three binary signals from the latches 701, 702 are mutually exclusive, so that they readily serve as select signals for a three input multiplexer 703.

When the FLUSH signal is asserted, the multiplexer 703 selects an initial value of "00000001" binary and passes the value to a latch 704 which samples the output of the multiplexer 703 on the phase 4 clock (PHI_4) and otherwise holds the sampled value. Similarly, when the WP_INC bit 0 signal is asserted, the multiplexer 703 selects a value of 1 plus the previous count, which is obtained from a latch 705. The initial value of "00000001" is incremented by one to arrive at a new value of "00000010". In other words, the set bit is shifted left by one binary position when the pointer is incremented by one. The write pointer therefore has a value corresponding not to the binary number indicated by the set bit, but corresponding to a unique bit position containing a set bit, and the other bit positions are clear. The write pointer counter 625 is an eight-bit "shift counter" instead of a three bit "binary counter" so that a decoder is not needed for using the write pointer to select the two entries in the register file 621 to receive the two destination specifiers of the next decoded instruction.

The latch 705 is clocked by the PHI_2 clock, so that the combination of latches 704 and 705 function as a master-slave register. An adder is not needed in the shift counter 625, because an addition of one count is obtained by a transposition of the wires in the bus 706, by transposing the most significant bit from the bus 706 to the least significant bit position of the bus 707.

In a similar fashion, when the WP_INC bit 1 is asserted, the multiplexer 703 selects the output of the latch 705 plus 2. The additional plus 1 is obtained by another transposition of the most significant bit in the bus 707 to the least significant bit position of the bus 708.

When neither of the inputs WP_INC bits 0 or 1, or the FLUSH signal, are asserted, then the latch 704 merely holds its previous value. For this purpose, the latch 704 is enabled by the coincidence of the PHI_4 clock and the output of an OR gate 709 which combines the three binary signals from the latches 701, 702. The output of the latch 704 provides the eight-bit write pointer to the register file 621 in FIG. 18.

Figure 24:
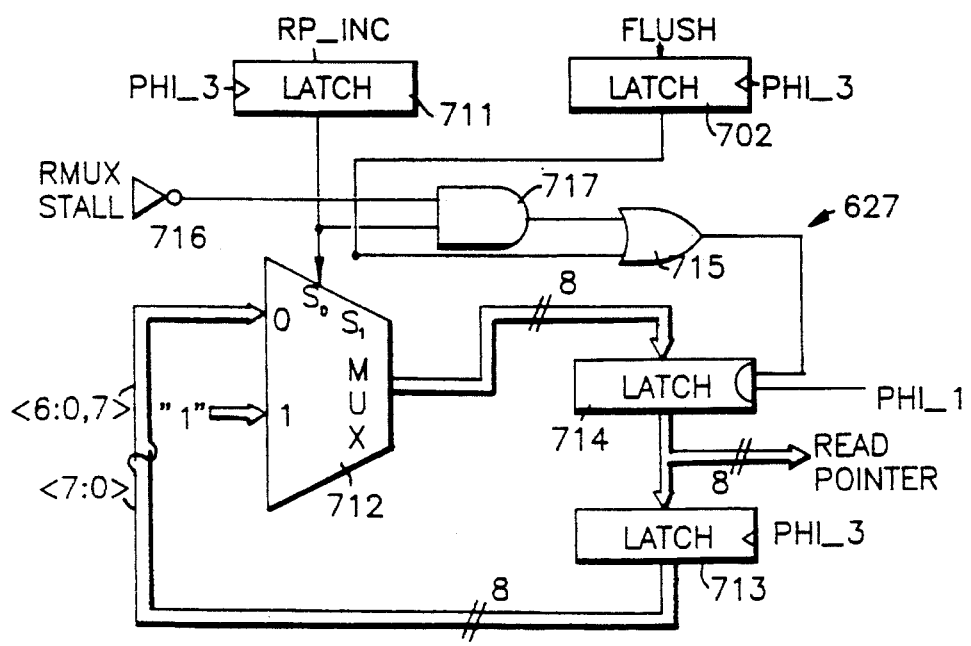
FIG. 24 is a schematic diagram of a read pointer shift counter used in FIG. 18.

Turning now to FIG. 24, there is shown a schematic diagram of the read pointer shift counter 627, which receives latched RP_INC and FLUSH signals from a latch 711 and the latch 702 (which is shared with the circuit in FIG. 23). The read pointer increment logic 628 of FIG. 21 insures that the two binary signals from the latches 711, 702 are mutually exclusive, thereby simplifying the construction of the multiplexer 712. When the flush signal is asserted, the multiplexer 712 selects the same initial binary value of 00000001 binary as is selected as the initial value by the multiplexer 703 in FIG. 23. When the multiplexer 712 is enabled by the RP_INC signal from the latch 711, the multiplexer selects a value of 1 plus the value from a latch 713, using the same bus wire transposition technique described above with respect to FIG. 23. Moreover, the read pointer shift counter 627 includes a latch 714 which samples the selected output of the multiplexer 712 during the phase 1 clock PHI_1 and which functions as a master/slave register in combination with the latch 713. The latch 714 is enabled during the coincidence of the phase 1 clock PHI_1 and the output of an OR gate 715 to insure that the latch 714 holds its value when neither the RP_INC nor the FLUSH signal is asserted. However, when the RMUX STALL signal is asserted, the latch 714 retains its value even when the RP_INC signal is asserted, as provided by an inverter 716 and an AND gate 717.

Figure 25:
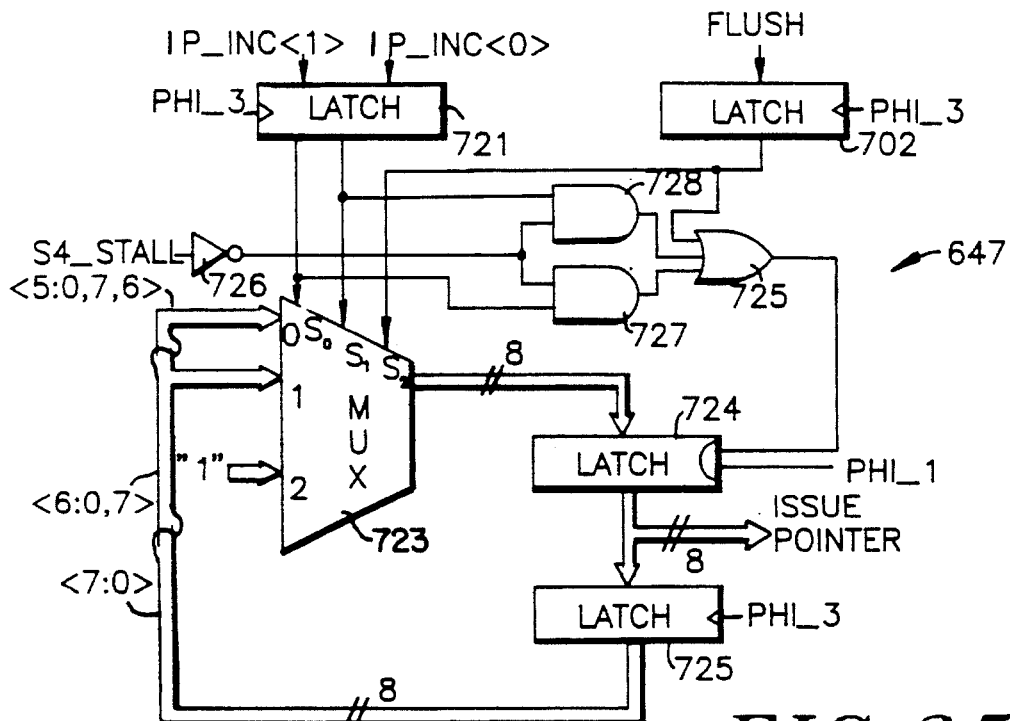
FIG. 25 is a schematic diagram of an issue pointer shift counter used in FIG. 18.

Turning now to FIG. 25, there is shown a schematic diagram of the issue pointer shift counter 647. The issue pointer shift counter 647 receives the IP_INC<1:0> and FLUSH signals from a latch 721 and the latch 702 (which is shared with the circuits in FIGS. 23 and 24). The issue pointer shift counter 647 has a multiplexer 723, a first latch 724 clocked by the phase 1 clock PHI_1, a latch 725 clocked by the phase 3 clock PHI_3, and an OR gate 725, which function in a similar way to the similar components in the write pointer shift counter 625 of FIG. 23. The issue pointer shift counter, however, is also responsive to a S4_STALL signal which prevents the issue pointer from being incremented when the S4_STALL signal is asserted, as provided by an inverter 726 and AND gates 727, 728.

Figure 26:
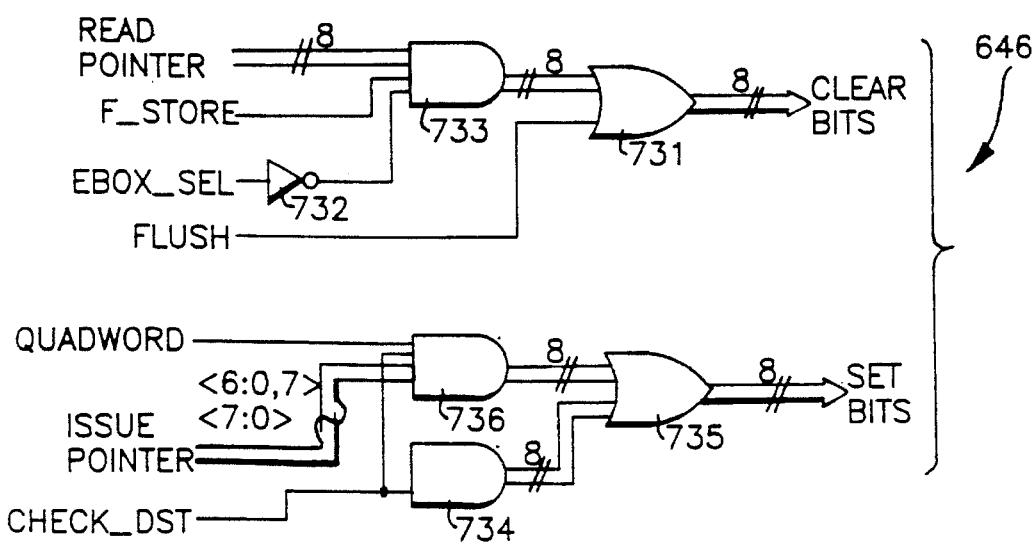
FIG. 26 is a schematic diagram of write pending bit set and clear logic used in FIG. 18.

Turning now to FIG. 26, there is shown a schematic diagram of the write-pending bit set and clear logic 646. When the FLUSH signal is asserted, an OR gate 731 clears all of the write-pending bits. Otherwise, a write-pending bit specified by the read pointer is cleared when the corresponding result is retired from the floating point unit when the F_STORE signal is asserted and the EBOX_SEL signal is not asserted, as detected by an inverter 732 and an AND gate 733.

At least the one write-pending bit specified by the issue pointer is set by an AND gate 734 and an OR gate 735 in response to the CHECK_DEST signal from the last microword during the issuing of a floating-point instruction to the floating-point unit. When this instruction is a quadword instruction, the QUADWORD signal is asserted, and an AND gate 736 and the OR gate 735 also set the write-pending bit in the next entry of the destination queue before the entry specified by the issue pointer. This next entry is at the location that would be pointed to if the issue pointer were incremented by one.

Figure 27:
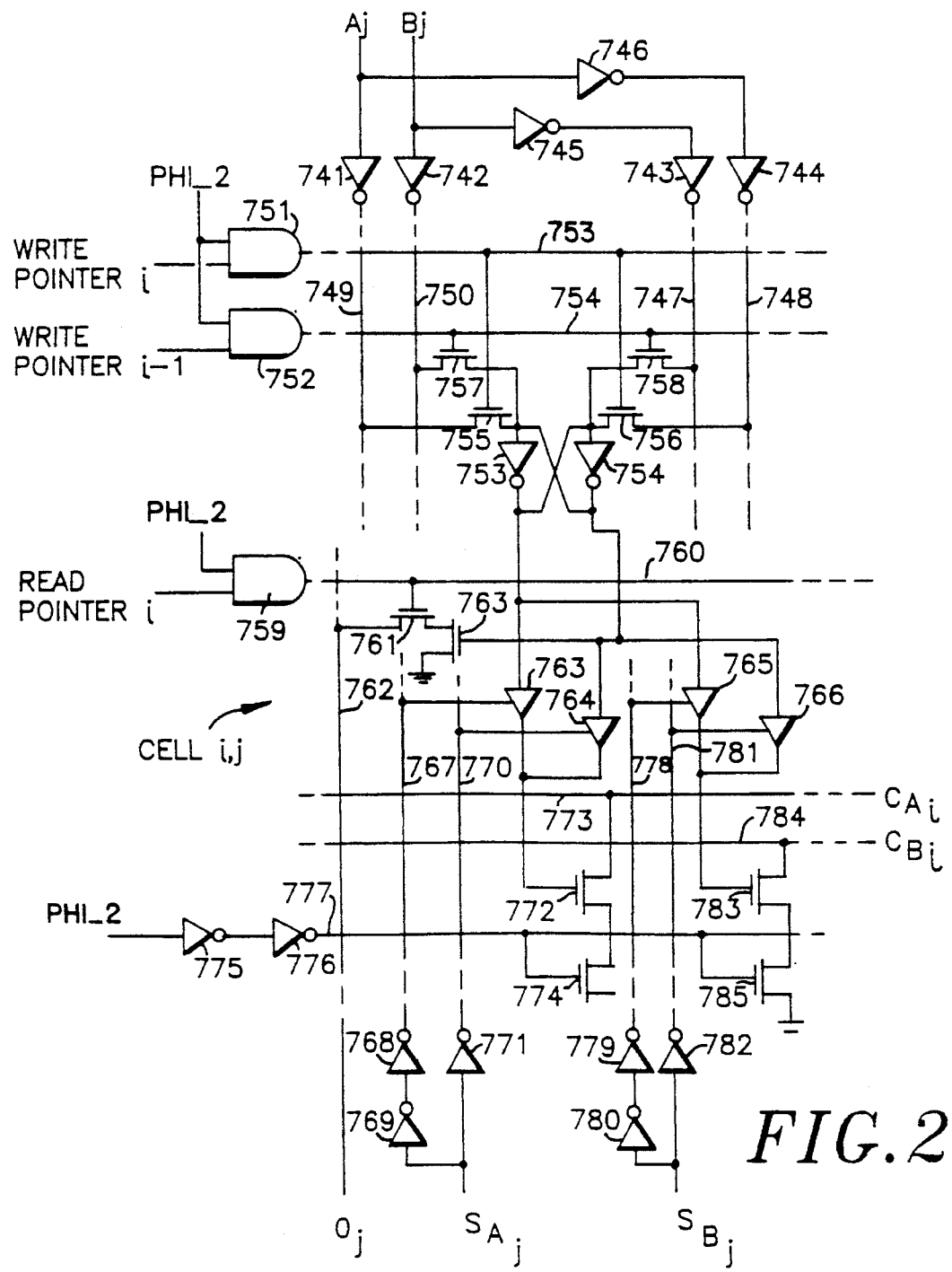
FIG. 27 is a schematic diagram of a storage cell and bit comparator for one of the bits of an index or register number in the register file of FIG. 18.

Turning now to FIG. 27, there is shown a schematic diagram of a memory cell ($CELL_{i,j}$) and bit comparator for storing one of the bits of a register number in the register file (621 of FIG. 18), and for comparing that bit to two corresponding bits $S_{Aj}$ and $S_{Bj}$ from the first and second source specifiers (SOURCE 1 SPECIFIER and SOURCE 2 SPECIFIER in FIG. 18). The memory cell and comparator is a kind of static CMOS associative RAM cell having two input lines $A_j$ and $B_j$, one data output line $O_j$, and two comparator output lines $C_{Ai}$ and $C_{Bi}$. It is assumed that the output lines are precharged before output data are asserted on the lines during phase 2 of the clock PHI_2.

A set of inverters 741, 742, 743, 744, 745 and 746 assert the data inputs on $A_j$ and $B_j$ true and $A_j$ and $B_j$ complement on vertical lines 747, 748, 749, and 750, respectively. During phase 2 of the clock (PHI_2), and gates 751 and 752 apply the write pointer (i) and (i−1) to horizontal write entry select lines 753 and 754. A pair of cross-coupled CMOS inverters 755 and 756 comprise the storage element of the cell(i,j). When the entry of the cell(i,j) is selected by the ith line of the write pointer, a pair of NMOS transistors 755 and 756 set the inverters 755 and 756 to the logic state of the input $A_j$. When the entry of the cell(i,j) is selected by the i-1th line of the write pointer, a pair of NMOS transistors 757 and 758 set the inverters 755 and 756 to the logic state of the input $B_j$. To read a bit of data is read from the cell, the ith line of the read pointer is combined in an AND gate 759 with phase 2 of the clock PHI_2 to drive a horizontal entry select line 760 and enable an NMOS transistor 761. The transistor 761 connects a data output line 762 to an NMOS transistor 763. The gate of the transistor 763 is connected to the output of the inverter 754 to selectively connect the output line 762 to ground. Therefore, when the output line 762 is precharged, it assumes the logic state of the cell at the end of phase 2 of the clock PHI_2.

The storage cells in the destination queue for bits j=0, 1, 2, and 3 also have bit comparator logic; the storage cells for the bits j=4 and 5 do not. The storage cells for the bits j=4, which store the MDEST bits, are constructed as described above with reference to FIG. 27. The storage cells for the bits j=5, which store the write-pending bits, are constructed as described below with reference to FIG. 28.

The bit comparator logic for the cell (i,j) includes two bit comparators, each including a pair of CMOS transmission gates 763, 764 and 765, 766 receiving the outputs of the inverters 753, 754. The transmission gate 763 is enabled by the $S_{Aj}$ signal from a vertical line 767 driven by a pair of inverters 768, 769. The transmission gate 764 is enabled by the complement of the $S_{Aj}$ signal from a vertical line 770 driven by an inverter 771. The outputs of the transmission gates 763 and 764 are connected to the gate of an NMOS transistor 776, so that the NMOS transistor is enabled when the state of the inverters fails to match the state of $S_{Aj}$. The transistor 772 connects a horizontal comparator output line 773 to ground through another transistor 774. The transistor 774 is enabled by the phase 2 clock by inverters 775 and 776 which drive a horizontal line 777. Therefore, when the output line 773 is precharged, it is driven to a low logic state by the end of the phase 2 clock PHI_2 when the state of the inverters fails to match the state of $S_{Aj}$. When four of the cells (i,j) for bit positions j=3, 2, 1, 0 are connected horizontally, the line 773 is driven to a low logic state by the end of the phase 2 clock PHI_2 whenever the register number in the entry i fails to match the register number specified by $S_A$.

In a similar fashion, the transmission gate 765 is enabled by the $S_{Bj}$ signal on a vertical line 776 driven by inverters 779 and 780, and the transmission gate 766 is driven by the complement of the $S_{Bj}$ signal on a vertical line 781 driven an inverter 782. The outputs of the transmission gates 765 and 766 are connected to the gate of an NMOS transistor 783, which connects a horizontal output line 784 to ground through another NMOS transistor 785 enabled by the phase 2 clock PHI_2. Therefore, when the output line 784 is precharged, it is driven to a low logic state by the end of the phase 2 clock PHI_2 when the state of the inverters fails to match the state of $S_{Bj}$. When four of the cells (i,j) for bit positions j=3, 2, 1, 0 are connected horizontally, the line 784 is driven to a low logic state by the end of the phase 2 clock PHI_2 whenever the register number in the entry i fails to match the register number specified by $S_B$.

Figure 28:
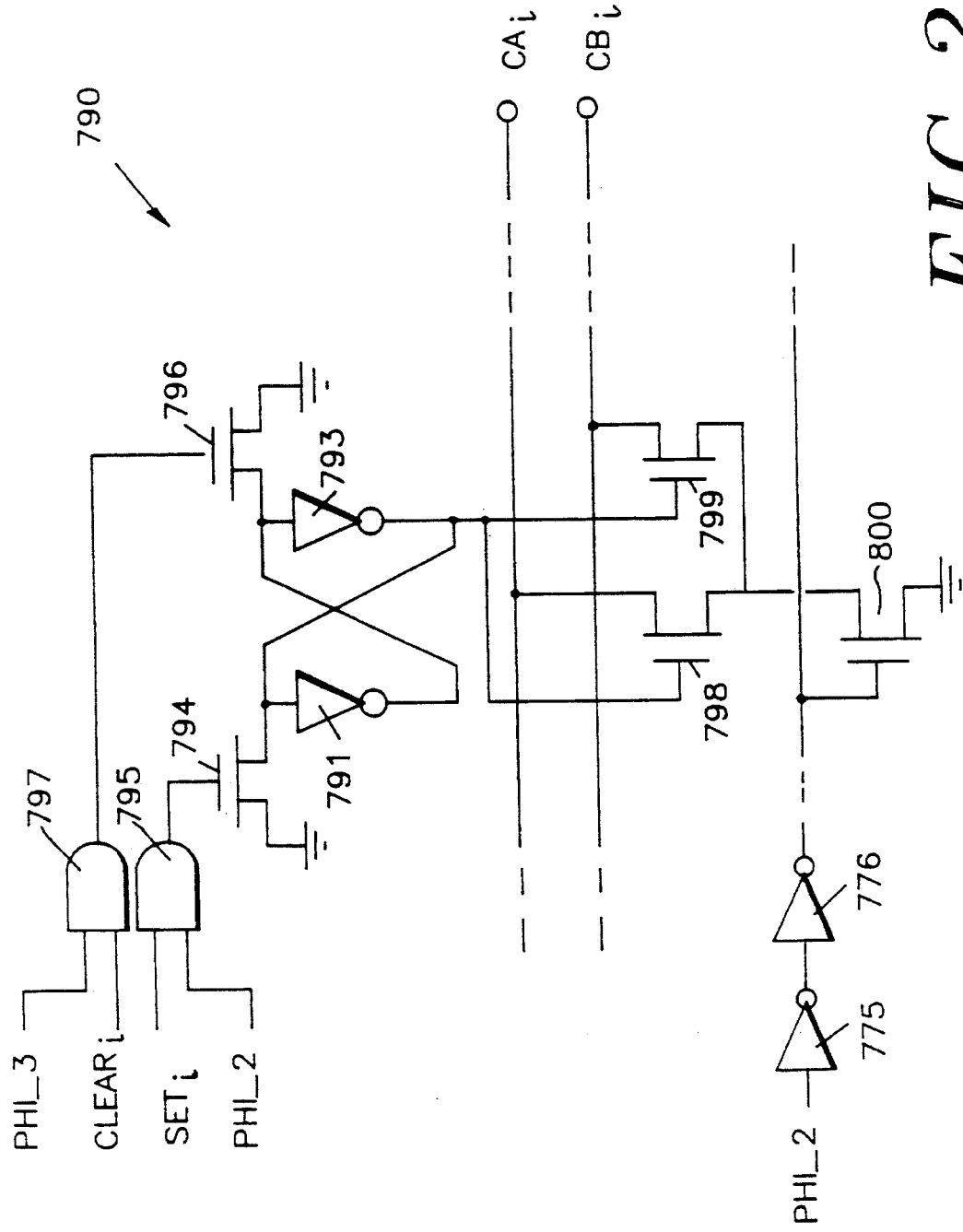
FIG. 28 is a schematic diagram of a storage cell in the register file of FIG. 18 for storing a write-pending bit.

Turning now to FIG. 28, there is shown a schematic diagram of a storage cell 790 for storing a "write-pending" bit in the ith entry in the register file (621 in FIG. 18). The state of the storage cell 790 is held in a pair of cross-coupled CMOS inverters 791, 792. The storage cell 790 is set by an NMOS transistor 794 enabled by an AND gate 795 during phase 2 of the clock PHI_2 when the $SET_i$ signal (from the write-pending bit set and clear logic 646 of FIG. 26) is asserted. The storage cell 790 is cleared by an NMOS transistor 796 enabled by an AND gate 797 during the phase 3 clock PHI_3 when the $CLEAR_i$ signal (from the write-pending bit set and clear logic 646 of FIG. 26) is asserted. If the write-pending bit for the ith entry is not set, then the ith entry should not be permitted to match either of the two source 1 and source 2 specifiers. Therefore, when the write-pending bit is not set, NMOS transistors 798 and 799 are enabled to discharge the comparator output lines $C_{Ai}$ and $C_{Bi}$ through an NMOS transistor 800 during the phase 2 clock PHI_2.

Figure 29:
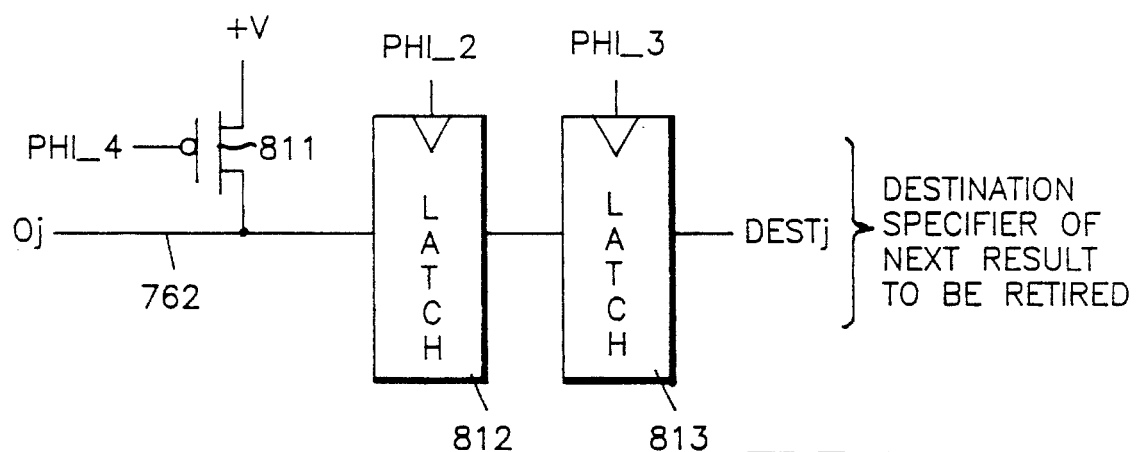
FIG. 29 is a schematic diagram of a precharge arrangement and output latch for an output line conveying a bit of a destination specifier read from the register file of FIG. 18.

Turning now to FIG. 29, there is shown a schematic diagram of a precharge and output latch circuit for the output line conveying a bit $O_j$ of a destination specifier read from the register file 621 of FIG. 18. A PMOS transistor 811 precharges the output line 762 during phase 4 of the clock PHI_4. A latch 812 holds the state of the output line 762 existing at the end of the phase 2 clock. Another latch 813 enabled by the phase 3 clock PHI_3 receives the output of the latch 812 so that the output of the latch 813 changes at the beginning of the phase 3 clock PHI_3.

Figure 30:
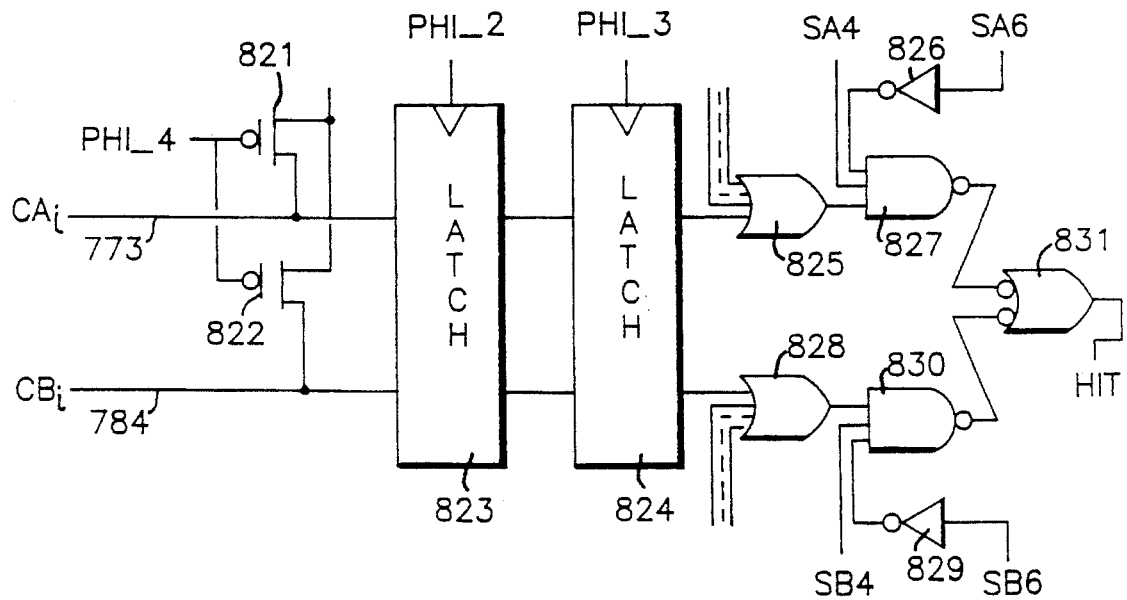
FIG. 30 is a schematic diagram of a precharge arrangement, output latches and logic associated with the comparator bank of FIG. 18.

Turning now to FIG. 30, there is shown a schematic diagram of a precharge circuit, output latches and logic associated with the comparator output lines 773 and 784 from the bit comparator circuits in FIG. 27. Respective transistors 821, 822 precharge the output lines 773 and 784 during the phase 4 clock PHI_4, and the logic states existing on the output lines at the end of the phase 2 clock are held in a latch 823. Another latch 824 is enabled by the phase 3 clock PHI_3 so that the output of the latch 824 changes only at the beginning of the phase 3 clock PHI_3.

To detect when a match occurs for any of the entries in the register file (621 in FIG. 18), an OR gate 825 has eight inputs receiving latched $C_{Ai}$ signals from the eight entries in the register file. When the latched $C_{Ai}$ signal from any one of the eight entries is a logic high, indicating a match, the OR gate 825 asserts a high signal. A hit for the source 1 specifier $S_A$, however, should be indicated only when the source 1 specifier is not a short literal (bit $S_{A6}$ not asserted) and when the source 1 specifier is a register specifier (bit $S_{A4}$ asserted). Therefore an inverter 827 and a NAND gate 826 qualify the match to generate a hit signal. In a similar fashion, an OR gate 828 has eight inputs receiving latched $C_{Bi}$ signals from the eight entries in the register file. When the $C_{Bi}$ signal from any one of eight entries is a logic high, indicating a match, the OR gate 828 asserts a high signal. The match signal from the OR gate 828 is qualified by an inverter 829 and a NAND gate 830 so that a hit signal is generated only when the source 2 specifier is not a short literal (bit $S_{B6}$ not asserted) and is a register specifier (bit $S_{B4}$ asserted). A NOR gate 831 combines the outputs of the NAND gates 827, 828 to generate the comparator bank HIT signal which causes an S4 stall.

The HIT signal generating circuitry in FIGS. 27 to 30 has certain timing in relation to the timing of the bit set and clear logic 646 of FIG. 26 so as to obtain efficient pipeline operation. The HIT signal is generated to stall the S3 microword when the S3 microword validates a source specifier which accesses a general purpose register specified by a destination queue entry whose write-pending bit is being set by the microword in S4.

In S4, when the floating-point unit stores a result, the corresponding write-pending bit of the destination queue is reset, and therefore the destination queue entry can no longer cause a scoreboard hit stall. The write-pending bit is cleared even if there is an RMUX stall. In all cases this is safe either because the destination queue entry has MDEST set or because the RMUX stall causes an S4 stall which in turn causes an S3 stall which prevents operand delivery to the floating-point unit.

Write-pending bits in the destination queue are reset in S4 as the floating-point unit writes results, even in the MDEST bit is set in the destination queue entry being retired. Therefore, an S3 stall due to the scoreboard is broken in the cycle in which the floating-point unit writes results.

Figure 31:
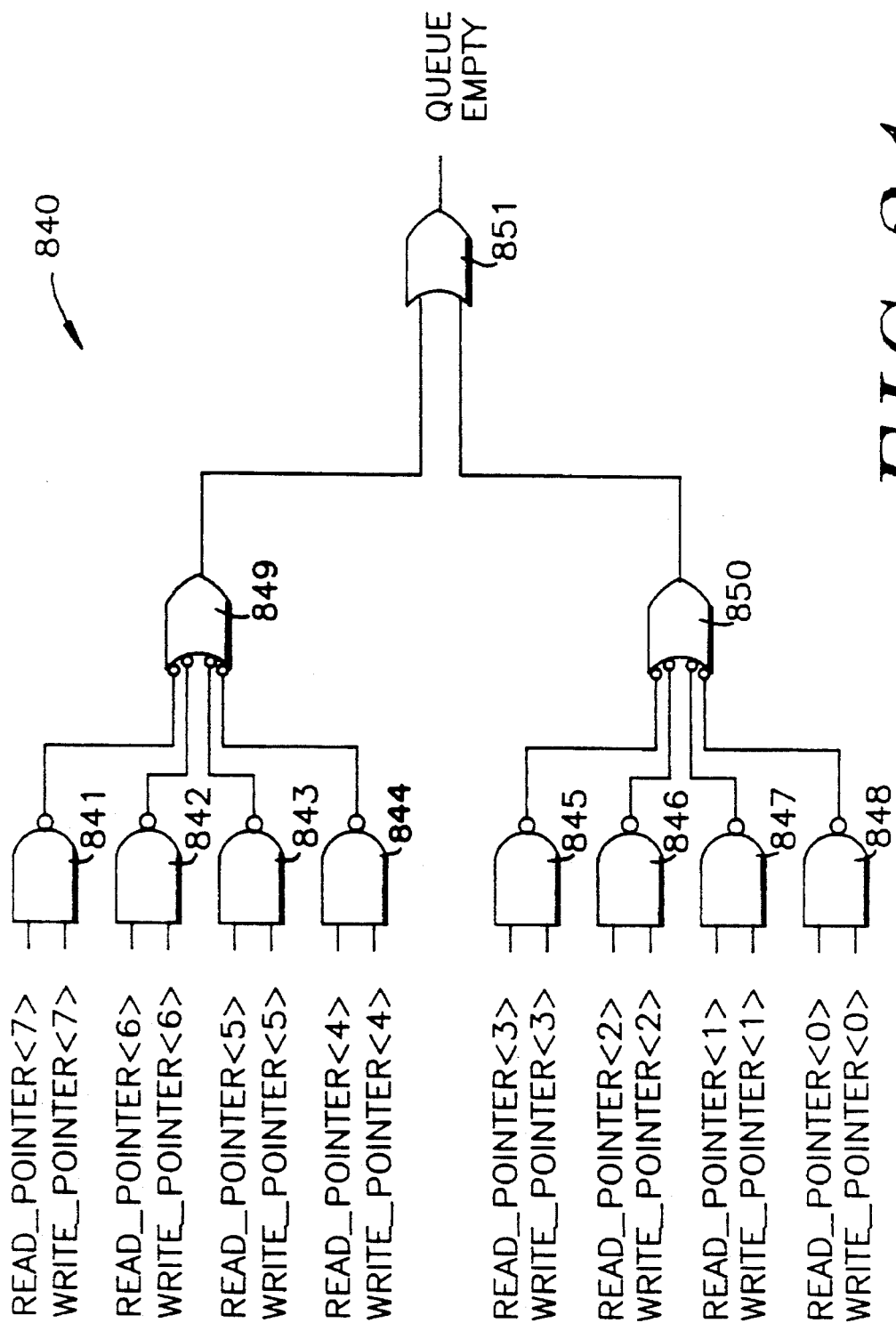
FIG. 31 is a schematic diagram of pointer comparison logic of FIG. 18 which determines when the destination queue is empty.

Turning now to FIG. 31, there is shown a schematic diagram of pointer comparison logic 840 that is a portion of the pointer comparison logic 646 in FIG. 18. The pointer comparison logic 840 in FIG. 31 generates the QUEUE EMPTY signal when the destination queue read pointer points to the same entry as the destination queue write pointer. The pointer comparison logic 840 has a first level of eight NAND gates 841 to 848 including a respective NAND gate receiving the ith bit of the read pointer and the corresponding ith bit of the write pointer. Because one and only one bit of the read pointer is set and one and only one bit of the write pointer is set, one of the NAND gates 841 to 848 will assert an active low signal when both the read pointer and the write pointer point to the same entry. The outputs of the NAND gates 841 to 844 are combined in a NAND gate 849, the outputs of the NAND gates 845 to 848 are combined in a NAND gate 850, and the outputs of the NAND gates 849 and 850 are combined in an OR gate 851 to assert the QUEUE EMPTY signal active high whenever any one of the NAND gates 841 to 848 asserts a signal active low.

Figure 32:
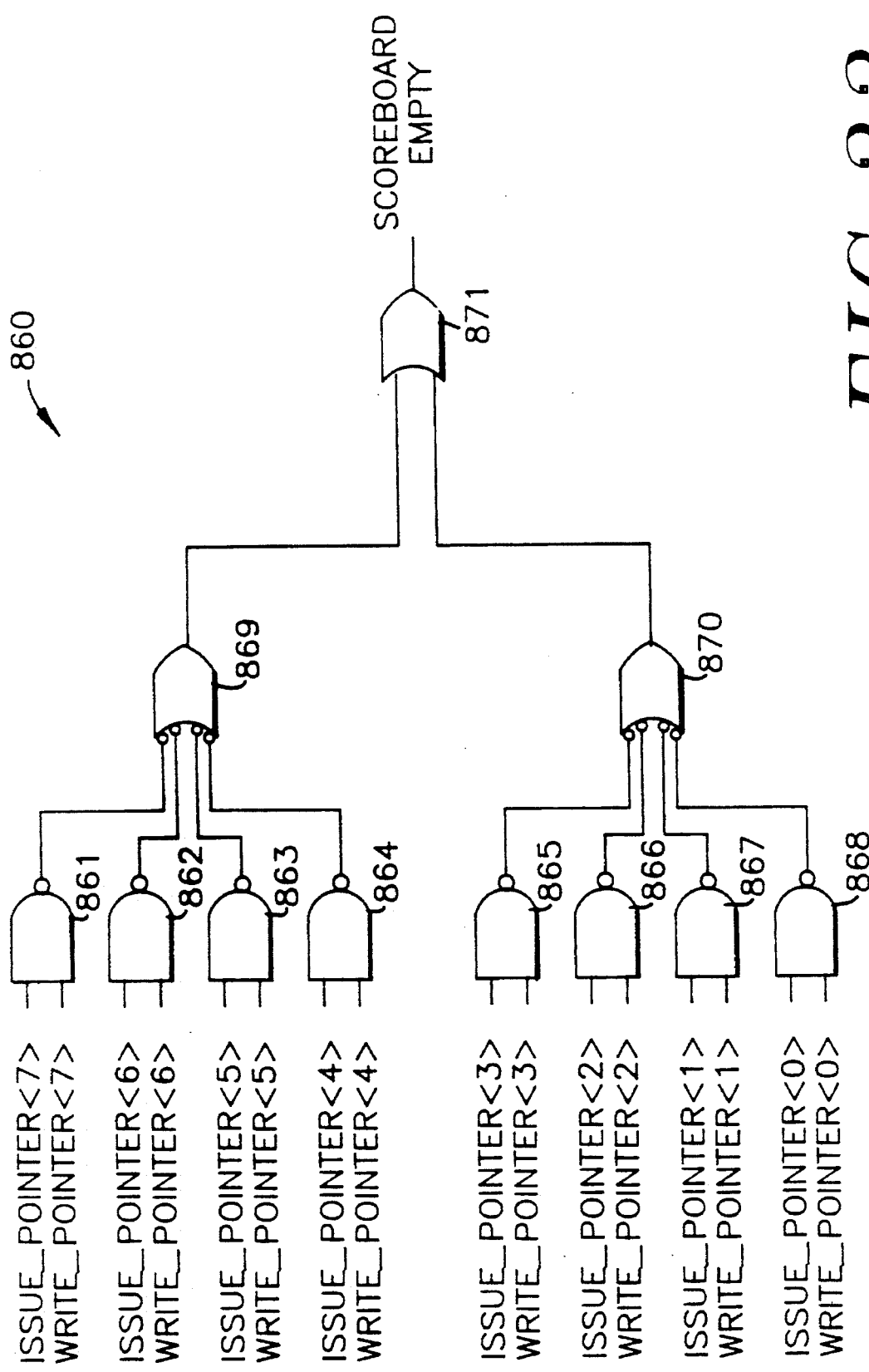
FIG. 32 is a schematic diagram of pointer comparison logic of FIG. 18 which determines when the scoreboard of FIG. 18 is empty.

Turning now to FIG. 32, there is shown a schematic diagram of pointer comparison logic 860 that is a portion of the pointer comparison logic 646 in FIG. 18. The pointer comparison logic 860 in FIG. 31 generates the SCOREBOARD EMPTY signal when the destination queue issue pointer points to the same entry as the destination queue write pointer. The pointer comparison logic 860 has a first level of eight NAND gates 861 to 868 including a respective NAND gate receiving the ith bit of the issue pointer and the corresponding ith bit of the write pointer. Because one and only one bit of the issue pointer is set and one and only one bit of the write pointer is set, one of the NAND gates 861 to 868 will assert an active low signal when both the read pointer and the write pointer point to the same entry. The outputs of the NAND gates 861 to 864 are combined in a NAND gate 869, the outputs of the NAND gates 865 to 868 are combined in a NAND gate 870, and the outputs of the NAND gates 869 and 870 are combined in an OR gate 871 to assert the SCOREBOARD EMPTY signal active high whenever any one of the NAND gates 861 to 868 asserts a signal active low.

The Retire Queue and Pipeline Merging

As shown in FIG. 16 and as introduced above, The retire queue 72 controls the Rmux 50 to select either the execution unit 23 or the floating point unit 27 to supply the result to be next processed or retired. Non-selected Rmux sources are delayed until the retire queue 72 indicates that they should be processed. Therefore the execution unit uses the retire queue to force macroinstructions to retire in order.

The retire queue contains single-bit entries. The bit in each entry indicates whether the execution unit 23 or the floating-point unit 27 is the source of the next macroinstruction to retire. The execution unit adds an entry to the retire queue 27 in S3 each time a new macroinstruction execution flow begins. If there is an S3 stall, the entry is added to the retire queue in the first cycle of the stall. Exactly one entry is made whether or not an S3 stall occurs for one or more cycles. The entry is obtained from a bit of the instruction context that is also sent to the S3 instruction context latch 203.

The floating-point unit can be disabled by setting a control status bit in a control status register. In this case neither operations nor operands are dispatched to the floating-point unit, and the entry in the retire queue 72 is forced to indicate that the Rmux 50 should select a result from the execution unit instead of the floating-point unit. When the floating-point unit is disabled, a floating-point instruction reaching the S4 stage of the execution unit causes the execution unit to take a microtrap, except the execution unit microcode will execute a longword multiply instruction (MULL). Because the entry in the retire queue is forced to indicate that the RMUX should select the execution unit, the result of the longword multiply instruction is selected from the execution unit when the floating-point unit is disabled. When the execution unit takes a microtrap, the retire queue is flushed, and whenever the retire queue is empty, the Rmux 50 selects the execution unit. The retire queue is also flushed when the digital computer is reset.

It is possible for the execution unit microsequencer to dispatch to a specific microcode entry point regardless of the instruction queue contents and without flushing the retire queue. Since such a dispatch is to an execution unit microcode flow which will not send operands to the floating-point unit, the execution unit must be selected in the retire queue (although any previous instruction is not affected and retires normally). Otherwise, the execution unit could stall waiting for a result from the floating-point unit, while the floating-point unit waited for source operands to be sent, causing a deadlock.

The execution unit examines the retire queue in S4 (without retiring an entry) to determine whether the floating-point unit or the execution unit is the next source of a retiring macroinstruction. Based on the output of the retire queue, the Rmux 50 is set to select either the floating-point unit or the execution unit as the source of control for S4-initiated memory references and most S5 operations. This selection remains in effect until the retire queue entry is retired. The retire queue entry is retired when the execution unit microcode advances a read pointer for the retire queue during retirement of the macroinstruction. If the floating-point unit is next to retire a macroinstruction, the retire queue entry is retired in S4 when there is no S4 stall and the operation advances into S5. If the execution unit is next to retire a macroinstruction, the retire queue entry is also retired in S4 when there is no S4 stall and the operation advances into S5.

It is not possible for the retire queue to have less than the necessary number of entries in it, except after a microtrap, because each entry is added before it is required. The maximum number of entries in the retire queue is six.

Figure 33:
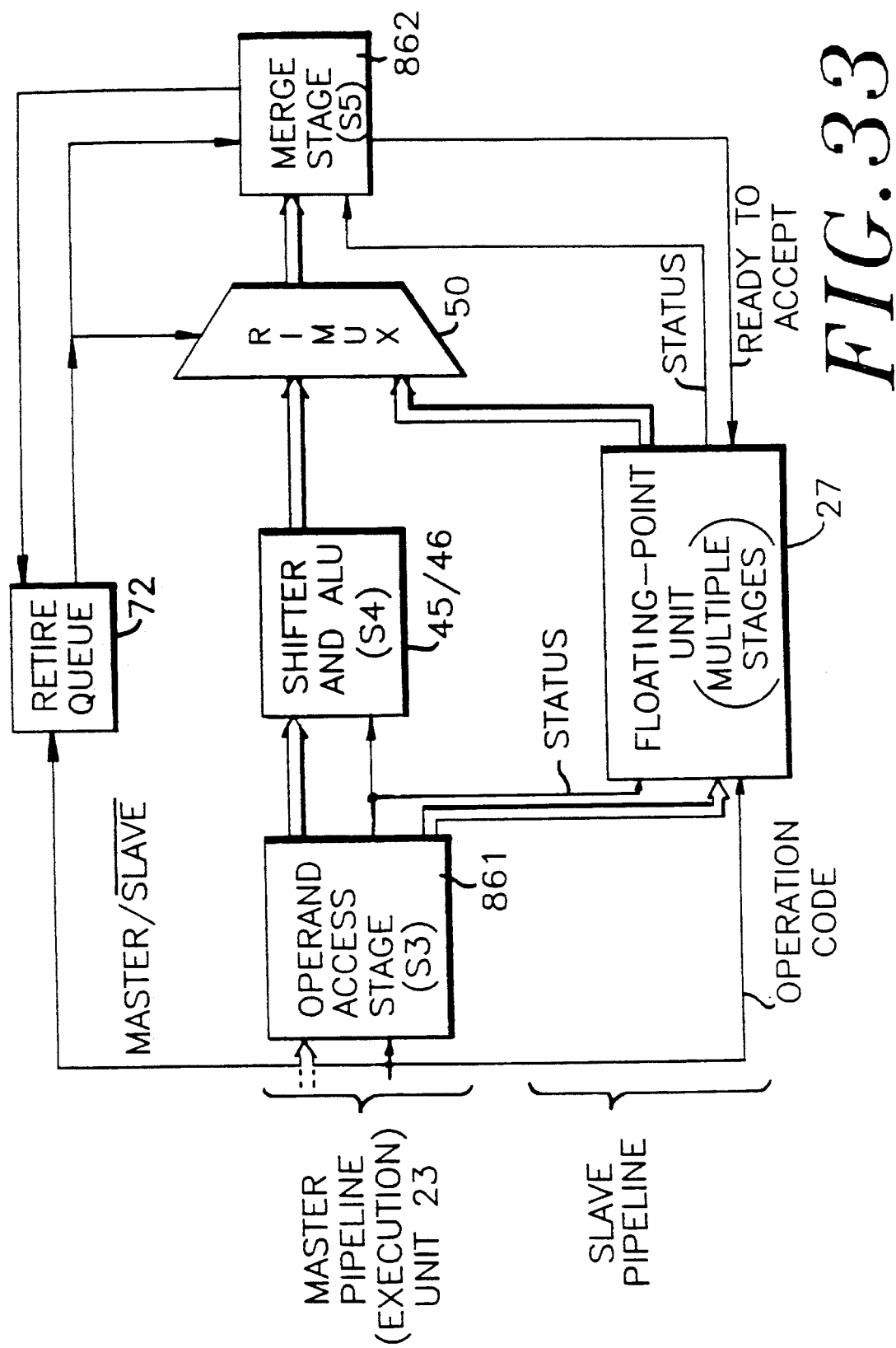
FIG. 33 is a block diagram that summarizes the pipeline merging between the execution unit and the floating-point unit, which was shown in more detail in FIG. 16.

The retire queue permits the execution unit and the floating-point unit to function as two autonomous pipelines and obtain high execution bandwidth. As summarized in FIG. 33, the execution unit pipeline is a master pipeline and the floating-point unit 27 the a slave pipeline. No pipeline stages were added to the master pipeline to incorporate the slave pipeline. The master pipeline transmits an instruction and operand data in every cycle to the slave pipeline. The stage 861 of the master pipeline that sends these operands is the operand access or issue stage. In every cycle it transmits a status indicating whether the last cycle's instruction and data were valid.

In the CPU 10 of FIG. 1, the floating-point unit 27 is physically displaced from the execution unit stages 861, 45/46, and 862. Therefore the floating-point unit 27 begins execution of each instruction it receives but aborts it in its second stage (318 in FIG. 17) if the corresponding valid status is not transmitted in the next cycle. The execution unit transmits an instruction's data from its operand access stage 861 whenever the instruction in that stage is one that must be executed in the floating-point unit 27. The execution unit transmits its stall status for the current cycle as the valid state for the previous cycle's instruction and data. In this way, stalls in the execution unit, which could mean that the operand data is not available yet, are interpreted as invalid status by the floating-point unit 27.

The master pipeline receives the results from the slave pipeline in a later stage 862, called the merge stage. In the execution unit, this stage is the retire stage (S5). Subsequent stages in the master pipeline carry results produced either in the master pipeline or in the slave pipeline. The slave pipeline transmits a status to indicate it has a result to transmit. The master pipeline transmits a status to the slave pipeline to indicate that it is ready to accept a result from the slave pipeline. If the master pipeline indicates that it is ready to accept a result in a particular cycle and the slave pipeline transmits the status that it has a result to send, then the transfer is considered complete by both pipelines. If the slave pipeline indicates it has a result to send but the master pipeline does not indicate it is ready to accept it, the slave pipeline stalls. This way stalls in the master pipeline cause stalls in the slave pipeline. If the master pipeline is ready to accept a result but the slave pipeline is not ready to transmit a result, the master pipeline stalls. This way latencies and stalls in the slave pipeline cause stalls in the master pipeline, when necessary.

The retire queue 72 forces the master pipeline to keep results in order. When an instruction enters the master pipeline, an entry is made in the retire queue indicating which pipeline executes this instruction. The retire queue 72 is a first-in-first-out (FIFO) queue. The master pipeline accesses the retire queue 72 to determine whether to obtain the next input to the merge stage from the slave pipeline or from the next earlier stage in the master pipeline. Once the selection is made and the selected result is passed through the result multiplexer (Rmux) 50 into the merge stage 862, the next retire queue entry is accessed and used to determine the next result to be sent into the merge stage. The stages 861, 45/46 of the master pipeline prior to the merge point are stalled when they contain a result which is not selected by the retire queue 72 (i.e., there is a result in the master pipeline stage 45/46 prior to the merge stage 862, but the slave pipeline is indicated by the retire queue as the source of the next result). When the master pipeline is indicated by the retire queue as the source of the next result, the master pipeline indicates to the slave pipeline that it is not ready to receive a result. Because of this mechanism, instructions enter the merge stage 862 in the original correct order even if the slave pipeline has longer execution latency than the master pipeline.

The commit point in the master pipeline is in or after the merge stage 862 in the master pipeline. The use of the retire queue 862, as described above, ensures that instructions reach the commit point in the correct order. Exceptional results are handled as if they were result data in both the master and slave pipelines. When such a result reaches the commit point, the exception is recognized, and all stages of the master and slave pipelines prior to the commit point are flushed.

In the digital computer 10 of FIG. 1, for sake of simplicity in construction, the master pipe stall in the stages after the operand access stage 861 causes the master pipeline to indicate the operand invalid condition to the slave pipeline. But instruction processing efficiency would be improved if an operand were signaled as invalid when it were actually were invalid. Moreover, instructions in the master pipeline for which execution is done in the slave pipeline are handled specially in the stages of the master pipeline after the operand access stage 861. They are treated as non-operations except that they trigger entry into the result scoreboard of the destination queue, as described above with respect to FIG. 18. They are allowed to progress into the merge stage 862 even if the slave pipeline is providing results into that stage simultaneously. They do not stall waiting for the master pipeline to be indicated by the retire queue 72 as the source of the next result. This permits the master pipeline to continuously send new operations to the slave pipeline regardless of how many have been sent before.

Some instructions use more input operand data than can be transferred in one cycle. For these, the transfer of input operands is done in multiple cycles, and for the digital computer 10 of FIG. 1, at the most two cycles are used.

Some instructions produce more result data than can be transferred in one cycle. For these, the transfer of results is done in multiple cycles. The same retire queue entry is used to control all the cycles of result transfer. The subsequent retire queue entry is not accessed until the multiple cycle result transfer is complete.

In the digital computer 10 of FIG. 1, the instruction is sent to the slave pipeline from the stage (S2) preceding the operand access stage. This allows the slave pipeline to prepare to receive the source operands, in particular, the floating-point unit 27 receives the operation code of the floating-point unit before the floating-point operands so that the operation code can address a programmable-logic array (PLA) to obtain control information for the floating-point operation when the operand access stage 861 is accessing the floating-point operands.

In view of the above, a combined destination queue and register scoreboard resolves at the last possible moment read-after-write conflicts between a current instruction and previously issued but not yet retired instructions. Therefore the efficiency of the pipeline is improved because stalls are frequently avoided by the retirement of conflicting prior instructions just before the current instruction issues. By combining the register scoreboard with the queue, the register bit cells used to store the register destination specifiers are shared between the queue function and the scoreboard function, and there is no need to transfer the register destination specifiers from the queue to the scoreboard. Moreover, bit comparison logic can be compactly incorporated into the register bit cells in a content-addressable memory configuration.

While the invention has been described with reference to a specific embodiment, the description is not meant to be construed in a limiting sense. Various modifications of the disclosed embodiment, as well as other embodiments of the invention, will be apparent to persons skilled in the art upon reference to this description. It is therefore contemplated that the appended claims will cover any such modifications or embodiments which fall within the true scope of the invention.

What is claimed is:

1. A method of processing instructions in a pipelined digital computer having an instruction decoder, and an instruction execution unit for overlapped execution of a plurality of instructions for which execution is initiated but not yet completed, multiple general purpose registers, a source queue for temporarily storing register source specifiers of said instructions, and a destination queue for temporarily storing register destination specifiers of said instructions, said method comprising the steps of:

decoding said plurality of instructions to obtain said register source specifiers and said register destination specifiers from said plurality of instructions and inserting said register source specifiers into said source queue and inserting said register destination specifiers into said destination queue;

removing said register source specifiers from said source queue and using said source specifiers in the execution of said plurality of instructions by said execution unit; and just prior to initiating execution of a current one of said plurality of instructions, checking for a register read-after-write conflict between a register source specifier of said current instruction of said plurality of instructions and a register destination specifier of a previous one of said plurality of instructions for which said execution has been initiated but not yet completed, and when a register read-after-write conflict is found between a register source specifier of said current instruction of said plurality of instructions and said previous one of said plurality of instructions for which said execution has been initiated but not yet completed, delaying the initiation of execution of said current one of said plurality of instructions; and marking each register destination specifier in said destination queue when execution is initiated for said current one of said plurality of instructions from which said each register destination specifier is obtained during said decoding of said plurality of instructions, and wherein said checking for a register read-after-write conflict includes comparing said register source specifier to each register destination specifier that is marked in said destination queue.

2. The method as claimed in claim 1, wherein said step of checking for a register read-after-write conflict includes obtaining said register source specifier from a head entry of said source queue and comparing said register source specifier to register destination specifiers in said destination queue.

3. The method as claimed in claim 1, wherein said step of marking includes setting a bit in a destination queue entry which holds said each register destination specifier.

4. The method as claimed in claim 1, wherein said step of marking includes marking a destination queue entry identified by a pointer, and advancing said pointer.

5. The method as claimed in claim 1, wherein said current instruction has a register source specifier specifying one of said general purpose registers and a register destination specifier that also specifies said one of said general purpose registers, and wherein delaying includes delaying said marking of said register destination specifier of said current instruction of said plurality of instructions.

6. A pipelined digital computer comprising:

a plurality of general purpose registers;

an instruction decoder for decoding instructions including register source specifiers and register destination specifiers to obtain said register source specifiers and said register destination specifiers from said instructions;

a source queue coupled to said instruction decoder for temporarily storing said register source specifiers obtained from said instructions;

a destination queue coupled to said instruction decoder for temporarily storing said register destination specifiers obtained from said instructions;

an execution unit coupled to said source queue, said destination queue, and said general purpose registers, for overlapped execution of a plurality of said instructions for which execution is initiated but not yet completed, said execution unit including means for obtaining from said source queue a register source specifier decoded from a current one of said plurality of instructions, means for checking for a register read-after-write conflict between said register source specifier obtained from said source queue and a register destination specifier decoded from a previous one of said plurality of instructions for which said execution has been initiated but not yet completed, and means for preventing initiation of execution of said current one of said instructions when said means for checking finds such a register read-after-write conflict; and means for marking each register destination specifier in said destination queue when execution is initiated for said current one of said plurality of instructions from which said each register destination specifier is obtained by said instruction decoder; and wherein said means for checking includes means for comparing said register source specifier obtained from said source queue to each register destination specifier that is marked in said destination queue.

7. The pipelined digital computer as claimed in claim 6, wherein said means for checking includes means for comparing said register source specifier obtained from said source queue to a plurality of said register destination specifiers that are held in said destination queue.

8. The pipelined digital computer as claimed in claim 6, wherein said means for marking includes means for setting a bit in a destination queue entry which holds said each register destination specifier.

9. The pipelined digital computer as claimed in claim 6, wherein said means for marking includes means for marking a destination queue entry identified by a pointer, and advancing said pointer.

10. A combined destination queue and register scoreboard in a pipelined digital computer having a multiplicity of general purpose registers, an instruction decoder for decoding instructions having source specifiers and destination specifiers specifying said general purpose registers, and an execution unit, said combined destination queue and register scoreboard comprising:

a register file having a plurality of entries, each entry including storage locations for storing a register index identifying one of said general purpose registers, and a storage location for storing a write-pending bit; said register file having an input port for writing a register index of a destination specifier to one of said entries selected by a write pointer; said register file having an output port for reading a register index from one of said entries selected by a read pointer;

comparators connected to said storage locations for comparing a register index of a source specifier of a current one of said instructions to the register index stored in each of said entries that also has a set write-pending bit, and generating a hit signal when said register index of said source specifier of said current one of said instructions matches the register index stored in one of said entries that also has a set write-pending bit; and write-pending bit set and clear logic connected to the storage locations storing said write-pending bits for setting the write-pending bit of one of said entries selected by an issue pointer and for clearing the write-pending bit of said one of said entries selected by said read pointer.

11. The combined destination queue and register scoreboard as claimed in claim 10, further comprising pointer comparison logic connected to said register file for comparing said read pointer to said write pointer to generate a queue empty signal when said one of said entries selected by said read pointer is said one of said entries selected by said write pointer, and for comparing said issue pointer to said write pointer to generate a scoreboard empty signal when said one of said entries selected by said issue pointer is said one of said entries selected by said write pointer.

12. The combined destination queue and register scoreboard as claimed in claim 11, further comprising a read pointer counter for generating said read pointer, said read pointer counter being connected to said register file for supplying said read pointer to said register file, and said read pointer counter having a count enable input connected to said execution unit for receiving a count enable signal from said execution unit to enable counting by said read pointer counter.

13. The combined destination queue and register scoreboard as claimed in claim 12, further comprising stall logic connected to said pointer comparison logic and said count enable input of said read pointer for generating a stall signal when said execution unit sends said count enable signal to said read pointer counter and said pointer comparison logic generates said queue empty signal.

14. The combined destination queue and register scoreboard as claimed in claim 11, further comprising an issue pointer counter for generating said issue pointer, said issue pointer counter being connected to said register file for supplying said issue pointer to said register file, and said issue pointer counter having a count enable input connected to said execution unit for receiving a count enable signal from said execution unit to enable counting by said issue pointer counter.

15. The combined destination queue and register scoreboard as claimed in claim 14, further comprising stall logic connected to said pointer comparison logic and said count enable input of said issue pointer for generating a stall signal when said execution unit sends said count enable signal to said issue pointer counter and said pointer comparison logic generates said scoreboard empty signal.

16. The combined destination queue and register scoreboard as claimed in claim 10, wherein said write-pending bit set and clear logic includes logic connected to said execution unit for clearing all of the write-pending bits in said entries in response to a flush signal from said execution unit.

17. The combined destination queue and register scoreboard as claimed in claim 10, wherein said destination specifiers include memory access specifiers and register access specifiers, each of said entries further includes a storage location for a flag indicating whether said each of said entries is associated with a register access specifier, said source specifiers include memory access specifiers and register access specifiers, and said comparators include logic for inhibiting generation of said hit signal when said source specifier is a memory access specifier, but not for inhibiting generation of said hit signal when the flag in said each of said entries indicates a memory access specifier.

18. The combined destination queue and register scoreboard queue as claimed in claim 10, wherein some of said instructions include quadword destination specifiers specifying that a first longword of a result of said instruction is to be stored in a register having an index N and a second longword of the result is to be stored in a register having an index of N+1, said register file has another input port for writing said index N+1 into another one of said entries offset by one entry from said one of said entries selected by said write pointer when said index N is written into said one of said entries selected by said write pointer, and wherein said combined destination queue and register scoreboard has a write pointer counter connected to said register file for supplying said write pointer, and said write pointer counter has an input connected to said instruction decoder for receiving a quadword signal from said instruction decoder for advancing said write pointer by two entries when said quadword signal is received from said instruction decoder and for advancing said write pointer by one entry when said quadword signal is not received from said instruction decoder.

* * * * *